(12) United States Patent
Burrell et al.

(10) Patent No.: US 7,450,292 B1
(45) Date of Patent: Nov. 11, 2008

(54) DURABLE ELECTROOPTIC DEVICES COMPRISING IONIC LIQUIDS

(75) Inventors: Anthony K. Burrell, Los Alamos, NM (US); Anoop Agrawal, Tucson, AZ (US); John P. Cronin, Tucson, AZ (US); Juan C. L. Tonazzi, Tucson, AZ (US); Benjamin P. Warner, Los Alamos, NM (US); T. Mark McCleskey, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 197 days.

(21) Appl. No.: 11/526,416

(22) Filed: Sep. 22, 2006

Related U.S. Application Data

(60) Continuation-in-part of application No. 11/041,069, filed on Jan. 20, 2005, now Pat. No. 7,119,937, which is a division of application No. 10/741,903, filed on Dec. 19, 2003, now Pat. No. 6,961,168, which is a continuation-in-part of application No. 10/600,807, filed on Jun. 20, 2003, now Pat. No. 6,853,472.

(51) Int. Cl.
  *G02F 1/153* (2006.01)
  *G02F 1/15* (2006.01)
  *G02F 1/00* (2006.01)
(52) U.S. Cl. .................. 359/270; 359/265; 359/273; 252/583
(58) Field of Classification Search ......... 359/265–275, 359/253, 296, 452; 252/500, 583, 586; 428/315.5, 428/432, 702, 704; 345/84, 85, 105, 107
See application file for complete search history.

(56) References Cited

U.S. PATENT DOCUMENTS 4,340,624 A * 7/1982 Yamashita et al. .......... 313/483

(Continued)

FOREIGN PATENT DOCUMENTS

JP  10-168028  6/1998

(Continued)

OTHER PUBLICATIONS

Alan B. McEwen et al., "Non-Flammable Electrolytes," WO 01/93363, published Dec. 6, 2001.

(Continued)

*Primary Examiner*—Loha Ben
(74) *Attorney, Agent, or Firm*—Samuel L. Borkowsky

(57) ABSTRACT

Electrolyte solutions for electrochromic devices such as rear view mirrors and displays with low leakage currents are prepared using inexpensive, low conductivity conductors. Preferred electrolytes include bifunctional redox dyes and molten salt solvents with enhanced stability toward ultraviolet radiation. The solvents include lithium or quaternary ammonium cations, and perfluorinated sulfonylimide anions selected from trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$). Electroluminescent, electrochromic and photoelectrochromic devices with nanostructured electrodes include ionic liquids with bifunctional redox dyes. Some of the electrolyte solutions color to red when devices employing the solutions are powered, leading to red or neutral electrooptic devices.

16 Claims, 12 Drawing Sheets

U.S. PATENT DOCUMENTS

| | | | |
|---|---|---|---|
| 4,344,674 A * | 8/1982 | Giglia | 359/269 |
| 4,671,619 A | 6/1987 | Kamimori et al. | |
| 4,902,108 A | 2/1990 | Byker | |
| 5,140,455 A | 8/1992 | Varaprasad et al. | |
| 5,142,407 A | 8/1992 | Varaprasad et al. | |
| 5,500,760 A | 3/1996 | Varaprasad et al. | |
| 5,604,626 A | 2/1997 | Teowee et al. | |
| 5,729,379 A | 3/1998 | Allemand et al. | |
| 5,827,602 A | 10/1998 | Koch et al. | |
| 5,838,483 A | 11/1998 | Teowee et al. | |
| 5,864,419 A | 1/1999 | Lynam | |
| 5,940,201 A | 8/1999 | Ash et al. | |
| 5,998,617 A | 12/1999 | Srinivasa et al. | |
| 6,045,724 A | 4/2000 | Varaprasad et al. | |
| 6,067,184 A | 5/2000 | Bonhote et al. | |
| 6,118,572 A | 9/2000 | Kostecki et al. | |
| 6,122,093 A | 9/2000 | Lynam | |
| 6,141,137 A | 10/2000 | Byker et al. | |
| 6,172,794 B1 | 1/2001 | Burdis | |
| 6,178,034 B1 | 1/2001 | Allemand et al. | |
| 6,241,916 B1 | 6/2001 | Claussen et al. | |
| 6,245,262 B1 | 6/2001 | Varaprasad et al. | |
| 6,246,505 B1 | 6/2001 | Teowee et al. | |
| 6,266,177 B1 | 7/2001 | Allemand et al. | |
| 6,297,900 B1 | 10/2001 | Tulloch et al. | |
| 6,310,714 B1 | 10/2001 | Lomprey et al. | |
| 6,317,248 B1 | 11/2001 | Agrawal et al. | |
| 6,327,070 B1 | 12/2001 | Heuer et al. | |
| 6,344,918 B1 | 2/2002 | Berneth et al. | |
| 6,362,914 B2 | 3/2002 | Baumann et al. | |
| 6,365,301 B1 | 4/2002 | Michot et al. | |
| 6,369,934 B1 | 4/2002 | Bechinger et al. | |
| 6,372,159 B1 | 4/2002 | Berneth et al. | |
| 6,420,036 B1 | 7/2002 | Varaprasad et al. | |
| 6,519,072 B2 | 2/2003 | Nishikitani et al. | |
| 6,525,861 B1 | 2/2003 | Roberts et al. | |
| 6,605,239 B2 | 8/2003 | Fitzmaurice et al. | |
| 6,657,768 B2 * | 12/2003 | Nishikitani et al. | 359/265 |
| 6,791,738 B2 * | 9/2004 | Reynolds et al. | 359/265 |
| 6,816,298 B2 | 11/2004 | Nishikitani et al. | |
| 2002/0012155 A1 | 1/2002 | Baumann et al. | |
| 2002/0021482 A1 | 2/2002 | Fitzmaurice et al. | |
| 2003/0030883 A1 | 2/2003 | Giri et al. | |
| 2006/0027260 A1 | 2/2006 | LeCompte et al. | |

FOREIGN PATENT DOCUMENTS

| | | |
|---|---|---|
| WO | WO 99/45081 | 9/1999 |
| WO | WO 01/27690 | 4/2001 |
| WO | WO 01/63350 | 8/2001 |
| WO | WO 01/93363 | 12/2001 |

OTHER PUBLICATIONS

Watanabe Masayoshi et al., "Normal Temperature-Melting Salt and Electrochemical Device Using the Same," Japan 10-168028, issued Jun. 23, 1998.

Rika Hagiwara and Yasuhiko Ito, "Room Temperature Ionic Liquids of Alkylimidazolium Cations and Fluoroanions," Journal of Fluorine Chemistry, vol. 105, pp. 221-227, 2000.

Charles M. Gordon, "New Developments in Catalysis Using Ionic Liquids," Applied Catalysis A: General, vol. 222, pp. 101-117, 2001.

Martyn J. Earle, Paul B. McCormac, and Kenneth R. Seddon, "Diels-Alder Reactions in Ionic Liquids," Green Chemistry, pp. 23-25, Feb. 1999.

J. Sun, M. Forsyth, and D. R. MacFarlane, "Room-Temperature Molten Salts Based on the Quaternary Ammonium Ion," J. Phys. Chem. B. vol. 102, pp. 8858-8865, 1998.

Yu. F. Pugachev and I. V. Neverov, "An Electrochromic System Based on Methyl Viologon Influence of the Polymer, Base Electrolyte, and Solvent Type on Its Chief Characteristics," Ul'yanovsk Polytechnic Institute. Translated from Elektrokhimiya, vol. 22, No. 1, pp. 58-62, Jan. 1986.

"Ultraviolet Stabilizers," Modern Plastics World Encyclopedia, pp. C-120-C-122, 2001.

Mark J. Muldoon, Andrew J. McLean, Charles M. Gordon, and Ian R. Dunkin, "Hydrogen Abstraction From Ionic Liquids by Benzophenone Triplet Excited States," Chem. Commun., pp. 2364-2365, 2001.

D. Behar, P. Neta, and Carl Schultheisz, "Reaction Kinetics in Ionic Liquids as Studied by Pulse Radiolysis: Redox Reactions in the Solvents Methyltributylammonium Bis(trifluoromethylsulfonyl)imide and N-Butylpyridinium Tetrafluoroborate," J. Phys. Chem. A, vol. 106, pp. 3139-3147, 2002.

Jeffrey R. Lomprey, "Substituted Metallocenes for Use as Anodic Electrochromic Materials, and Electrochromic Media and Devices Comprising the Same," WO 01/63350, published Aug. 30, 2001.

Mark Niemeyer, "σ-Donor Versus $\eta^6$-π-Arene Interactions in Monomeric Europium(II) and Ytterbium(II) Thiolates—An Experimental and Computational Study," Eur. J. Inorg. Chem., pp. 1969-1981, 2001.

A. W. Czanderna, D. K. Benson, G. J. Jorgensen, J.-G. Zhang, C. E. Tracy, and S. K. Deb, "Durability Issues and Service Lifetime Prediction of Electrochromic Windows for Buildings Applications," Solar Energy Materials & Solar Cells, vol. 56, pp. 419-436, 1999.

Dave Thieste et al., "Near Infrared-Absorbing Electrochromic Compounds and Devices Comprising the Same," WO 99/45081, published Sep. 10, 1999.

Clemens Bechinger, Suzanne Ferrere, Arie Zaban, Julian Sprague, and Brian A. Greeg, "Photoelectrochromic Windows and Displays," Nature, vol. 383, pp. 608-610, Oct. 1996.

Donald Fitzmaurice et al., "Electrochromic Device," WO 01/27690 A3, published Apr. 19, 2001.

Gimtong Teowee, Todd Gudgel, Kevin McCarthy, Anoop Agrawal, Pierre Allemand, John Cronin, "User Controllable Photochromic (UCPC) Devices," Electrochimica Acta, vol. 44, pp. 3017-3026, 1999.

Zhifeng Ding, Bernadette M. Quinn, Santosh K. Haram, Lindsay E. Pell, Brian A. Korgel, Allen J. Bard, "Electrochemistry and Electrogenerated Chemiluminescence from Silicon Nanocrystal Quantum Dots," Science, vol. 296, pp. 1293-1297, May 2002.

Sang Kwon Lee, Mark M. Richter, Lucjan Strekowsky, and Allen J. Bard, "Electrogenerated Chemiluminescence. 61. Near-IR Electrogenerated Chemiluminescence, Electrochemistry, and Spectroscopic Properties of a Heptamethine Cyanine Dye in MeCN," Analytical Chemistry, vol. 69, pp. 4126-4133, 1997.

Alexander Michaelis, Horst Berneth, Dietrich Haarer, Serguei Kostromine, Ralph Neigl, and Ralph Schmidt, "Electrochromic Dye System for Smart Window Applications," Adv. Mater., vol. 13, No. 23, Dec. 3, 2001.

Boschloo et al., "Spectroscopy of Highly Doped Nanostructured Tin Dioxide Electrodes," The Journal of Physical Chemistry, 1999, vol. 103, pp. 3093-3098.

Rathore et al., "Preparation and Structures of Crystalline Aromatic Cation-Radical Salts. Triethyloxonium Hexachloroantimonate as a Novel (One-electron) Oxidant," J. Org. Chem. Mar. 1998, vol. 63 No. 17, pp. 5847-5856.

Rathore et al., "A Redox-Controlled Molecular Switch Based on the Reversible C-C Bond Formation in Octamethoxytetraphenylene," Angew. Chem. Int. Ed. 2000, 39 (4), pp. 809-810.

* cited by examiner

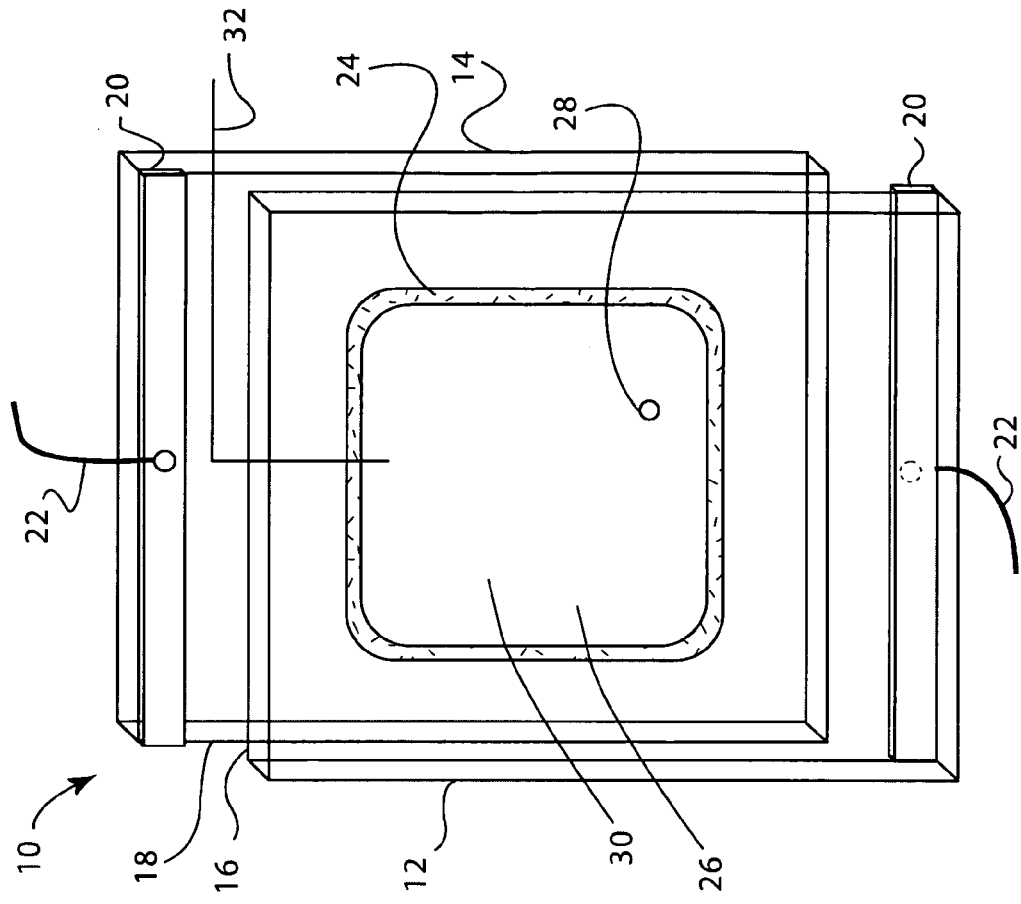
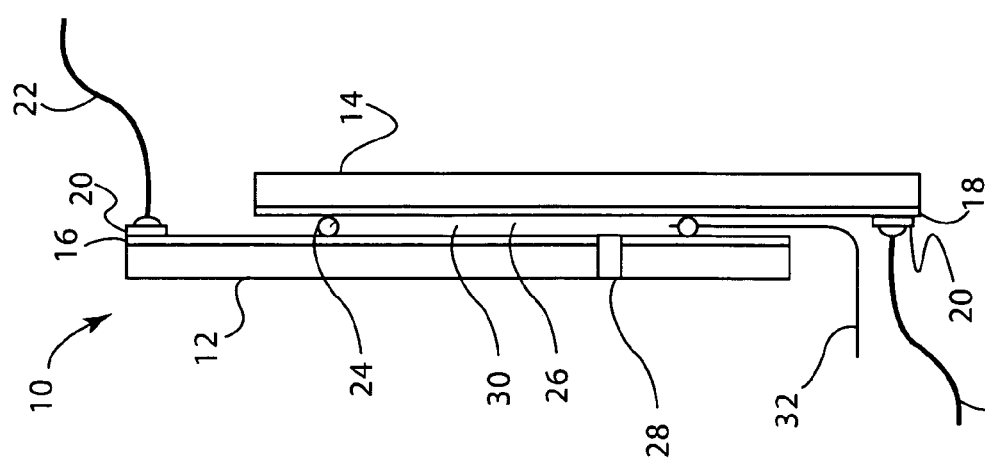

DURABLE ELECTROOPTIC DEVICES COMPRISING IONIC LIQUIDS

RELATED APPLICATIONS

This application is a continuation-in-part of U.S. patent application Ser. No. 11/041,069 filed Jan. 20, 2005 entitled "Durable Electrooptic Devices Comprising Ionic Liquids," now U.S. Pat. No. 7,119,937, which is a divisional of Ser. No. 10/741,903 filed Dec. 19, 2005 entitled "Durable Electrooptic Devices Comprising Ionic Liquids," now U.S. Pat. No. 6,961,168, which is a continuation-in-part of U.S. patent application Ser. No. 10/600,807 entitled "Electrolytes for Electrooptic Devices Comprising Ionic Liquids" filed Jun. 20, 2003, now U.S. Pat. No. 6,853,472, and claims priority of U.S. Provisional Patent Application 60/390,611 entitled "Electrolytes for Electrooptic Devices Comprising Ionic Liquids" filed Jun. 21, 2002, and U.S. Provisional Patent Application 60/502,133 entitled "Durable Electrooptic Devices" filed Sep. 11, 2003, all of which are incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to electrooptic devices and more particularly to durable electrooptic devices that employ electrolyte solutions of UV stabilizing dyes in ionic liquid solvents.

BACKGROUND OF THE INVENTION

Electrooptic devices are devices in which an applied electrical voltage produces a change in the optical properties of the device. Electrooptic devices are used for many applications such as variable transmission windows used for management of solar heat gain in buildings and variable transmission automotive mirrors. A specific type of an electrooptic device is an electrochromic device, i.e. a device that changes color in response to an applied voltage.

Electrochromic (EC) devices are a subset of electrooptic devices, provide reversible modulation of light, and are useful for several applications. Some of the applications are rear-view mirrors for automobiles, trucks, buses, scooters and motorcycles; windows for automobiles, other transportation (including road, rail, water and air) and buildings; eyewear; and attenuation or modulation of artificial lighting, displays, and contrast enhancement filters (including variable transmission filters for helmet mounted displays). The only successful commercial application thus far has been for automotive rearview mirrors. High cost and lack of durability have limited commercial window applications of these EC devices.

The durability limitation of the EC devices arises in part due to the electrolytes and solvents used in the prior art. The typical high dielectric solvents used in present day devices may have one or more of the following drawbacks: high volatility, high moisture sensitivity, hydrophilicity, a narrow range of electrochemical stability, chemical reactivity, and susceptibility to light-induced degradation (typically from ultraviolet or UV light).

Recent progress with ionic liquids has shown that certain problems associated with conventional solvents may be overcome by the use of a variety of ionic liquid solvents that are organic solvents that are composed of ammonium cations and trifluoromethylsulfonyl-containing anions. In addition to overcoming the aforementioned problems, these solvents have a low flammability, thus making products incorporating them safer than products incorporating more conventional organic solvents.

The use of ionic liquids is described, for example, in PCT Patent Application WO 01/93363 to McEwen et al. entitled "Non-Flammable Electrolytes," in Japanese Patent 98168028 to Watanabe et al. entitled "Room Temperature Molten Salts and Electrochemical Devices Using the Salts," and in U.S. Pat. No. 6,365,301 to Michot et al. entitled "Materials Useful as Electrolytic Solutes," which issued on Apr. 2, 2002, all of which are incorporated by reference herein. These papers and patents describe the use of ionic liquids in electrolytes, but fail to give specific details of electrolyte compositions and characteristics of the electrochromic devices made using ionic liquids.

One of the requirements of solvents for EC devices is that the other chemical components of the EC device are soluble and chemically stable with them. A limitation of the use of ionic liquids for electrooptic devices is that many of the known components of electrochromic devices have limited solubility in ionic liquids. Furthermore, the intrinsic limitations, e.g. electrochemical stability, of known electrochromic dyes and additives, are matched to conventional organic solvents, and therefore these dyes and other additives do not allow the full exploitation of the advantageous properties of the ionic liquids.

There remains a need for less expensive electrooptic devices with greater durability.

Therefore, an object of the present invention is to provide a relatively inexpensive, durable electrooptic device.

Another object of the present invention is to provide electrolyte solutions for electrooptic devices.

Yet another object of the present invention is to provide soluble dye compounds for use with ionic liquids for electrooptic devices.

Still another object of the present invention is to provide an electrooptic device with low leakage current.

Still another object of the present invention is to provide an electrooptic device with neutral color.

Still another object of the present invention is to provide an electrooptic device with a red colored dye bound to a nanostructured film.

Still another object of the present invention is to provide an electrooptic device that utilizes charge transfer complexes.

Another object of the present invention is to provide an electrooptic device that utilizes low conductivity transparent conductors.

Yet another object of the present invention is to provide an electrooptic device suitable for use as a rear-view mirror for vehicles such as automobiles, trucks, buses, scooters, and motorcycles.

Still another object of the present invention is to provide electrooptic devices having fast kinetics to color and bleach.

Another object of the present invention is a method of providing removing impurities, especially colored impurities, from ionic liquid precursors.

Still another object of the present invention is a method for preparing ionic liquid using the conjugate acid of the anion of the ionic liquid.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes an electrochromic device. The device includes a first substrate having a transparent conductor coated surface, a second substrate having a second conductor coated surface, and an electrolyte medium comprising ionic liquid and disposed between the first substrate and said second substrate. The ionic liquid comprises anions. At least one conductive surface is on at least one of the transparent conductor coated surface and the second conductor coated surface. The conductive surface has a coating of nanostructured material, and an electrochromic dye is attached to the nanostructured material, wherein the anion of the attached dye is same as the anion of the ionic liquid.

The invention also includes an electro-optic device that includes at least one chamber, and an electrolyte medium inside the chamber. The electrolyte medium includes a compound of the formula

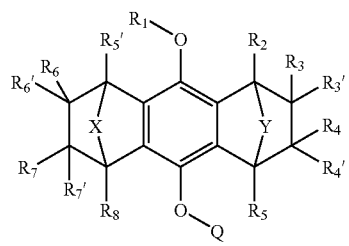

wherein Q is $R_{1'}$ or a group of the formula

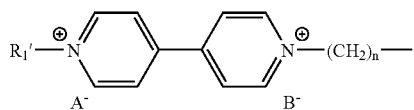

wherein n=1-10, wherein $A^-$ and $B^-$ are counterions;

wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein X and Y are independently selected from O, —C($R_9$)($R_{9'}$)— and —C($R_9$)($R_{9'}$)C($R_{10}$)($R_{10'}$)—;

wherein $R_2$, $R_3$, $R_{3'}$, $R_4$, $R_{4'}$, $R_5$, $R_{5'}$, $R_6$, $R_{6'}$, $R_7$, $R_{7'}$, $R_8$, $R_9$, $R_{9'}$, $R_{10}$, $R_{10'}$, are independently selected from hydrogen, alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

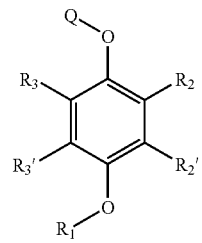

wherein Q is $R_{1'}$ or a group of the formula

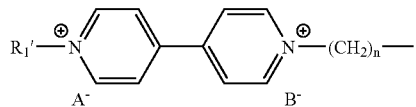

wherein n=1-10, wherein $A^-$ and $B^-$ are counterions;

wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_2$, $R_{2'}$, $R_3$, $R_{3'}$, are independently selected from hydrogen, alkyl having 1-20 carbons, alkyl carboxylic acid having 1-20 carbons, alkyl phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

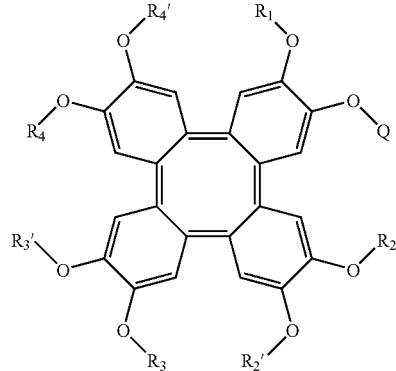

wherein Q is $R_{1'}$ or a group of the formula

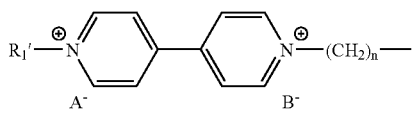

wherein n=1-10, wherein $A^-$ and $B^-$ are counterions;

wherein $R_1$, $R_{1'}$, $R_2$, $R_{2'}$, $R_3$, $R_{3'}$, $R_4$, $R_{4'}$, are independently selected from alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

The invention also includes an electrochromic device having a first electrode comprising a transparent or translucent substrate, an electrically conducting coating on said substrate, and on said electrically conducting coating a nanostructured film comprising a conducting or semiconducting metal oxide having a first redox chromophore adsorbed thereto. The device also includes a second electrode comprising a transparent or translucent substrate, an electrically conducting coating on said substrate, and on the coating a nanostructured film comprising a conducting metal oxide having a second redox chromophore adsorbed thereto. The device also includes an electrolyte between the first electrode and the second electrode. At least one of the first redox chromophore and the second redox chromophore comprises a compound of the formula

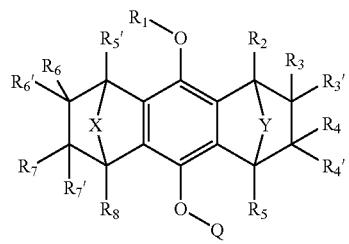

wherein Q is $R_{1'}$ or a group of the formula

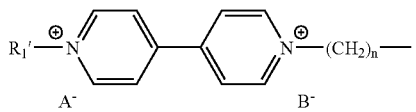

wherein n=1-10, wherein $A^-$ and $B^-$ are counterions;

wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein X and Y are independently selected from 0, —(C($R_9$)($R_{9'}$))— and —C($R_9$)($R_{9'}$)C($R_{10}$)($R_{10'}$)—;

wherein $R_2$, $R_3$, $R_{3'}$, $R_4$, $R_{4'}$, $R_5$, $R_{5'}$, $R_6$, $R_{6'}$, $R_7$, $R_{7'}$, $R_8$, $R_9$, $R_{9'}$, $R_{10}$, $R_{10'}$, are independently selected from hydrogen, alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

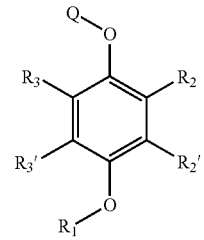

wherein Q is $R_{1'}$ or a group of the formula

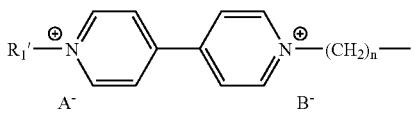

wherein n=1-10, wherein $A^-$ and $B^-$ are counterions;

wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_2$, $R_{2'}$, $R_3$, $R_{3'}$, are independently selected from hydrogen, alkyl having 1-20 carbons, alkyl carboxylic acid having 1-20 carbons, alkyl phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

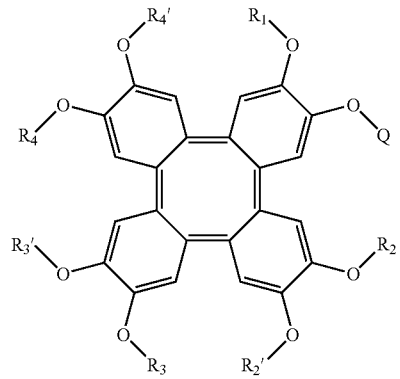

wherein Q is $R_{1'}$ or a group of the formula

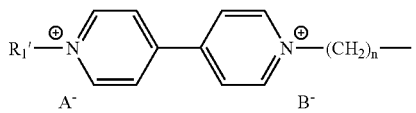

wherein n=1-10, wherein $A^-$ and $B^-$ are counterions;

wherein $R_1$, $R_{1'}$, $R_2$, $R_{2'}$, $R_3$, $R_{3'}$, $R_4$, $R_{4'}$, are independently selected from alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings:

FIG. 1a shows a cutaway, edge-on view of an embodiment of an electrochromic device of the invention.

FIG. 1b shows a perspective view of the embodiment of the electrochromic device of FIG. 1a.

DETAILED DESCRIPTION

Figure 4:
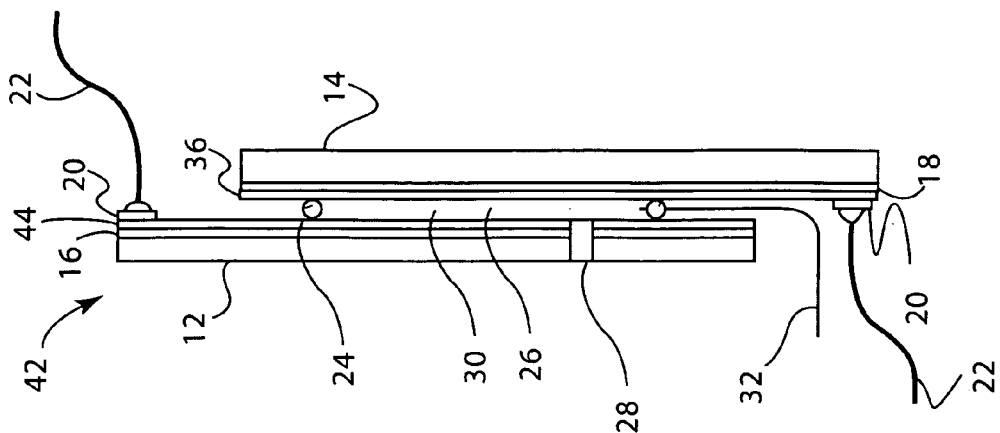
FIG. 4 shows a cutaway, edge-on view of an embodiment of an electrochromic device of the invention that includes two electrochemically active coatings.

The invention relates to electrooptic devices that employ ionic liquids as electrolyte solvents. Ionic liquids are molten salts that have melting points at or below room temperature. For the purposes of the invention, the terms "ionic liquid" and "molten salt" have the same meaning. A non-exhaustive list of these materials is provided by Hagiwara et al. in "Room Temperature Ionic Liquids of Alkylimidazolium Cations and Fluoroanions", J. Fluorine Chem. vol. 105, (2000), pp. 221-227, incorporated by reference herein.

The present invention relates to electrolytes and other components and constructions of EC devices using ionic liquids as solvents. The present invention relates to employing ionic liquid solvents in display devices, where individual electrodes allow pictures, words, and other images to be created and controlled through EC behavior. Processing methods are disclosed for manufacturing electrooptic devices.

Careful choice of ionic liquid solvents can offer several benefits, which include a wider range for electrochemical stability (greater than 4 volts (V) and in some cases greater than 6 V); high hydrophobicity; a high decomposition temperature (ionic liquids used with the invention do not boil but they decompose at temperatures higher than 150° C. and more preferably higher than 200° C.); a negligible vapor pressure (see, for example, Gordon in "New Developments in Catalysis Using Ionic Liquids, Applied Catalysis: General A, vol. 222, (2001) pp. 101-117; and Earle in "Diels-Alder Reactions in Ionic Liquids," Green Chemistry, vol. 1 (1999) pp. 23-25); non-flammability (non-ignitable by a flame, see PCT Patent Application WO 01/93363 to McEwen et al. entitled "Non-Flammable Electrolytes,"); low UV susceptibility (for non-conjugated cations, no absorption peaks between 290 and 400 nm); and high conductivity.

Ionic liquid solvents of this invention do not include the mineral acids (such as sulfuric acid).

Ionic liquid solvents useful with the invention include salts of organic cations in combination with either organic or inorganic anions. Preferred anions of the invention contain fluorine, and include trifluoromethylsulfonate ("triflate," $CF_3SO_3^-$), bis(trifluoromethylsulfonyl)imide ($N(CF_3SO_2)_2^-$), bis(perfluoroethylsulfonyl)imide (($C_2F_5SO_2)_2N^-$)), tris(trifluoromethylsulfonyl)methide (($CF_3SO_2)_3C^-$)), tetrafluoroborate ($BF_4^-$), hexafluorophosphate ($PF_6^-$), hexafluoroantimonate ($SbF_6^-$), and hexafluoroarsenate ($AsF_6^-$). Of these anions, trifluoromethylsulfonate ("triflate," $CF_3SO_3^-$), bis(trifluoromethylsulfonyl)imide ($N(CF_3SO_2)_2^-$), bis(perfluoroethylsulfonyl)imide (($C_2F_5SO_2)_2N^-$)), tris(trifluoromethylsulfonyl)methide (($CF_3SO_2)_3C^-$)) are preferred. The most preferred anion is bis(trifluoromethylsulfonyl)imide anion ($N(CF_3SO_2)_2^-$) because of its low cost and high hydrophobicity. The bis(trifluoromethylsulfonyl)imide anion is sometimes referred to in the prior art as bis(trifluoromethanesulfonyl)amide or bis(trifluoromethanesulfonyl) imide, and has the structural formula

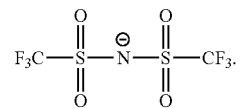

Preferred organic cations of molten salts used with the invention include, but are not limited to, pyridinium, pyridazinium, pyrimidinium, pyrazinium, imidazolium, pyrazolium, thiazolium, oxazolium, and triazolium. A preferred list of quaternary ammonium based ionic liquids are all those with a glass transition temperature ($T_g$) lower than $-40°$ C. given in Table 1 of the publication by Sun et al. entitled "Room-Temperature Molten Salts Based on the Quaternary Ammonium Ion," J. Phys. Chem. B, 1998, vol. 102, pages 8858-8864, incorporated by reference herein, and in U.S. Pat. No. 5,827,602 to Koch et al. entitled "Hydrophobic Ionic Liquids," which issued Oct. 27, 1998, also incorporated by reference herein.

Preferred ionic liquids include tetraalkylammonium cations because ionic liquids made from these cations have minimal optical absorbance in the ultraviolet portion of the spectrum, which gives molten salts based on these cations enhanced photochemical stability (see, Sun et al., vide supra). Quaternary ammonium cations useful with the invention may be substituted with H, F, phenyl, alkyl groups with 1 to 15 carbon atoms, and other chemical substituents. Cations may even have bridged ring structures.

Most preferred quaternary ammonium cations have the formula $(CH_3CH_2)_3N(R_1)$, wherein $R_1$ is alkyl having 2-10 carbons; or have the formula $(CH_3)_2(CH_3CHCH_3)N(R_2)$, wherein $R_2$ is alkyl having 2-10 carbons; or have the structural formula

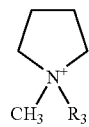

wherein $R_3$ is alkyl having 2-10 carbons;

or have the structural formula

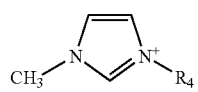

wherein $R_4$ is alkyl having 2-10 carbons.

Most preferably, the ionic liquid solvent is N-butyl-N-methylpyrrolidinium bis(trifluoromethylsulfonyl)imide.

Since EC devices can be used in a wide range of temperatures (e.g., automotive windows may be subjected to temperatures from about $-40°$ C. to $95°$ C. or higher), the high electrochemical stability window assures that the even when the electrochemical potentials for reducing or oxidizing EC materials change with temperature, they will be within the stability window of the ionic liquid solvent. The high hydrophobicity of the ionic liquid minimizes the likelihood of water becoming part of the electrolyte and generating electrochemical reactions that are not reversible.

High boiling points and low vapor pressures of ionic liquids are useful properties from the electrooptic device fabrication perspective. Most of the EC devices are backfilled in vacuum (the vacuum backfill process is described in detail later). The low vapor pressure minimizes contamination of the vacuum systems, helps keep the electrolyte composition constant, and prevents entrapment of bubbles during the backfilling process. These properties also contribute to chemical safety in the workplace. Low flammability is important from a safety perspective, particularly when used in buildings and in transportation.

Preferred ionic liquid solvents used with the present invention do not significantly absorb ultraviolet radiation having a wavelength above 290 nanometers (nm), and therefore do not degrade when exposed to these wavelengths to byproducts that can lead to irreversible coloration, gas formation and/or formation of electrochemically active/inactive species.

The preferred ionic liquid solvents are those that can result in formulations with a Tg below $0°$ C., preferably below minus 20 degrees Celsius ($-20°$ C.) and most preferably below $-40°$ C. As will be shown in EXAMPLE 7 (vide infra), Tg can be measured from viscosity data.

To make EC devices of practical use, several ingredients may be required in the electrolyte. Depending on device construction and its application, EC devices may require UV stabilizers, other co-solvents (propylene carbonate, methyl sulfolane, for example) and salts, redox dyes, viscosity modifiers, gelling materials, dyes that impart permanent colors, including those that absorb in the near infra-red region (wavelengths between 700 and 2500 nm) and opacifiers. Several types of EC devices, electrolyte solutions, and other constituents are described below. Some that include liquid or laminatable solid electrolytes are shown in FIGS. 1 to 4.

Reference will now be made in detail to the present preferred embodiments of the invention. Similar or identical structure is identified using identical callouts. FIG. 1a shows an edge-on view, and FIG. 1b shows a perspective view, of an embodiment of an electrochromic device of the invention. Devices of this configuration are referred to as single compartment devices in the art because the electrochemical activity takes place in a single layer of material (i.e. the electrolyte) between the conductive electrodes. FIG. 1a-b shows electrochromic device 10, which includes first substrate 12 and second substrate 14 in a substantially parallel relationship with, and spaced apart from, first substrate 12. For convenience, small flat pieces of glass may be employed as substrates.

Electrochromic device 10 includes first conductive layer 16 on first substrate 12 and second conductive layer 18 on second substrate 14. Conductive layers 16 and 18 are typically indium tin oxide, fluorine-doped tin oxide or fluorine-doped indium tin oxide, but any conductive coating, such as thin layers of metal or conducting polymers may be used. Conductive layer 18 is needed if second substrate 14 is not conductive, for example if second substrate 14 is made of glass or plastic. However, conductive layer 18 is optional if second substrate 14 already is conductive, for example if second substrate 14 is made of metal or metal-coated glass or metal coated plastic. When second substrate 14 is conductive, then second substrate 14 functions as a structural substrate, reflector and conductive layer.

Electrochromic device 10 includes metallic bus bars 20, one attached to an end portion of first conductive layer 16 and another attached to an end portion of second conductive layer 18. If second substrate 14 is electrically conductive, then second conductive layer 18 becomes optional and bus bar 20 may be directly attached to second substrate 14. Wire 22 is soldered or otherwise attached to each bus bar 20 for connecting to a voltage source (a battery or the like, not shown).

Bus bars 20 are made from a suitable conductive metallic material and provide good electrical contact with the conductive layers or the substrate. Examples of bus bar materials include silver frits, solder alloys, metallic strips, wires and clips. Preferred materials include copper, copper alloys (such as copper-beryllium alloys), and tin plated copper.

Electrochromic device 10 includes electrically non-conductive gasket 24, which forms a seal with first conductive layer 16 and with second conductive layer 18 or with second substrate 14 if second conductive layer 18 is not used to provide chamber 26. Preferably, the width of chamber 26, which is the width between first conductive layer 16 and second conductive layer 18, is from about 20 microns to about 5000 microns. More preferably, the chamber width is from about 40 microns to about 500 microns. Most preferably, the chamber width is less than about 250 microns.

Gasket 24 should be chemically stable to molten salt electrolyte used with the invention, substantially impermeable to water and the atmosphere (especially to oxygen and carbon dioxide), and robust over a wide temperature range, preferably from temperatures of about −40° C. to about 100° C. Gasket 24 provides electrical insulation between the two conducting surfaces so that substantially all electrical current passes through electrolyte solution 30. Typically, the thickness of gasket 24 determines the distance between first conductive layer 16 (i.e. the working electrode) and second conductive layer 18 (i.e. the counter electrode), and affects the volume of chamber 26 and internal resistance of device 10.

Device 10 includes at least one port 28 for filling chamber 26 with electrolyte solution 30. Port 28 may be located at any convenient location (through gasket 24, through first substrate 12, through second substrate 14, for example). Only one port is needed if vacuum-backfill techniques are used to fill chamber 26 with solution 30, but additional ports (for the purpose of, for example, pressure relief) may be present if other fill methods are used. After filling chamber 26, port(s) 28 are plugged.

Electrolyte solution 30 is non-volatile and hydrophobic, and provides high concentrations of cations and anions that offer minimal resistance to current. Electrolyte solution 30 in chamber 26 remains in electrical contact with first conductive layer 16 and second conductive layer 18 (or with second substrate 14 if second conductive layer 18 is not used).

The bulk of electrolyte solution 30 is ionic liquid solvent. Electrolyte solution 30 also includes at least one anodic and at least one cathodic material. The anodic material and/or cathodic material may be ionic in order to improve their solubility in the ionic liquid solvent, and their associated anions are preferably identical to those of the ionic liquid solvent.

The anodic material and cathodic material may each be a moiety of a single bifunctional redox compound.

The anodic material and cathodic material may respond to a redox event to produce a wide range of colors including, blue, red green and gray. Gray is considered a neutral coloration in an electrochromic device.

It should be understood that the substrates are not limited to any particular shape or to any particular material. Curved substrates, for example, may be used. Materials such as glass, metal, plastic, and the like may be used. A substrate for a mirror application, for example, may include an opaque reflective material such as metal or metal-coated-coated plastic or metal-coated glass. If metals are used, preferred metals may include aluminum, aluminum alloys, silver, chromium, rhodium, stainless steel, and silver alloys in which the silver is alloyed with gold, palladium, platinum, or rhodium. A reflective substrate may also be composed of multiple layers where some of these layers may be transparent conducting oxides to prevent reactions with electrolyte. Metals may also serve as reflectors.

For mirrors, the metals may be in contact with the electrolyte or they may be on the outside of the device. In the latter case both substrates facing inwards have coatings of transparent conductors, and the outside reflector may be the ones described above and may be further protected by copper layer and polymeric paint against corrosion.

When the single compartment devices are colored, a back reaction is concurrently set up in the device. This back reaction may lead to leakage current. This leakage current may be responsible for the devices to self-bleach when the coloring potential is removed. Although the back reaction is useful, too much of it leads one to use high conductivity conductive layers 16 and 18. When these conductive layers are transparent, they add cost to the device, particularly if they are low in electrical resistivity. Typically transparent conductive layers used for commercial mirrors have an electrical resistivity of less than 15 ohms/square. In order to keep the cost low, a preferred range being higher than 20 ohms/square and even more preferred being higher than 40 ohms/square; greater than 50 ohms/square is most preferred. However, when high resistivity (low conductivity) conductive layers are used in the same device, the high leakage current causes an iris effect, i.e., the voltage drop in this conductive layer does not allow the center of the device to color less as compared to the perimeter of the device. Furthermore, for rear-view EC mirrors, it is desirable to have devices that consume lower power. For optimal electrooptical devices the leakage current should be below 10 $\mu A\ cm^{-2}$ and preferably below 1 $\mu A\ cm^{-2}$.

For the past several years, attempts have been made to lower the leakage current of electrochromic rear-view mirrors. These attempts generally involved adding additives that change the viscosity of the electrolyte solution or the strength of the electric field modifying the dye mobility (see, for example, U.S. Pat. No. 6,525,861, Pugachev et al., "An Electrochromic System Based on Methyl Viologen, Influence of the Polymer, Base Electrolyte, and Solvent Type on its Chief Characteristics," Elektrokhimiya, volume 22, no. 1, pp. 58-62 (1984)). Several non-polymeric additives are given in U.S. Pat. No. 5,142,407. The viscosity change causes a slower diffusion of the dye through the electrolytic medium. The addition of these additives can have some drawbacks. The viscosity-modifying additives may change the viscosity to a point where it becomes difficult to backfill even at elevated temperature. The additives may also cause other problems such as poor UV or cyclic stability.

Another way to decrease the leakage current is to increase the electrolyte thickness. In this case, the dye molecules have long path lengths for diffusion. In U.S. Pat. No. 5,500,760, for example, an EC window device with a cell gap of 380 microns is described. This cell colored from 74.5% to 17% in 2 minutes, and it self erased from 2% to 25% in 2 minutes and then completely bleached in 7 minutes. These times for self-erasing automotive mirror applications are too long.

Typical commercial automotive rear-view mirrors use highly conductive transparent conductors as described above with an electrolyte thickness of less than 200 microns. For EC mirrors, time to color or to bleach should be less than 60 seconds and more preferably less than 30 seconds and most preferably less than 15 seconds at room temperature (typically 25±2° C.). These times may increase with decreasing temperature.

Time to color and time to bleach are defined in many ways by the automotive industry customers. For purposes of the invention, time to color is the length of time required to color for 80% of the full range measured from the highest transmittance or reflectivity, and time to bleach is the length of time required to bleach for 80% of the full range measured from the lowest transmittance or reflectivity; the full range is the difference between the bleached state transmittance or reflectance and the colored state transmittance or reflectance, respectively, at a specified coloring potential. EC devices have a variable transmittance (or reflectance), which may be changed by coloring potential. Typically, for measurement of kinetics, a step potential is used at the maximum safe voltage and for bleaching, and the electrodes of the device may be left open or shorted or a reverse potential may be applied. For mirrors, the reflectivity is measured at 550 nm, or a broader wavelength measurement is made using white light that is modulated using a photopic filter.

A preferred way to reduce the back reaction is to use a high concentration of ionic species in the electrolyte solution. A reduced back reaction results in devices that color uniformly, which is a particularly important consideration as the surface area of the electrooptic device increases. Also, to ensure that the devices bleach fast (within 60 seconds) the cell gap, which determines the electrolyte thickness, must be less than 250 microns, more preferably less than 200 microns, and most preferably less than 150 microns in order to keep the diffusion lengths small. The ionic species in the electrolyte include anions, cations, ionic liquids (i.e. molten salts), conventional salts (including inert current carrying electrolytes, lithium salts, for example) and dyes that have salt like structures (e.g., viologen salts; bifunctional dyes of this invention that include viologen moieties, and the like) and some UV stabilizers. The molarity of all the ionic species added together should be greater than 1 molar, and preferably greater than 1.5 molar and most preferably greater than 2.05 molar. In commercial automotive mirrors, the ion concentration in the electrolyte is generally less than 0.1 molar. In the devices of this invention, the dye concentration of either the cathodic or the anodic species should preferably be less than 0.25 molar. Also, the same applies for a bridged dye where the anodic and the cathodic species are present in the same molecule, i.e., the concentration of the bridged dye should preferably be lower than 0.25 molar. Most preferably the dye concentrations should be lower than 0.15 molar.

The bifunctional dyes used with the invention provide stabilization toward ultraviolet radiation.

As previously stated, the cation of the ionic liquid solvent is preferably tetraalkylammonium, alkyl-substituted pyrrolidine, or alkyl-substituted imidazole. The anion of the ionic liquid solvent is preferably perchlorate, tetrafluorborate, hexafluorophosphate, trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$).

Most preferably, the molten salt is N-butyl-N-methylpyrrolidinium bis(trifluoromethylsulfonyl)imide.

Solution 30 may optionally contain thixotropic agents, such as dispersed, electrochemically inert inorganic materials such as silica or alumina to facilitate injection into chamber 26.

Solution 30 may also contain one or more coloring agents to afford a desired color in either a darkened state or a bleached state.

Solution 30 may contain additional soluble ultraviolet (UV) stabilizers, including those described in, for example, Modern Plastics World Encyclopedia (2001) p-C-120 to C-122, Chemical Week Publishing, NY, incorporated by reference herein.

Solution 30 may also contain one or more stiffening agents to increase the viscosity of solution 30 while maintaining conductivity. This is desirable in order to minimize the spread of solution 30 if device 10 is damaged. Stiffening agents include, but are not limited to, organic monomers and polymers such as poly(acrylonitrile), poly(vinylidene fluoride), poly(hexafluoropropylene), poly(vinylalcohol), poly(vinylacetate), poly(methylmethacrylate) and their copolymers. These polymers may also be formed by in-situ polymerization. They may be crosslinked in situ by polymerization of monomers (see, for example, U.S. Pat. No. 6,420,036 to Varaprasad et al. entitled "Electrochromic Polymeric Solid Films, Manufacturing Electrochromic Devices Using Such Solid Films, and Processes for Making Such Solid Films and Devices," which issued Jul. 16, 2002, incorporated by reference herein). Poly(methylmethylacrylate) (PMMA), for example, may be formed by adding methyl methylacrylate to the molten salt and then adding benzoyl peroxide to initiate the polymerization.

Solution 30 optionally includes one or more soluble co-solvents that decrease the viscosity of solution 30 and do not interfere with the durability and function of the electrochromic device. Preferably, co-solvents are aprotic and have high boiling points (preferably above 150° C.), low melting points (preferably below −30° C.), and are present in concentrations from about 0.5% to about 30%. Preferable co-solvents include propylene carbonate, N-methylpyrrolidinone, perfluorodecalin, and perfluorodecane.

Optionally, as is shown in FIG. 1a and FIG. 1b, electrochromic device 10 may include pseudo-reference electrode 32 for evaluating the electric potential of conductive layer 16. Pseudo-reference electrode 32 may be in the form of a silver wire inserted through gasket 24 such that pseudo reference electrode 32 does not contact conductive layer 16 or conductive layer 18. Pseudo-reference electrodes may take other forms. A minor portion of first conductive layer 16 or second conductive layer 18, for example, may be separated away by etching a separation line to provide a pseudo-reference electrode.

The invention may be used with a standard, glass, multiple-pane window by, for example, substituting one or more panes of a multiple glass pane window with an electrooptic device of the invention. The glass panes may be coated with low-emissivity materials that block/attenuate UV, infrared, and/or visible light.

There are many patents that describe EC devices. Some that describe EC devices utilizing non-ionic liquid electrolytes include U.S. Pat. No. 4,902,108 to Byker entitled "Single Compartment, Self-Erasing, Solution Phase Electrochromic Devices, Solutions for Use Therein, and Uses Thereof," which issued Feb. 20, 1990; U.S. Pat. No. 5,998, 617 to Ramanujan et al. entitled "Electrochromic Compounds," which issued Dec. 7, 1999; and U.S. Pat. No. 6,045, 724 to Varaprasad et al. entitled "Large Area Electrochromic Window," which issued Apr. 4, 2000, all incorporated by reference herein. Others that describe EC devices that utilize solid electrolytes include U.S. Pat. No. 6,245,262 to Varaprasad et al. entitled "Electrochromic Polymeric Solid Films, Manufacturing Electrochromic Devices Using Such Solid Films, and Processes for Making Such Films and Devices," which issued on Jun. 12, 2001, and U.S. Pat. No. 5,940,201 to Ash et al. entitled "Electrochromic Mirror With Two Thin Glass Elements and a Gelled Electrochromic Medium," which issued on Aug. 17, 1999, all incorporated by reference herein. Generally, plasticizing the polymers with the liquid electrolytes produces solid electrolytes. The solvents described in these patents are neutral polar materials such as nitrites (e.g., glutaronitrile, 3-hydroxypropionitrile), sulfolanes (e.g., 3-methylsulfolane), ethers (e.g., polyethylene oxide, polypropyleneoxide and tetraglyme), alcohols (ethoxyethanol, ethanol), ketones and esters (e.g., gamma-butyrolactone, propylene carbonate, ethylene carbonate), and mixtures of these. While additional materials are disclosed in these patents, none disclose the use of ionic liquids.

The UV stability of reported electrooptic devices has been enhanced with UV filters and additives (see, for example U.S. Pat. No. 5,864,419 to Lynam entitled "Near-Infrared Reflecting, Ultraviolet Protected, Safety Protected, Electrochromic Vehicular Glazing," which issued on Jan. 26, 1999; U.S. Pat. No. 6,122,093 to Lynam entitled "Reduced Ultraviolet Radiation Transmitting, Safety Protected Electrochromic Glazing Assembly," which issued on Sep. 19, 2000; U.S. Pat. No. 6,362,914 to Baumann et al. entitled "Electrochromic Materials With Enhanced Ultraviolet Stability and Devices Comprising the Same," which issued on Mar. 26, 2002; and U.S. Pat. No. 6,310,714 to Lomprey et al. entitled "Color-Stabilized Electrochromic Devices," which issued on Oct. 30, 2001). In U.S. Pat. No. 5,140,455 to Varaprasad et al. entitled "High Performance Electrochemichromic Solutions and Devices Thereof," which issued on Aug. 18, 1992, the choice of solvents is made based on UV absorption properties of the solvent. The most cost effective method is to add a UV stabilizer to the electrolyte.

While the ionic liquids used with the invention are UV stable materials, EC devices of the invention that include these materials may still require additional stabilizers for the protection of the other ingredients such as polymers and dyes, and also to reduce any interaction of electrode/electrolyte promoted by light. For the purposes of the present invention, UV stabilizers include materials that absorb UV (ultraviolet) radiation and materials that quench species generated by the UV radiation to minimize damage caused by UV radiation.

Any UV stabilizer or any of the other ingredients, including dyes, must be soluble in the electrolyte within the temperature ranges in which the device is used. For electrochromic mirrors, windows and other devices that are subjected to the weathering elements, UV stabilizers must be compatible over a wide temperature range. A preferred minimum temperature range for devices to operate is from 0° C. to 50° C., a more preferred range is from −20° C. to 70° C., and a most preferred range is from −40° C. to 105° C.

A non-exhaustive list of UV stabilizers that can be used with the invention can be found in Modern Plastics Encyclopedia, pages C120 to C122, 2001, Chemical Week Associates publication, New York, incorporated by reference herein. Some of the preferred UV stabilizers are benzophenone and derivatives thereof because these materials are compatible with several ionic liquids (see Muldoon et al. in "Hydrogen abstraction from ionic liquids by benzophenone triplet excited states," Chem. Comm. (2001) pp. 2364-2365; Behar et. al. in "Reaction Kinetics in Ionic liquids as Studied by Pulse Radiolysis: Redox Reactions in the Solvents methyltributylammonium bis(trifluoromethylsulfonyl)imide and n-butylpyridinium tetrafluoroborate," J. Phys. Chem. A., (2002), vol. 106, pp. 3139-3147). Other preferred UV stabilizers are benzotriazoles (and derivatives thereof) and triazines (and derivatives thereof). The addition of UV stabilizers can also assist in decreasing the freezing point of the electrolytes, as they may constitute 0.01% to 40% of the weight of the molten salt solution.

UV stabilizers typically result in an average absorbance of greater than 1.00 between the wavelengths of 290 nm and 400 nm (90% of attenuation of UV) and more preferably in an absorbance greater than 2.00 (99% attenuation of UV), as measured with a path length of one centimeter and a concentration of about 1% by weight of the UV stabilizer in the ionic liquid. This absorbance is measured by subtracting the absorbance of the ionic liquid without the UV stabilizer from the absorbance of the solution that contains the UV stabilizer.

In U.S. Patent Application Publication 20020012155 to Baumann et al. entitled "Electrochromic Materials With Enhanced Ultraviolet Stability and Devices Comprising the Same," which was published on Jan. 31, 2002, and in U.S. Pat. No. 6,344,918 to Berneth entitled "Electrochromic Contrast Plate," which issued on Feb. 5, 2002, both incorporated by reference herein, compounds are described that include a redox active dye moiety bridged to an energy receptor moiety (i.e. a UV stabilizer moiety) so that the same molecule is able to absorb UV and also function as a redox dye. For the purposes of the present invention, this is a type of compound that is referred to herein more generally as a "bifunctional redox dye".

An advantage of using bifunctional redox dyes that have tethered UV stabilizer moieties is that the UV stability of the entire device is increased. The nature of the liker may pay an important role in the UV stability in tethered dyes. It appears that the butyl-linker is the preferred linker in stable bifunctional redox dyes.

Additional examples of bifunctional redox dyes having a dye moiety attached to a UV stabilizer moiety are described in U.S. Pat. No. 6,362,914 to Baumann et al., entitled "Electrochromic Materials with Enhanced Ultraviolet Stability and Devices Comprising the Same," which issued Mar. 26, 2002, incorporated by reference herein. The '914 patent describes a cathodic compound prepared by attachment of a viologen dye to an UV stabilizer moiety, which is referred to in the '914 patent as an "energy receptor site". Typically, UV stabilizer moieties include benzophenones or benzotriazoles, which can be covalently attached to either an anodic or cathodic dye moiety. The UV stabilizer moiety of the compound absorbs the UV radiation and prevents damage to the dye moiety. A specific example of such a compound described in the '914 patent is 1-methyl-1-[1-benzotriazole-2-hydroxy-3-t-butyl-5-propyl(propionate)-[benzene]]-4,4-bipyridinium bis(tetrafluoroborate). For use in an ionic liquid electrooptic device of the present invention, a different compound is employed, one in which at least one tetrafluoroborate and preferably both tetrafluoroborate anions are replaced with trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) or tris(trifluoromethylsulfonyl)methide (($CF_3SO_2)_3C^-$), most preferably with bis(trifluoromethylsulfonyl)imide (($CF_3SO_2)_2N^-$). A compound containing bis(trifluoromethylsulfonyl)imide, for example, may be prepared by anion exchange of the corresponding tetrafluoroborate anion-based compound with bis(trifluoromethylsulfonyl)imide anion. Alternatively, this type of compound may be synthesized by the electrochemical oxidation of the anodic moiety (e.g. a phenazine moiety) in an ionic liquid that includes bis(trifluoromethylsulfonyl)imide anions, or by the electrochemical reduction and re-oxidation of the cationic moiety (e.g. a viologen moiety) in the same ionic liquid.

Examples of cathodic moieties of bifunctional redox dyes of the present invention include those defined by the following structural formulae:

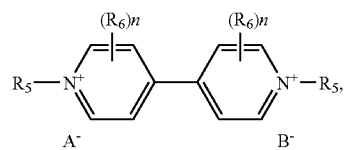

-continued

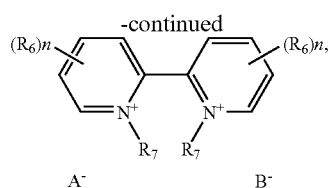

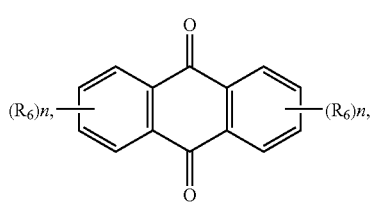

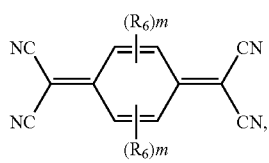

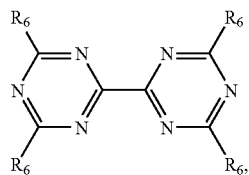

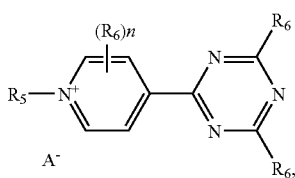

wherein $R_5$ is independently selected from alkyl $C_1$ to $C_{20}$, alkynyl $C_2$ to $C_{20}$, and aryl $C_5$ to $C_{20}$. $R_5$ may optionally contain one or more of an ester, carboxylic acid, metal carboxylate, ether, aryl, amine, urethane, ammonium, thioester, alkene, and alkyne functional group, and additionally may function as a bridge to an energy receptor moiety. $R_6$ is independently selected from hydrogen, alkyl $C_1$ to $C_{10}$, alkynyl $C_2$ to $C_{10}$, aryl $C_5$ to $C_{20}$, and may optionally contain one or more of an ester, carboxylic acid, metal carboxylate, ether, aryl, amine, urethane, ammonium, thioester, alkene, and alkyne functional groups, and additionally may function as a bridge to an energy receptor moiety. $R_7$ is independently selected from alkyl $C_1$ to $C_5$ or an ethyl, propyl or ethylene bridge. In these formulas, n=0-4 and m=0-2. Anion $A^-$ is a trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) or tris(trifluoromethylsulfonyl)methide (($CF_3SO_2)_3C^-$) anion, and anion $B^-$ is a halogen anion, $ClO_4^-$, $BF_4^-$, $PF_6^-$, $AsF_6^-$, $SbF_6^-$, $CH_3COO^-$, $CH_3(C_6H_4)SO_3^-$, trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) or tris(trifluoromethylsulfonyl)methide (($CF_3SO_2)_3C^-$) anion. Energy receptor moieties include those having the following chemical structures:

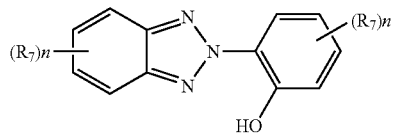

and

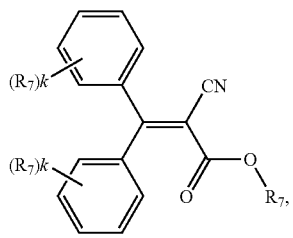

wherein $R_7$ is independently selected from alkyl $C_1$ to $C_{20}$, alkynyl $C_2$ to $C_{20}$, and aryl $C_5$ to $C_{20}$, and may optionally contain one or more of an ester, carboxylic acid, metal carboxylate, ether, aryl, amine, urethane, ammonium, thioester, alkene, and alkyne functional group, and additionally may function as a bridge to the energy receptor moiety. In these formulas, n=0-4 and k=0-5. Any of the above cathodic moieties when suitably bridged to any of the energy receptor moieties forms a bifunctional redox dye, and all of these compounds are examples of bifunctional redox dyes of the invention.

Examples of anodic moieties of bifunctional redox dyes of the present invention include those defined by the following structural formulae:

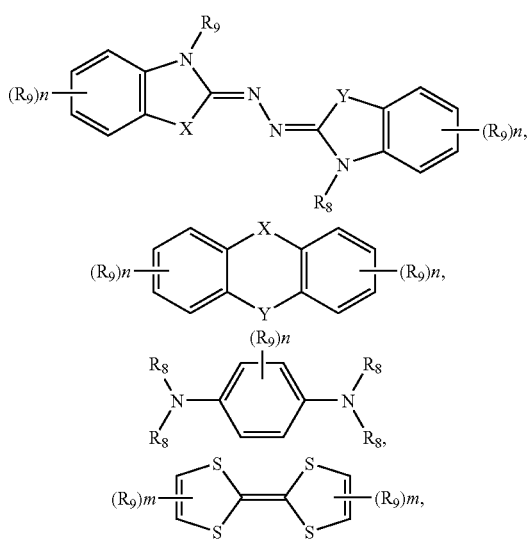

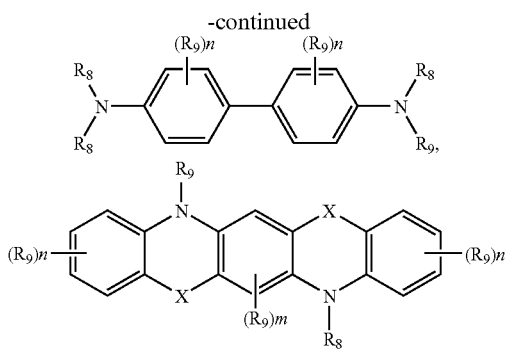

wherein X and Y are independently selected from NH, NR$_8$, S, and O. R$_8$ is independently selected from alkyl C$_1$ to C$_{20}$, alkynyl C$_2$ to C$_{20}$, and aryl C$_5$ to C$_{20}$ and may optionally contain one or more of an ester, carboxylic acid, metal carboxylate, ether, aryl, amine, urethane, ammonium, thioester, alkene, and alkyne functional group, etc, and additionally may function as a bridge to an energy receptor moiety. R$_9$ is independently selected from alkyl C$_1$ to C$_{10}$, alkyl C$_2$ to C$_{10}$, aryl C$_5$ to C$_{20}$, and may optionally contain one or more of an ester, carboxylic acid, metal carboxylate, ether, aryl, amine, urethane, ammonium, thioester, alkene, and alkyne functional group, and additionally may function as a bridge to an energy receptor moiety, and n=0-4, and m=0-2. The energy receptor moiety is one having the structure

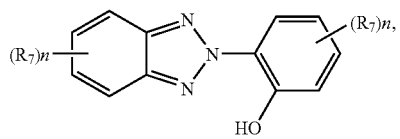

or having the structure

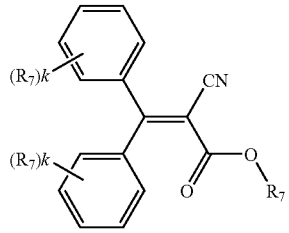

wherein R$_7$ is independently selected from alkyl C$_1$ to C$_{20}$, alkynyl C$_2$ to C$_{20}$, and aryl C$_5$ to C$_{20}$ and may optionally contain one or more of an ester, carboxylic acid, metal carboxylate, ether, aryl, amine, urethane, ammonium, thioester, alkene, and alkyne functional group, and additionally may function as a bridge to the energy receptor moiety, and n=0-4, and k=0-5. These compounds, which have both an anodic dye moiety and an energy receptor moiety in the same molecule are also examples of bifunctional redox dyes of the invention, and when they are oxidized in ionic liquid solvent, a radical cation is formed that is charge counterbalanced with the anion from the ionic liquid solvent.

An important aspect of the invention is that the bifunctional redox dyes of the invention are soluble in the preferred ionic liquid solvents of the invention in their oxidized, reduced and intermediate states. These dyes are reduced and/or oxidized in the device when the voltage is applied. This oxidation or reduction is reversible. Furthermore, one or more of the oxidized or reduced species should be different in color as compared to its earlier state (before application of the voltage). It should be understood that these species are also redox dyes. The dyes reduced at the cathode are cathodic dyes and the dyes oxidized at the anode are anodic dyes. In an invention device of the type shown in FIG. 1a and FIG. 1b, several of these may be present, but at least one cathodic or one anodic dye should be present in the electrolyte.

Preferred anionic dyes include dyes that are capable of producing a red color when oxidized.

A bifunctional redox dye may include in a single molecule, both an anodic moiety and a cathodic moiety, and this type of dye may undergo both oxidation and reduction at the two electrodes.

Preferred cathodic moieties of the bifunctional dyes of the invention include viologens, which are cationic. Preferred viologens are N,N'-diethylviologen ("ethyl viologen"), N,N'-dimethylviologen ("methyl viologen") and N,N'-dibenzylviologen ("benzyl viologen") associated with fluorine containing anions such as BF$_4^-$, PF$_6^-$, AsF$_6^-$, SbF$_6^-$, trifluoromethylsulfonate (CF$_3$SO$_3^-$), bis(trifluoromethylsulfonyl)imide ((CF$_3$SO$_2$)$_2$N$^-$), bis(perfluoroethylsulfonyl)imide ((CF$_3$CF$_2$SO$_2$)$_2$N$^-$) and tris(trifluoromethylsulfonyl)methide ((CF$_3$SO$_2$)$_3$C$^-$). Preferred anions are trifluoromethylsulfonate (CF$_3$SO$_3^-$), bis(trifluoromethylsulfonyl)imide ((CF$_3$SO$_2$)$_2$N$^-$), bis(perfluoroethylsulfonyl)imide ((CF$_3$CF$_2$SO$_2$)$_2$N$^-$) and tris(trifluoromethylsulfonyl)methide ((CF$_3$SO$_2$)$_3$C$^-$).

Preferred anodic moieties of the bifunctional dyes of the present invention include metallocenes (particularly ferrocenes), phenazines, phenothiazines, fulvalenes, and substituted 1,4- or 1,2-phenylenediamines, including their derivatives and combinations. Some preferred phenazines are 5,10-dihydro-5,10-dimethylphenazine; 5,10-dihydro-5,10-diethylphenazine; 5,10-dihydro-5,10-dioctylphenazine or any other 5,10-dihydro-5,10-dialkyphenazine. Preferred phenylenediamines include TMPD (N,N,N',N'-tetramethylphenyldiamine) and TMBZ (N,N,N',N'-tetramethylbenzydine). A preferred fulvalene is tetrathiafulvalene. For a listing of ferrocene derivatives useful with the invention, see U.S. Pat. No. 6,317,248 to Agrawal entitled "Busbars for Electrochemically Powered Cells," which issued on Nov. 13, 2001, and PCT application WO 01/63350 to Lomprey entitled "Substituted Metallocenes for use as Anodic Electrochromic Materials, and Electrochromic Media and Devices Comprising the Same," both incorporated by reference herein. Preferred ferrocenes of the invention include electron-donating groups that are attached to one or both of the cyclopentadiene rings, such as tertiarybutylferrocene and decamethylferrocene. Some of these anodic dyes may have to be fluorinated to increase their solubility in specific ionic solvents. Typically, the concentration of any of the dyes (cathodic and anodic) is less than 0.1 molar, preferably less than 0.05 molar.

At least one of the cathodic or anodic moieties of the bifunctional redox dye must be electrochromic in the reduced or the oxidized state with an absorption in the visible region of the electromagnetic radiation. As the dye moiety reversibly goes back to its non-activated form, the absorption should also reverse, meaning either shift or decrease to its earlier state.

Two or more separate dye compounds are often used with electrochromic devices to control the device properties such as the color of the device, the kinetics, etc. (see, for example, U.S. Pat. No. 6,141,137 to Byker et al. entitled "Electrochromic Media for Producing a Preselected Color," which issued on Oct. 31, 2000, incorporated by reference herein). Electrochemical considerations for choosing dyes are given in U.S. Pat. No. 4,902,108 (vide supra).

Some embodiments of the invention involve the introduction of those dyes that can be used to make EC devices that darken to a neutral color. Typically, commercial EC devices with EC dyes, upon darkening, darken to bluish and greenish colors. This is particularly seen for automotive mirrors. These mirrors generally employ viologens (cathodic dyes) that color to a deep blue state. Anodic dyes that color in the red region when used with viologens in the same device can lead to more neutral colors. In the automotive industry, a way of neutralizing the color is to tune the thickness of the coatings (such as from a transparent conductor) to result in more neutral colors (grays, for example) due to interference effects. However, these devices during transition go through their native colors as this neutralization is done passively. In the devices, color tuning may be done by changing the thickness of the transparent conductor and refractive index in the front, but these provide neutral darkening at all useful potentials and during transition period from one optical state to the other (active darkening) as the anodic and cathodic moieties are complimentary in terms of color absorption (in the colored state) and have high extinction coefficients. Sometimes complimentary materials do not lead to neutral colors as one of these may have high extinction coefficients compared to the other. The dye of this invention may be used as an anodic dye with cathodic dyes (such as viologens) or it may be made into a single bifunctional molecule by covalent coupling to a cathodic moiety (e.g. viologens) or by combining them electrostatically with cathodic moieties to form charge transfer complexes. Dyes such as the dication of octamethoxytetraphenylene have $\lambda_{max}$=521 nm and a high molar absorptivity of $\epsilon$=31,000 $M^{-1}$ $cm^{-1}$, whereas the radical cation 1,4:5,8-dimethano-1,2,3,4,5,6,7,8-octahydro-9,10-dimethoxyanthracenium have $\lambda_{max}$=518 nm and a medium molar absorptivity of $\epsilon$=7300 $M^{-1}$ $cm^{-1}$. Dyes with different degrees of molar absorption and absorbing in different parts of the spectrum may be mixed together in a single device to get the required color when darkened by applying the voltage. Such devices typically use maximum potentials of about 2V, generally less than 1.5V. For grey scale or degree of darkening control, potentials from about 0 to the maximum are used. Beyond the maximum voltage the cyclic durability of the device may be compromised or will have no impact on coloration. Moreover the red dye may be employed in an electrochromic device where a red color is desired, such as a display pixel.

Dyes that color to red when oxidized have been reported by Rathore et al. in "Preparation and Structures of Crystalline Aromatic Cation-Radical Salts. Triethyloxonium Hexachloroantimonate as a Novel (One-Electron) Oxidant" J. Org. Chem. 1998, 63, 5847-5856, represented by the structural formulae

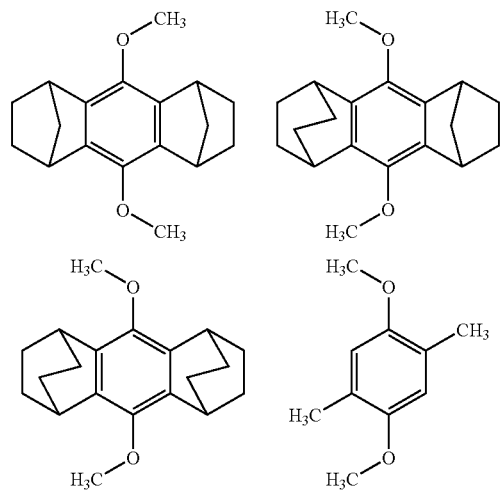

or by Rathore et al. in "A Redox-Controlled Molecular Switch Based on the Reversible C—C Bond Formation in Octamethoxytetraphenylene" Angew. Chem. Int. Ed. 2000, 39(4), 809-810 represented by the structural formula

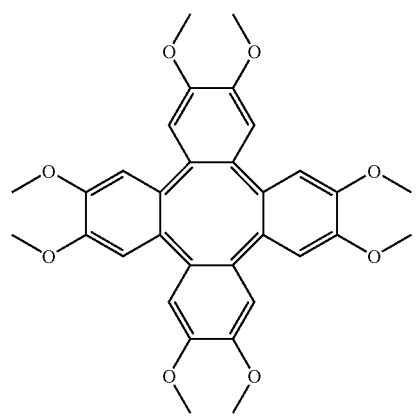

Bifunctional redox dyes having an anodic moiety and a cathodic moiety in the same molecule have recently been reported. Examples of these types of compounds can be found in U.S. Pat. No. 6,372,159 to Bemeth et al. entitled "UV-Protected Electrochromic Solution," which issued on Apr. 16, 2002, in U.S. Pat. No. 6,519,072 to Nishikitani et al., entitled "Electrochromic Device," which issued Feb. 11, 2003, in U.S. Pat. No. 6,241,916 to Claussen et al., entitled "Electrochromic system," which issued Jun. 5, 2001, and in PCT application WO 01/163350 to Lomprey et al. (vide supra), all incorporated by reference herein. The U.S. Pat. Nos. 6,519,072 and 6,241,916 describe dyes where the anodic and the cathodic dyes are not separate molecules, but instead, each is present as either an anodic moiety or a cathodic moiety, and connected in the same molecule. The cyclic voltammogram of such a molecule displays at least one reduction peak and at least one oxidation peak that are derived from the compound when measured from the resting state (i.e. when there is no applied electrochemical potential). Either the reduction or oxidation process, and preferably both the reduction and oxidation processes, are accompanied by an increase in the molar extinction coefficient at least one wavelength in the visible range.

The present invention includes bifunctional redox dyes having a cathodic moiety covalently bridged to an anodic moiety. These compounds often have good UV stability. An example of such a UV stable dye is produced when a ferrocene moiety is coupled with a viologen moiety using an appropriate linker or bridge, and it was shown that a material of this type provides both anodic and cathodic redox in the electrolytes for electrochromic devices using conventional non-ionic solvents.

Bifunctional redox dyes having anodic and cathodic moieties may be bridged with energy receptor moiety display to increase their UV stability even more. These types of dyes, when used with ionic liquid solvents according to the present invention are expected to provide electroptic devices that would be most suitable for outside environment use, both in colored and bleached states. Some modifications to the UV stabilizers for use in conventional non-ionic solvents are given as an example in U.S. Patent Application Publication 20030030883 to Giri et al. entitled "Ultraviolet Stabilizing Materials Having a Solubilizing Moiety," which was published on Feb. 13, 2003.

The present invention includes bifunctional compounds having both anodic and cathodic moieties, wherein one or more are cationic moieties in the resting state, oxidized state, or reduced state, and are charge balanced by and anion such as $Cl^-$, $Br^-$, $BF_4^-$, $PF_6^-$, $ClO_4^-$, $SbF_6^-$, $AsF_6^-$, $CH_3COO^-$, and $CH_3(C_6H_4)SO_3^-$. The preferred embodiment of this invention employs anions of the form trifluoromethylsulfonate $(CF_3SO_3^-)$, bis(trifluoromethylsulfonyl)imide $((CF_3SO_2)_2N^-)$, bis(perfluoroethylsulfonyl)imide $((CF_3CF_2SO_2)_2N^-)$ and/or tris(trifluoromethylsulfonyl)methide $((CF_3SO_2)_3C^-)$, preferably by bis(trifluoromethylsulfonyl)imide $((CF_3SO_2)_2N^-)$. These compounds may be synthesized by anion exchange, for example, by reacting the salts described in U.S. Pat. No. 6,519,072 (vide supra) with lithium bis(trifluoromethylsulfonyl)imide $(Li(CF_3SO_2)_2N^-)$ in water. Alternatively, compounds in which some of the cationic charges are balanced with bis(trifluoromethylsulfonyl)imide anions may be synthesized by the electrochemical oxidation of the anodic moiety (e.g. a ferrocene moiety) in an ionic liquid solvent that includes bis(trifluoromethylsulfonyl)imide anions. Compounds in which some of the cationic charges are balanced with bis(trifluoromethylsulfonyl)imide anions may also be synthesized by the electrochemical reduction and re-oxidation of the cationic moiety (e.g. a viologen moiety) in an ionic liquid that includes bis(trifluoromethylsulfonyl)imide anions. The present invention also includes the use of these compounds in an electrooptic device.

Preferably, the cathodic moiety of bifunctional dyes of the invention includes viologens (which have a bipyridinium ion-pair structures) or anthraquinones, while the anodic moiety has a pyrazoline, metallocene, phenylenediamine, benzidine, phenazine, phenoxadine, phenothiazine, or tetrathiafulvalene structure, or is a metal salt that can be oxidized in the ionic liquid solvent.

Electrochromic compounds in which the anodic and cathodic moieties are present in the same molecule, and preferably including at least one anion that is the same as the anion of the ionic liquid solvent (only if ionic liquids are used), preferably include viologens with a bipyridinium ion-pair structure represented by the structural formula

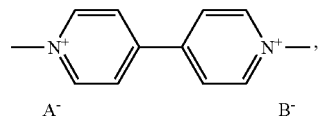

which exhibits cathodic electrochromic characteristics, and a metallocene structure represented by formulae

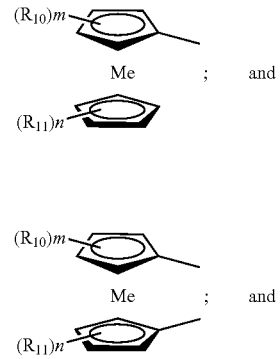

which exhibits anodic electrochromic characteristics. For these compounds, $A^-$ is selected from trifluoromethylsulfonate $(CF_3SO_3^-)$, bis(trifluoromethylsulfonyl)imide $((CF_3SO_2)_2N^-)$, bis(perfluoroethylsulfonyl)imide $((CF_3CF_2SO_2)_2N^-)$ and tris(trifluoromethylsulfonyl)methide $((CF_3SO_2)_3C^-)$, and $B^-$ is selected from halogen anion, $ClO_4^-$, $BF_4^-$, $PF_6^-$, $AsF_6^-$, $SbF_6^-$, $CH_3COO^-$, and $CH_3(C_6H_4)SO_3^-$, trifluoromethylsulfonate $(CF_3SO_3^-)$, bis(trifluoromethylsulfonyl)imide $((CF_3SO_2)_2N^-)$, bis(perfluoroethylsulfonyl)imide $((CF_3CF_2SO_2)_2N^-)$ and tris(trifluoromethylsulfonyl)methide $((CF_3SO_2)_3C^-)$. $R_{10}$ and $R_{11}$ are each independently a hydrocarbon group selected from alkyl, alkenyl and aryl groups having 1 to 10 carbon atoms. For the case where $R_{10}$ or $R_{11}$ is an aryl group, the aryl group may form a condensed ring together with a cyclopentadienyl ring. Also, m=0-4, n=0-4, and Me represents Cr, Co, Fe, Mn, Ni, Os, Ru, V, Mo(X)(Q), Nb(X)(Q), Ti(X)(Q), V(X)(Q) or Zr(X)(Q) wherein X and Q are each independently selected from hydrogen, halogen, an alkyl group having 1 to 12 carbon atoms, $ClO_4^-$, $BF_4^-$, $PF_6^-$, $AsF_6^-$, $SbF_6^-$, $CH_3COO^-$, and $CH_3(C_6H_4)SO_3^-$, trifluoromethylsulfonate $(CF_3SO_3^-)$, bis(trifluoromethylsulfonyl)imide $((CF_3SO_2)_2N^-)$, bis(perfluoroethylsulfonyl)imide $((CF_3CF_2SO_2)_2N^-)$ and tris(trifluoromethylsulfonyl)methide $((CF_3SO_2)_3C^-)$. Examples of the alkyl group are methyl, ethyl, i-propyl, n-propyl, n-butyl, t-butyl, n-pentyl, n-hexyl, and cyclohexyl groups. The aryl group is exemplified by the phenyl group. Particularly preferred are methyl, ethyl, and propyl groups. In the case where $R_{10}$ or $R_{11}$ is an aryl group, the aryl group may form a condensed ring by bonding to a cyclopentadienyl ring, and $R_{10}$ or $R_{11}$ may be a group cross-linking two cyclopentadienyl rings in the metallocene structure. Both m and n are preferably 0 or 1, and particularly preferably 0. Me is preferably Fe.

Preferred electrochromic compounds in which the anodic and cathodic moieties are present in the same molecule, and including at least one cationic moiety, are metallocene-bipyridine derivatives represented by the following formulae:

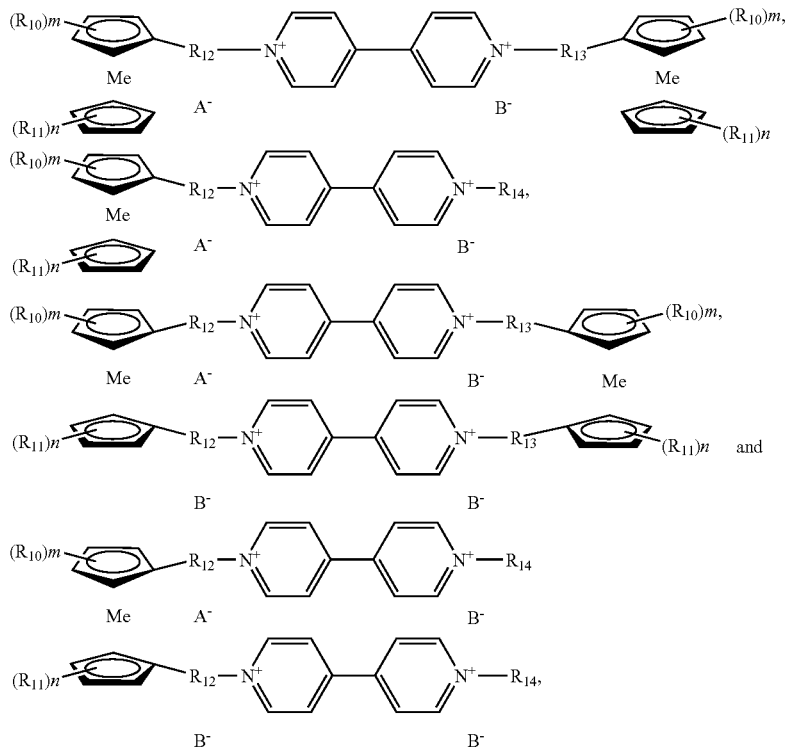

wherein A⁻ is selected from trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$), and B⁻ is selected from halogen anion, $ClO_4^-$, $BF_4^-$, $PF_6^-$, $AsF_6^-$, $SbF_6^-$, $CH_3COO^-$, $CH_3(C_6H_4)SO_3^-$, trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$). $R_{10}$ and $R_{11}$ are each independently a hydrocarbon group selected from an alkyl group, alkenyl group, or aryl group having 1 to 10 carbon atoms. In the case where $R_{10}$ or $R_{11}$ is an aryl group, the aryl group may form a condensed ring together with a cyclopentadienyl ring. Also, m=0-4 and n=0-4. $R_{12}$ and $R_{13}$ are each independently a hydrocarbon residue having 1 to 20, preferably 1 to 10 carbon atoms, and $R_{14}$ is a hydrocarbon group selected from alkyl, cycloalkyl, alkenyl, aryl, or aralkyl group having 1 to 20 carbon atoms, preferably 1 to 10 carbon atoms, a heterocyclic group having 4 to 20 carbon atoms, preferably 4 to 10 carbon atoms, and a substituted hydrocarbon or heterocyclic group obtained by substituting one or more hydrogen atoms of the hydrocarbon group or heterocyclic group with a substituent group. Me represents Cr, Co, Fe, Mn, Ni, Os, Ru, V, Mo(X)(Q), Nb(X)(Q), Ti(X)(Q), V(X)(Q) or Zr(X)(Q) wherein X and Q are each independently selected from hydrogen, halogen, an alkyl group having 1 to 12 carbon atoms, $ClO_4^-$, $BF_4^-$, $PF_6^-$, $AsF_6^-$, $SbF_6^-$, $CH_3COO^-$, and $CH_3(C_6H_4)SO_3^-$, trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$). Examples of the hydrocarbon residue for $R_{12}$ and $R_{13}$ are hydrocarbon groups such as alkylene groups and various divalent groups having an ester-bond unit, ether-bond unit, amide-bond unit, thioether-bond unit, amine-bond unit, urethane-bond unit, or silyl unit in the part of hydrocarbon groups. The divalent group having an ester-bond unit may be exemplified by those represented by the formula —R—COO—R— or —R—OCO—R— wherein R is an alkylene group having 1 to 8 carbon atoms. Specific examples of the ester-bond unit are —$C_4H_8$—COO—$C_2H_4$—, —$C_4H_8$—OCO—$C_2H_4$—, —$C_4H_8$—COO—$C_4H_8$—, and —$C_4H_8$—OCO—$C_4H_8$—. The divalent group having an ether-bond unit may be exemplified by those represented by the formula —R—O—R— wherein R is an alkylene group having 1 to 10 carbon atoms. Specific examples of the ether-bond unit are —$C_4H_8$—O—$C_2H_4$— and —$C_4H_8$—O—$C_4H_8$—. The divalent group having an amide-bond unit may be exemplified by those represented by the formula —R—CONH—R— or —R—NHCO—R— wherein R is an alkylene group having 1 to 8 carbon atoms. Specific examples of the amide-bond unit are —$C_4H_8$—CONH—$C_2H_4$—, —$C_4H_8$—NHCO—$C_2H_4$—, —$C_4H_8$—CONH—$C_4H_8$—, and —$C_4H_8$—NHCO—$C_4H_8$—. The divalent group having a thioether-bond unit may be those represented by the formula —R—S—R- wherein R is an alkylene group having 1 to 10 carbon atoms. Specific examples of the thioether-bond unit are —$C_4H_8$—S—$C_2H_4$— and —$C_4H_8$—S—$C_4H_8$—. The divalent group having an amine-bond unit may be exemplified by those represented by the formula —R—NH—R— wherein R is an alkylene group having 1 to 10 carbon atoms and the formula —R—NH—Ph— wherein R is an alkylene group having 1 to 10 carbon atoms and Ph is an arylene group or a substituted arylene group having 1 to 12 carbon atoms. Specific examples of the amine-bond unit are —$C_4H_8$—NH—$C_2H_4$— and —$C_4H_8$—NH—$C_4H_8$—. The divalent group having a urethane-bond unit may be exemplified by those represented by the formula —R—OCONH—R— or —R—NHCOO—R— wherein R is an alkylene group having 1 to 8 carbon atoms. Specific examples of the urethane-bond unit are —$C_4H_8$—OCONH—$C_2H_4$—, —$C_4H_8$—NHCOO—$C_4H_8$—, —$C_4H_8$—OCONH—$C_4H_8$—, and —$C_4H_8$—NHCOO—$C_4H_8$—. The divalent groups having a silyl-bond unit may be represented by those represented by the formula —R—Si(R')$_2$—R— wherein R is an alkylene group having 1 to 8 carbon atoms and R' is methyl or ethyl. Specific examples of the silyl-bond unit are —$C_4H_8$—Si(CH$_3$)$_2$—$C_2H_4$—, —$C_4H_8$—Si(CH$_3$)$_2$—$C_4H_8$—, —$C_4H_8$—Si(C$_2$H$_5$)$_2$C$_2$H$_4$—, and —$C_4H_8$—Si(C$_2$H$_5$)$_2$—$C_4H_8$—. Examples of the alkyl group for $R_{14}$ are methyl, ethyl, i-propyl, n-propyl, n-butyl, t-butyl, n-pentyl, n-hexyl, and n-heptyl groups. An example of the cycloalkyl group is cyclohexyl. Examples of the aryl group are phenyl, tolyl, xylyl, and naphthyl. Examples of the alkenyl group are vinyl and allyl groups. Examples of the aralkyl group are benzyl and phenylpropyl groups. Examples of the heterocyclic aromatic group are 2-pyridyl, 4-pyridyl, 2-pyrimidyl, and isoquinoline groups. In the case where $R_{14}$ is a substituted hydrocarbon residue or heterocyclic group, examples of the substituent are alkoxy, alkoxycarbonyl, and acyl group having 1 to 10, preferably 1 to 5 carbon atoms, halogen, and cyano (—CN group), hydroxyl, nitro, and amino groups. Examples of the alkoxy group are methoxy and ethoxy groups. The alkoxycarbonyl group is exemplified by methoxycarbonyl. The acyl group is exemplified by acetyl. Examples of the halogen group are Cl and F. Examples of the substituted hydrocarbon residue are methoxyphenyl, chlorophenyl, fluorophenyl, methoxychlorophenyl, cyanophenyl, acetylphenyl, methoxycarbonylphenyl, and methoxynapthyl groups.

These metallocene-bipyridine bifunctional redox dyes of the invention may be synthesized by first synthesizing a precursor as described in U.S. Pat. No. 6,519,072 (vide supra) and then exchanging some or all of the anions by, for example, suspending or dissolving the precursor in water and combining it with an excess of lithium bis(trifluoromethylsulfonyl)imide. A precipitate forms, is collected, and then recrystallized to obtain the purified ferrocene-bipyridine bis(trifluoromethylsulfonyl)imide.

U.S. Pat. No. 6,241,916 to Claussen et al. (vide supra) describes bifunctional redox dyes having a covalent bridge that separates an anodic moiety from a cathodic moiety. Many of these dyes include anions such as tetrafluoroborate, perchlorate, methanesulfonate, trifluoromethanesulfonate, perfluorobutanesulfonate, benzenesulfonate, hexafluorophosphate, hexafluoroarsenate and hexafluorosilicate ($SiF_6^{2-}$), perfluorinated main group compounds, sulfonates, and perchlorate, but none include sulfonamides or perfluorosulfonylimides. By contrast, bifunctional dyes of the present invention include at least one anion selected from bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$). Preferably, all of the anions are bis(trifluoromethylsulfonyl)imide (($CF_3SO_2)_2N^-$), bis(perfluoroethylsulfonyl)imide (($CF_3CF_2SO_2)_2N^-$) or tris(trifluoromethylsulfonyl)methide (($CF_3SO_2)_3C^-$). And more preferably, all of the anions are bis(trifluoromethylsulfonyl)imide (($CF_3SO_2)_2N^-$). The present invention also includes the radical cations of these dyes with these same anions.

The invention is also concerned with an electrolyte medium comprising a compound of the formula

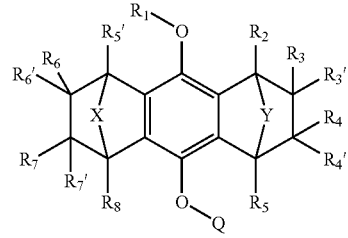

wherein Q is $R_{1'}$ or a group of the formula

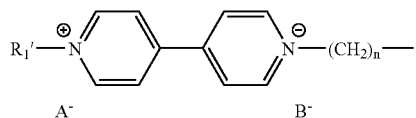

wherein n=1-10, wherein A— and B— are counterions;

wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein X and Z are independently selected from 0, —C($R_9$)($R_{9'}$)— and —(C($R_9$)($R_{9'}$)C($R_{10}$)($R_{10'}$))—;

wherein $R_2$, $R_3$, $R_{3'}$, $R_4$, $R_{4'}$, $R_5$, $R_{5'}$, $R_6$, $R_{6'}$, $R_7$, $R_{7'}$, $R_8$, $R_9$, $R_{9'}$, $R_{10}$, $R_{10'}$, are independently selected from hydrogen, alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

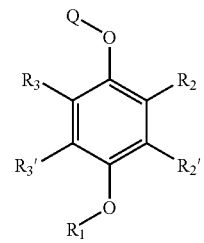

wherein Q is $R_{1'}$ or a group of the formula

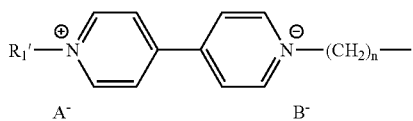

wherein n=1-10, wherein A— and B— are counterions;

wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_2$, $R_{2'}$, $R_3$, $R_{3'}$, are independently selected from hydrogen, alkyl having 1-20 carbons, alkyl carboxylic acid having 1-20 carbons, alkyl phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

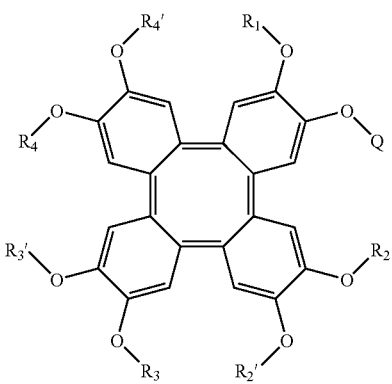

wherein Q is $R_{1'}$ or a group of the formula

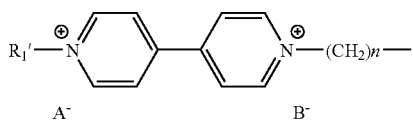

wherein n=1-10, wherein A— and B— are counterions; and wherein $R_1$, $R_{1'}$, $R_2$, $R_{2'}$, $R_3$, $R_{3'}$, $R_4$, $R_{4'}$, are independently selected from alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons. Counterions $A^-$ and $B^-$ can be any counterion. Preferred counterions for $A^-$ include, but are not limited to, trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$), and preferred counterions for $B^-$ include, but are not limited to, halogen anion, $ClO_4^-$, $BF_4^-$, $PF_6^-$, $AsF_6^-$, $SbF_6^-$, $CH_3COO^-$, $CH_3(C_6H_4)SO_3^-$, trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris (trifluoromethylsulfonyl)methide (($CF_3SO_2)_3C^-$). Exemplary bifunctional dyes include compounds of the formula

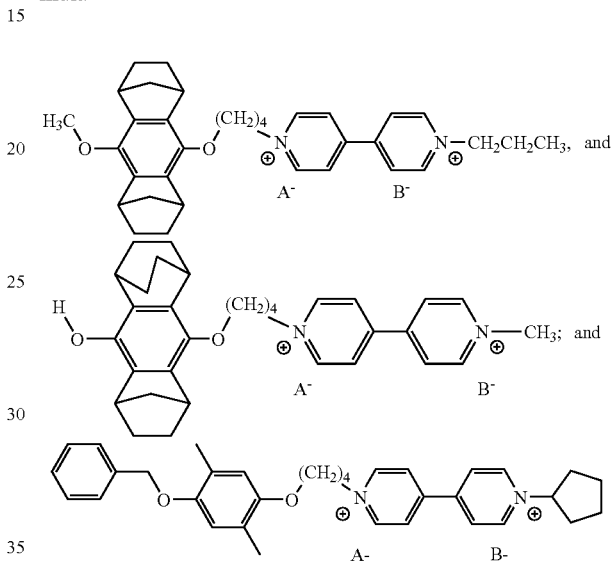

wherein $A^-$ and $B^-$ are bis(trifluoromethylsulfonyl)imide (($CF_3SO_2)_2N^-$).

The electrochromic system according to the invention includes bifunctional dyes having the formula $Cat_1$-$An_1$, or having the formula $Cat_1$-$Bridge_1$-$An_1$, or having the formula $Cat_1$-$Bridge_1$-$An_1$-$Bridge_2$-$Cat_2$, or having the formula $An_2$-$Bridge_2$-$Cat_1$-$Bridge_1$-$An_1$, in which $Cat_1$ and $Cat_2$ independently represent cathodic moieties, and $An_1$ and $An_2$ independently represent anodic moieties. $Bridge_1$ and $Bridge_2$ independently represent a bridge member. These bifunctional redox dyes include at least one anion selected from bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$). The present invention also includes the radical cations of these dyes having these anions. Preferably, $Cat_1$ and $Cat_2$ independently represent the following structural formulae:

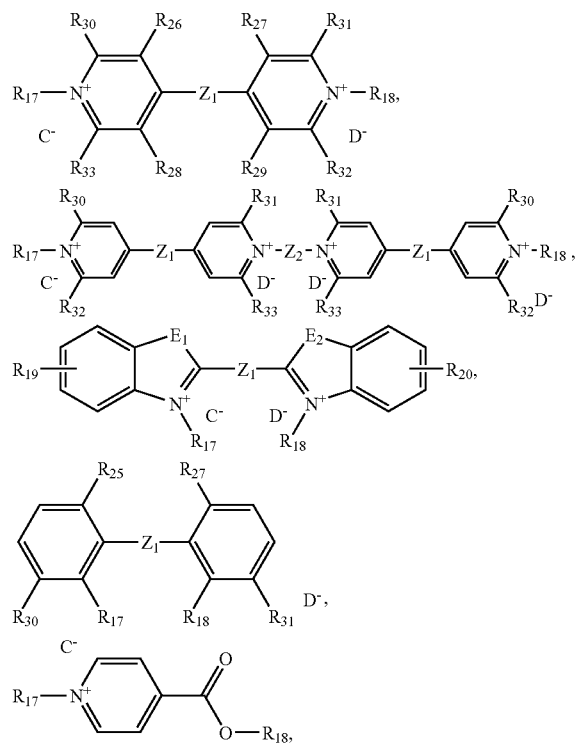

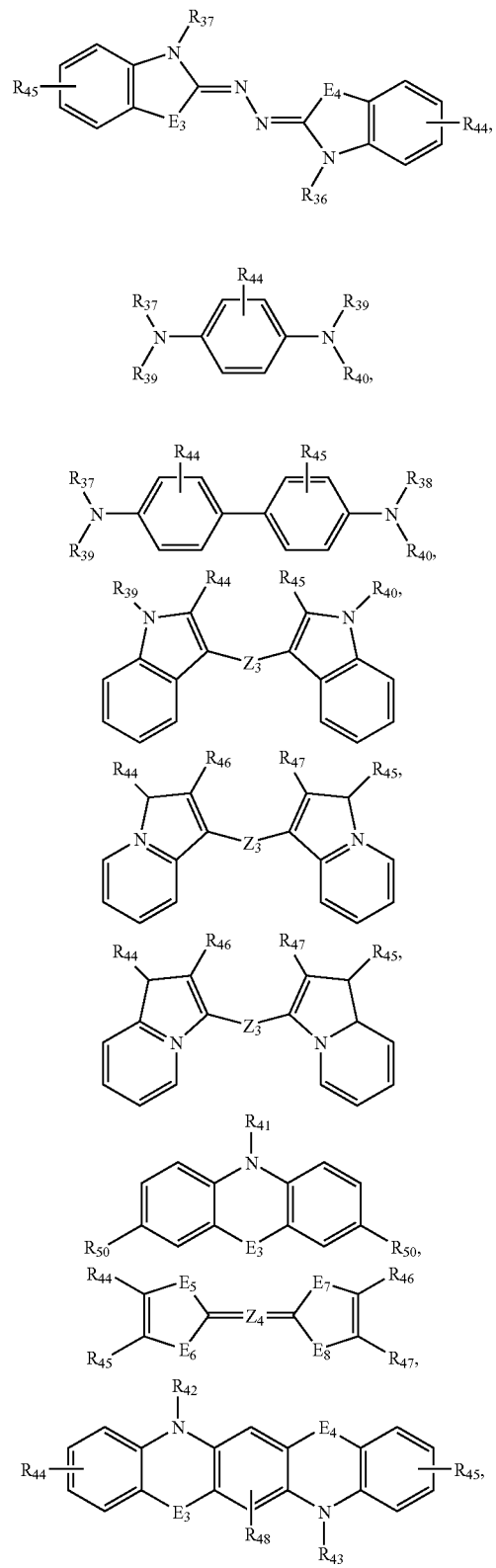

Bridge₁ or Bridge₂ is effected via one of the radicals $R_{17}$-$R_{36}$, and the radicals mentioned then represent a direct bond. $An_1$ and $An_2$ independently represent one of the following structural formulae:

in which $R_{17}$ and $R_{18}$ independently of one another denote $C_1$ to $C_{18}$ alkyl, $C_2$ to $C_{12}$ alkenyl, $C_3$ to $C_7$ cycloalkyl, $C_7$ to $C_{15}$ aralkyl or $C_6$ to $C_{10}$ aryl or $R_{17}$ and $R_{18}$ together form a —(CH₂)₂—, —(CH₂)₃—, or —CH═CH— bridge. Groups $R_{19}$, $R_{20}$ and $R_{22}$ to $R_{25}$ independently of one another denote hydrogen, $C_1$ to $C_{18}$ alkyl, $C_1$ to $C_{18}$ alkoxy, halogen, cyano, nitro or $C_1$ to $C_{18}$ alkoxycarbonyl or $R_{22}$ and $R_{23}$ and/or $R_{24}$ and $R_{25}$ form a —CH═CH—CH═CH— bridge. Groups $R_{26}$, $R_{27}$, $R_{28}$ and $R_{29}$ independently of one another denote hydrogen or, in pairs, a —(CH₂)₂—, —(CH₂)₃— or —CH═CH— bridge, $E_3$ and $E_4$ independently of one another denote O, N—CN, C(CN)₂ or N—$C_6$ to $C_{10}$ aryl. Groups $R_{34}$ and $R_{35}$ independently denote hydrogen, $C_1$ to $C_{18}$ alkyl, $C_1$ to $C_{18}$ alkoxy, halogen, cyano, nitro, $C_1$ to $C_{18}$ alkoxycarbonyl or $C_6$ to $C_{10}$ aryl. $R_{30}$ to $R_{33}$ independently of one another denote hydrogen or $C_1$ to $C_6$ alkyl, or $R_{30}$ and $R_{26}$ and/or $R_{31}$ and $R_{27}$ form a —CH═CH—CH═CH— bridge. $E_1$ and $E_2$ independently of one another denote O, S, $NR_{36}$ or $C(R_{36})_2$ or $E_1$ and $E_2$ together form a —N—(CH₂)₂—N— bridge, $R_{36}$ denotes $C_1$ to $C_{18}$ alkyl, $C_2$ to $C_{12}$ alkenyl, $C_4$ to $C_7$ cycloalkyl, $C_7$ to $C_{15}$ aralkyl or $C_6$ to $C_{10}$ aryl. $Z_1$ denotes a direct bond, —CH═CH—, —C(CH₃)═CH—, —C(CN)═CH—, —CCl═CCl—, —C(OH)═CH—, —CCl═CH—, —C≡C—, —CH═N—N═CH—, —C(CH₃)═N—N═C(CH₃)— or —CCl═N—N═CCl—. $Z_2$ denotes —(CH₂)ᵣ— or —CH₂—C₆H₄—CH₂—, where r=1-0. C⁻ is selected from bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$), and D⁻ is selected from halogen anion, $ClO_4^-$, $BF_4^-$, $PF_6^-$, $AsF_6^-$, $SbF_6^-$, $CH_3COO^-$, $CH_3(C_6H_4)SO_3^-$, trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$), wherein bonding to the bridge member -continued

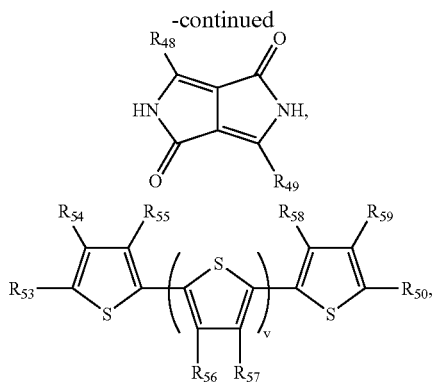

or $An_1$ or $An_2$ independently represent metal salts that include titanium (III), vanadium (III), vanadium (IV), iron (II), cobalt (II), copper (I), silver (I), indium (I), tin (II), antimony (III), bismuth (III), cerium (III), samarium (II), dysprosium (II), ytterbium (II), or europium (II). $R_{37}$ to $R_{43}$ independently of one another denote $C_1$ to $C_{18}$ alkyl, $C_2$ to $C_{12}$ alkenyl, $C_3$ to $C_7$ cycloalkyl, $C_7$ to $C_{15}$ aralkyl or $C_6$ to $C_{10}$ aryl, and $R_4$ to $R_{43}$ additionally denote hydrogen. $R_{44}$ to $R_{50}$ independently of one another denote hydrogen, $C_1$ to $C_{18}$ alkyl, $C_1$ to $C_{18}$ alkoxy, halogen, cyano, nitro, $C_1$ to $C_{18}$ alkoxycarbonyl or $C_6$ to $C_{10}$ aryl and $R_{48}$ and $R_{49}$ additionally denote an optionally benzo-fused aromatic or quasiaromatic five- or six-membered heterocyclic ring and $R_{50}$ additionally denotes $N(R_{51})$ $(R_{52})$. $R_{44}$ and $R_{45}$ and/or $R_{46}$ and $R_{47}$ form a —$(CH_2)_3$—, —$(CH_2)_4$—, —$(CH_2)_5$— or —CH=CH—CH=CH— bridge. $Z_3$ denotes a direct bond or a —CH=CH— or —N=N— bridge. =$Z_4$= denotes a direct double bond or a =CH—CH= or =N—N=bridge. $E_3$ to $E_4$, $E_{10}$ and $E_{11}$ independently of one another denote O, S, $NR_{51}$, $C(R_{51})_2$, C=O or $SO_2$. $E_5$ to $E_8$ independently of one another denote S, Se or $NR_{51}$. $R_{51}$ and $R_{52}$ independently of one another denote $C_1$ to $C_{12}$ alkyl, $C_2$ to $C_8$ alkenyl, $C_3$ to $C_7$ cycloalkyl, $C_7$ to $C_{15}$ aralkyl or $C_6$ to $C_{10}$ aryl. $R_{53}$ to $R_{60}$ independently of one another denote hydrogen, $C_1$ to $C_6$ alkyl, $C_1$ to $C_4$ alkoxy, cyano, $C_1$ to $C_4$ alkoxycarbonyl or $C_6$ to $C_{10}$ aryl, or $R_{53}$ and $R_{54}$ and $R_{59}$ and $R_{60}$ independently of one another together form a —$(CH_2)_3$—, —$(CH_2)_4$— or —CH=CH—CH=CH— bridge, v=0-10, and bonding to the bridge member $Bridge_1$ or $Bridge_2$ is effected by one of the radicals $R_{37}$-$R_{54}$, $R_{59}$, or $R_{60}$ and the radicals mentioned then represent a direct bond, and $Bridge_1$ or $Bridge_2$ independently represents a bridge member of the formula —$(CH_2)_n$— or —$(Y_1)_s$—$(CH_2)_m$—$(Y_2)_o$—$(CH_2)_p$—$(Y_3)_q$—, each of which is optionally substituted by $C_1$ to $C_4$ alkoxy, halogen or phenyl. $Y_1$ to $Y_3$ independently of one another represents O, S, $NR_{61}$, COO, CONH, NHCONH, cyclopentanediyl, cyclohexanediyl, phenylene, naphthylene, or beta-dicarbonyl. $R_{61}$ denotes $C_1$ to $C_6$ alkyl, $C_2$ to $C_6$ alkenyl, $C_4$ to $C_7$ cycloalkyl, $C_7$ to $C_{15}$ aralkyl or $C_6$ to $C_{10}$ aryl, n=0-12, m=0-8, p=0-12, o=0-6, q=0-1, and s=0-1.

It should also be understood that the invention also includes the corresponding radical anions of the aforementioned cathodic compounds, the radical anions being generated in situ during electrochemical reduction, and for charge balance, necessarily include ammonium cations of the type present in the ionic liquid solvent.

Electrochromic compounds of the invention also include bifunctional redox dyes having a redox active cathodic moiety that provides the dye with its color properties, and a redox active metal species such as titanium (III), titanium (IV), vanadium (III), vanadium (IV), vanadium (V), iron (II), iron (III), cobalt (II), cobalt (III), copper (I), copper (II), silver (I), silver (II), indium (I), indium (III), tin (II), tin (IV), antimony (III), antimony (V), bismuth (III), bismuth (V), cerium (III), cerium (IV), samarium (II), samarium (III), dysprosium (II), dysprosium (III), ytterbium (II), ytterbium (III), europium (II), europium (III). A specific example of such a material, which includes a bipyridinium ion pair structure and Eu, was prepared (see EXAMPLE 24).

EC devices of the present invention may also be prepared from electrolyte solutions of ionic liquid solvents, redox active cathodic dyes (viologens, for example) and a redox active metal in which the dye and metal form a bifunctional dye in the form of a metal-arene complex (metal-arene complexes are described in, for example, Niemeyer, "Sigma-Donor versus $\eta^6$-Arene Interactions in Monomeric Europium (II) and Ytterbium(II) Thiolates: An Experimental and Computational Study," Eur. J. Inorg. Chem. (2001), pp. 1969-1981).

Bifunctional redox dyes of the present invention that are in the form of metal-arene complexes have the formula

[$Cat_i$][M]

where M is a metal salt that includes a metal such as titanium (III), vanadium (III), vanadium (IV), iron (II), cobalt (II), copper (I), silver (I), indium (I), tin (II), antimony (III), bismuth (III), cerium (III), samarium (II), dysprosium (II), ytterbium (II), or europium (II). An example of this type of bifunctional dye was prepared (see EXAMPLE 23).

Figure 13:
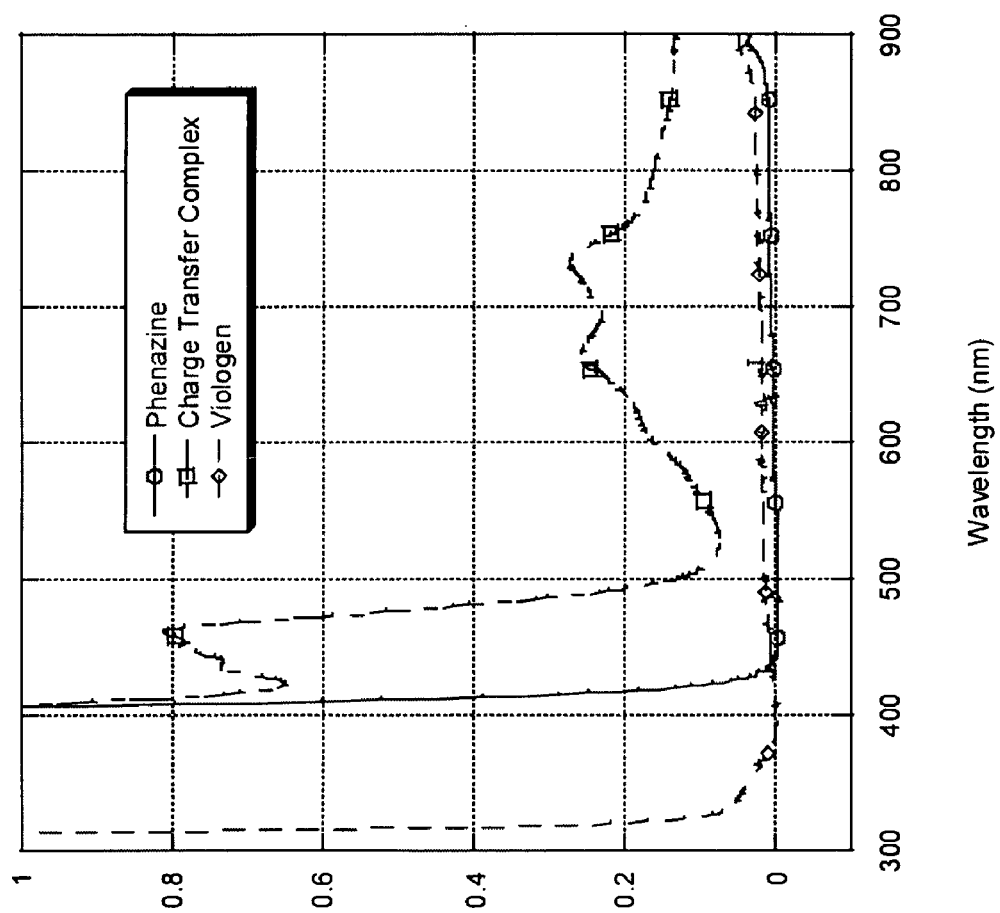
FIG. 13 shows the absorption spectra of a charge transfer complex and of the individual components.
Figure 14:
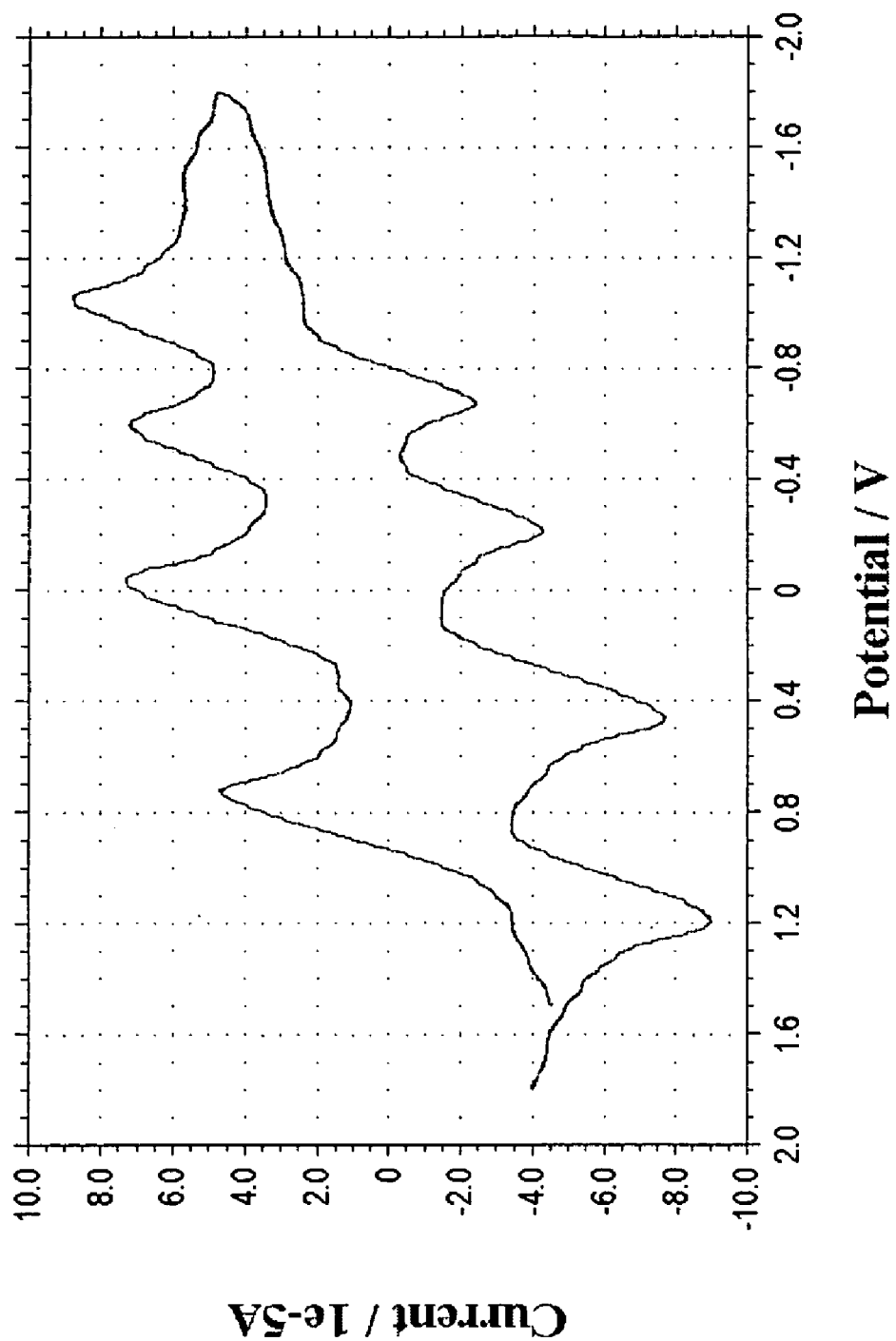
FIG. 14 shows a cyclic voltammogram of the charge transfer complex formed from 5,10-dihydro-5,10-dimethylphenazine and N,N'-diethylviologen bis(trifluoromethanesulfonyl) imide in N-butyl-N-methylpyrrolidinium bis(trifluoromethylsulfonyl)imide.

Another class of redox dyes used with the invention is the class of charge transfer compounds. Charge transfer compounds, sometimes referred to in the art as charge transfer complexes, include at least one electron rich aromatic compound and at least one electron deficient aromatic compound; the electron rich compound and electron deficient compound combine in ionic liquid solvent to form the charge transfer compound. The UV-VIS spectrum of the charge transfer compound is not a simple linear combination of the spectra of the electron rich compound and electron deficient constituents (see FIG. 13), and may have other properties such as enhanced solubility. The spectrum of the green, charge transfer compound formed by combining 5,10-dihydro-5,10-dimethylphenazine (a white compound) with diethyl viologen bis[bis(trifluoromethylsulfonyl)imide] (another white compound) in a 1:1 ratio includes absorption bands different from any present in the absorption spectra for either 5,10-dihydro-5,10-dimethylphenazine or N,N'-diethylviologen bis[bis(trifluoromethylsulfonyl)imide].

The present invention also includes electrooptic devices employing electrolyte solutions of charge transfer compounds dissolved in ionic liquids. The present invention also includes charge transfer compounds having anions that are redox-inert colorless anions, where at least one anion is chosen from bis(trifluoromethylsulfonyl)imide $((CF_3SO_2)_2N^-)$, bis(perfluoroethylsulfonyl)imide $((CF_3CF_2SO_2)_2N^-)$ and tris(trifluoromethylsulfonyl)methide $((CF_3SO_2)_3C^-)$. Preferably at least one anion is bis(trifluoromethylsulfonyl)imide $((CF_3SO_2)_2N^-)$. More preferably all of the anions are identical and chosen from bis(trifluoromethylsulfonyl)imide $((CF_3SO_2)_2N^-)$, bis(perfluoroethylsulfonyl)imide $((CF_3CF_2SO_2)_2N^-)$ and tris(trifluoromethylsulfonyl)methide $((CF_3SO_2)_3C^-)$. Most preferably, the only anion is bis(trifluoromethylsulfonyl)imide $((CF_3SO_2)_2N^-)$.

There are several other additives employed to change specific properties of the electrolyte solution of the invention.

One of these is a viscosity modifier. Viscosity modifiers can be soluble polymers and fillers such as fumed silica, fine alumina, etc. Additives also include co-solvents, such as other ionic and non-ionic liquids. Some of these are used to change the physical properties of the electrolyte solution, such as the melting point. Additives may also change electronic properties (speed of response, current/time characteristics) of the electrolyte, and thus of electrooptic devices of the invention employing the electrolyte, by changing the viscous drag on the dyes. Some of these, which are described in U.S. Pat. No. 5,140,455, decrease the leakage current or the back reaction.

Although ionic liquids are themselves conducting, other ionic species such as solid salts may also be added to depress their freezing points, change the ionic conductivity or provide other characteristics (e.g., ions for intercalation, etc.) as discussed later. In addition, the presence of high concentrations of ionic species may suppress the bleaching reaction.

A mixture of a conventional solvent (i.e. a non-ionic solvent) and an ionic liquid, or a mixture of two or more ionic liquids, provides electrolyte solutions with the high ionic concentrations of an ionic liquid and the low viscosity characteristic of conventional non-ionic solvents. Solvent mixtures may allow viscosity control, change in ionic conductivity, change in freezing point, change in kinetics of the electrooptic reactions, change in solubility (e.g. of other added ingredients such as dyes and UV stabilizers), enhanced processability, or other characteristics. Typically, it is preferred to keep the volume of a conventional organic solvent at less than 80% of the electrolyte solution, more preferably less than 30% and most preferably less than 20%. Another way of measuring the concentration is by molarity, i.e. moles of ions per liter of solution.

The concentration of ionic species in the electrolytes of EC devices is the sum-total of all the species that are salt-like (i.e. which have an anion and a cation) including ionic liquids, salts, dyes, etc. A preferred concentration of all ionic species in the electrolyte solution is greater than 1 mole/liter (molar, M) and more preferably greater than 2 M and most preferably greater than 3 M. Assuming no change in volume after mixing 1-butyl-3-imidazolium bis(trifluoromethanesulfonyl)imide and propylene carbonate in a 80%/20% mixture by volume, a 2.7 M concentration of the ionic species is present. The preferred concentrations of ionic species of the present invention are higher than those described in U.S. Patent Application Publication 20020021482. In this published application, suggested concentrations are in the range between about 0.1 M and 1 M. Also, no mention is made relating to the use of UV stable molten salts made from quaternary ammonium ions, or from the preferred anions of the present invention. One possible combination involving ionic liquids and non-ionic cosolvent additives is a 50:50 volume mix of a preferred ionic liquid n-butyl n-methylpyrrolidinium bis(trifluoromethanesulfonyl)imide (BMP) and propylene carbonate (PC). This mix results in a solution where the ionic concentration is 1.66 molar, assuming no change in volume occurs upon mixing the two liquids. The high ionic concentrations of the present invention are employed for increased durability, so that they dominate the electrolyte properties. For this, a concentration in excess of 1 molar of all ionic species is preferred, and more preferably in excess of 2 molar and most preferably in excess of 3 molar.

As shown in EXAMPLES 8 and 9 (vide infra), mixed ionic liquid-conventional solvent systems provide benefits such as lowered Tg, high coloration uniformity, and an acceptable leakage current (steady-state current).

The leakage current of a device is measured by applying a steady voltage to hold the device in a given state of optical transmission or reflection and then measuring the current in the steady state.

The most preferred non-ionic co-solvents used with the invention are propylene carbonate (PC), ethylene carbonate, sulfolane, methyl sulfolane, and gamma-butyrolactone. Many other solvents that can be used as co-solvents can be found in U.S. Pat. No. 6,245,262 to Varaprasad et al. (vide supra); non-ionic solvents in the '262 patent are referred to as plasticizers, and include triglyme, tetraglyme, acetonitrile, benzylacetone, 3-hydroxypropionitrile, methoxypropionitrile, 3-ethoxypropionitrile, butylene carbonate, propylene carbonate, ethylene carbonate, glycerine carbonate, 2-acetylbutyrolactone, cyanoethyl sucrose, gamma-butyrolactone, 2-methylglutaronitrile, N,N'-dimethylformamide, 3-methylsulfolane, methylethyl ketone, cyclopentanone, cyclohexanone, 4-hydroxy-4-methyl-2-pentanone, acetophenone, glutaronitrile, 3,31-oxydipropionitrile, 2-methoxyethyl ether, triethylene glycol dimethyl ether, or combinations thereof.

Self-erasing electrochromic devices as shown in FIG. 1 show exceptionally even coloration. Devices of this construction have at least one electrochemically active material, sometimes referred to as a redox active material or redox dye, providing a redox reaction that is accompanied by a color change. The devices constructed as per FIG. 1 are also referred to as single compartment, as all the electrochemical activity takes place only in one compartment defined by the electrolyte layer contained within two conductors and the gasket. Self-erasing refers to the spontaneous or automatic reversal of the electrooptic coloration, which occurs shortly (e.g. typically seconds to minutes, but may be longer depending on the electrolyte composition) after the activating power to the device is removed. The device then returns to its non-powered state of coloration. Reversion to the optical properties of the device in the non-powered state should occur quickly, e.g. in less than five minutes, and preferably in less than thirty seconds, for a electrochromic dimming mirror; these times refer to the time for bleaching and coloration to 50% of the coloration range.

Desirable coloration and bleaching times depend on the use of the electrooptic device. Electrochromic windows can have relatively slow coloration times and should have relatively slow bleaching times, sometimes referred to as the open circuit memory as described in Czanderna et al. in "Durability Issues and Service Lifetime Prediction of Electrochromic Windows for Buildings Applications," Solar Energy Materials and Solar Cells, vol. 56, (1999), pp. 419-436, incorporated herein by reference. Czandema et al. describe many of the desirable properties of electrochromic architectural windows.

Electrooptic displays, such as computer displays, should have faster kinetics than electrochromic windows; signage in an electrooptic display that is occasionally updated can have slower kinetics.

Self-bleaching occurs because the devices have a competing back reaction in the powered state that can be measured by the leakage current in the steady state for a given coloration for a given voltage. Some back reaction is required for self-erasure, e.g. for automotive rear-view mirrors. However, high values may cause many other problems, such as uneven bleaching as described below.

The forward reaction, e.g. coloration, is enhanced by the high ionic concentration of the electrolyte solutions that are part of the present invention, while the back reaction, e.g. bleaching, is slowed by the viscosity of the liquid electrolytes and the concentration of the ionic species. Fast forward reactions and slow back reactions lead to more uniform voltage across the area of the device and highly uniform coloration of the electrooptic devices of the present invention. However for automotive mirrors it is desirable to have EC devices that color and bleach in less then 30 seconds (s), preferably less than 10 s and most preferably less than 5 s while they comprise of ionic liquids. Typically, these speeds are at room temperature (about 25° C.) and unless mentioned otherwise correspond to the time it takes to change 80% of the optical range at 550 nm or photopic conditions in the center of the device. For exterior mirrors speeds of less than 30 s are usually acceptable and speeds less then 10 s are acceptable for interior mirrors. Generally automotive mirrors should be self-erasing, i.e., should spontaneously go back to the bleached state when the power is removed in a short time (e.g., in a few minutes or less). Typically leakage currents (steady state currents in the colored state) in excess of 0.1 mA/cm$^2$, preferably greater than 0.2 mA/cm$^2$ of the active device area lead to acceptable self-erasing automotive mirror devices.

The uniform coloration in the present invention is beneficial in several ways. First, uniform coloration allows larger area devices to be made; these devices color uniformly when the power is applied via the conductors, typically busbars, at the perimeter of the device. In typical devices where the ionic concentration is low, the devices color deeper close to the busbar region at the perimeter then in the middle, as the size of the device increases. Second, the voltage across the device is more uniform, reducing electrophoretic segregation of the redox dyes in the activated state. By contrast, in electrooptic devices using conventional non-ionic solvents, electrophoretic separation of the redox dyes leads to formation of colored bands near the busbars when the power is left for long periods, e.g., for tens of minutes and longer. Third, the back reaction and forward reaction usually do not uniformly increase with temperature, and in electrooptic devices using conventional non-ionic solvents the difference in rates between the forward reaction and back reaction may be so high that a uniformly coloring device at 25° C. may color non-uniformly at 40° C. Again, non-uniformity tends to increase with increasing size of the device, most deleteriously with the increase in the distance between the busbar and the part of the electrodes farthest from the busbar. Temperature variation particularly affects exterior automotive mirrors, which are typically larger than the interior mirrors and may be heated to remove frost in cold weather or they may require coloration during the day to increase safety to be able to reduce solar glare. With increasing mirror size non-uniformity, including temperature-induced non-uniformity, becomes more evident and this problem may be less severe in the electrooptic device of the present invention as compared with electrooptic devices using conventional non-ionic solvents.

Figure 10:
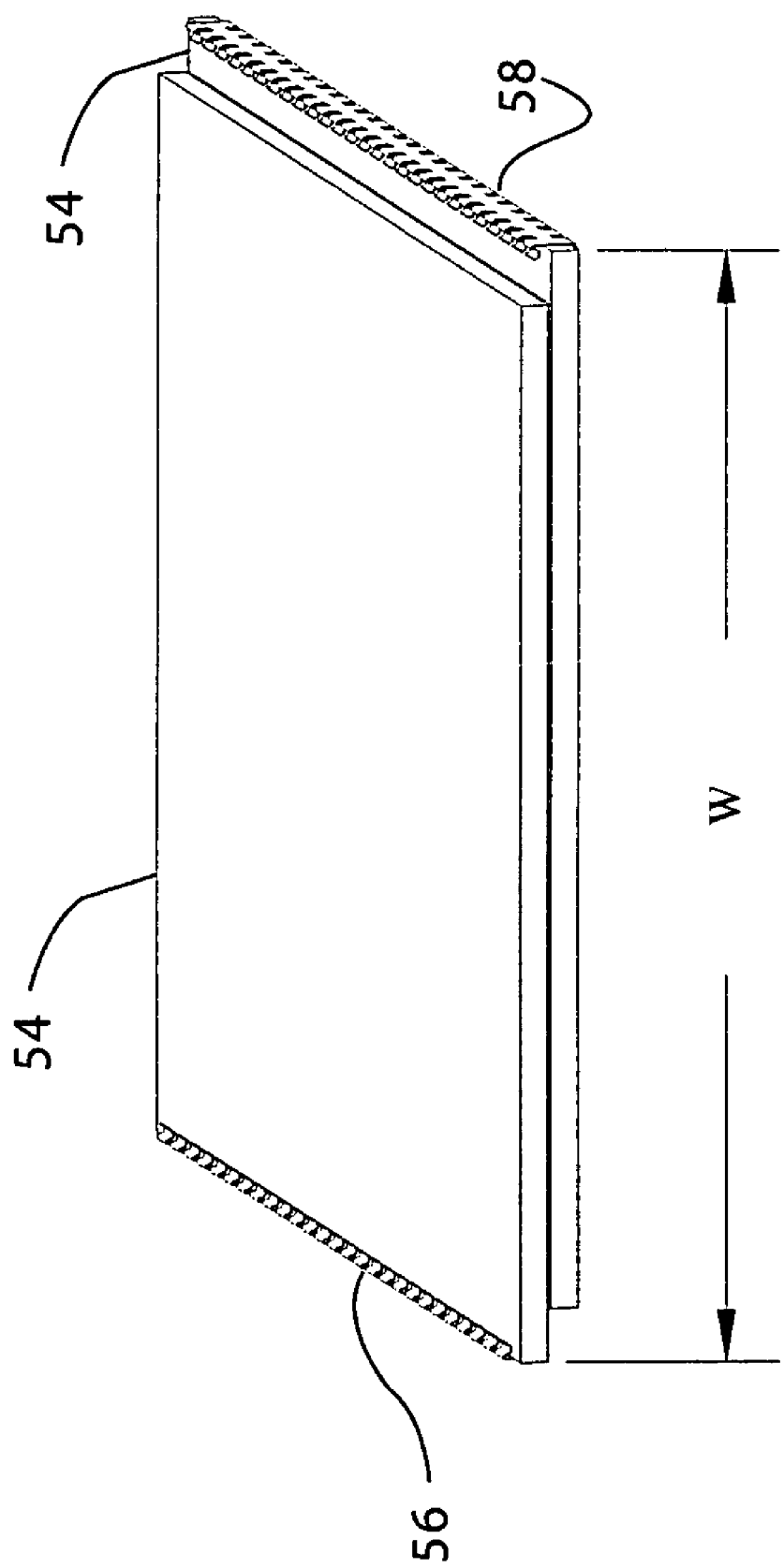
FIG. 10 shows the method for measuring the distance between the busbars of an embodiment of the present invention.

A way of measuring the device size is to measure the distance between the opposite polarity busbars of the device (see FIG. 10). FIG. 10 shows an electrochromic device made using two substrates 54 with their conductive sides facing inwards. The busbars for the two opposite electrodes 56 and 58 are shown at a distance "W". The shapes of the mirrors may be such that this distance may not be constant, thus average numbers may be used. Also, the EC device size may be measured by measuring the width within the perimeter seal. For most practical devices, however, "W" is not significantly different from this as the seal and the busbar width only adds a few millimeters on each side. Distance "W" between the busbars for interior auto mirrors may be in the range of about 5 cm to 8 cm and for outside auto mirrors may range from about 7 cm to 20 cm. The thickness of the electrolyte layer for electrooptic devices made from this invention is generally less than 1 mm, and more preferably less than 0.5 mm. For automotive electrochromic mirrors this distance is preferably less than 0.25 mm, so that self-erasure rate is acceptable.

Any value of leakage current is acceptable as long as the device colors uniformly and self-erasure occurs at an acceptable rate. Thus leakage current may be different for different sized devices. For an interior electrochromic mirror having a size of about 25 cm by about 6 cm, the leakage current should preferably be lower than 0.5 mA/cm$^2$ of the active area of the device.

Polymerizable materials, such as co-reacting monomers, addition-reaction monomers, as well as catalysts, initiators, etc., may be added to the electrolyte solution. Monomers can be polymerized in-situ after introducing the electrolyte solution into the cavity, or solid films of electrolyte may be formed and then laminated between the conductive substrates. Also the composition of these additives depends on the method of processing, such as curing by thermal, UV or other radiative method. Since the monomeric additives may become incompatible after polymerization, one has to be careful in exercising the choice of material. Details on materials, processing, etc. are described in U.S. Pat. No. 6,245,262, and in U.S. Pat. No. 5,940,201, both incorporated by reference herein. Generally, the preferred ones are based on epoxy, urethane and acrylic chemistry. To keep the shrinkage low for in-situ polymerization, the concentration of additives is typically below 25% of the solvent.

In some embodiments, electrolytes of this invention may be solidified by introducing molten electrolytes at elevated temperatures into the device cavity or cell. The molten electrolytes solidify upon cooling due to formation of a second phase (such as micro-crystals or amorphous domains) so that the electrolytes remain solid during the device operation. Some of these electrolytes are polymers that, when cooled, result in a multiphase solid formation (this means that when the electrolyte is solidified there are at least two or more phases). Preferably, one of the phases has a melting or softening point above the use temperature (this phase is called a hard phase), and at least one phase has melting or softening point (or glass transition temperature, Tg) below the use temperature (this phase is called a soft phase). Typically a polymer chain meanders through several phases (hard and soft), where its movement in the hard phase is restricted and in the soft phase may even be liquid like. Generally, a polymer chain passes through a couple of domains of hard phase that are separated by a soft phase. Morphologically the solid electrolyte will appear as a continuum of soft phase with interdispersed domains of hard phases. Thus, the volume fraction of the hard phase must be less then about 50%, preferably less than about 30%.

Thus the electrolyte in these devices is processed in a liquid state, at an elevated temperature, and during subsequent cooling to below the glass transition or the melting point the second phase forms spontaneously. The cooling conditions may be part of a controlled manufacturing process (so that the rate is cooling profile including the cooling rate) is controlled to give uniform product. The device is generally operated at temperatures below the glass transition or the melting point of the second phase so that this solid retains its multiphase character at all typical use temperatures and conditions. Such multiphases are extensively described in U.S. patent application Ser. No. 10/793,071 filed on Mar. 4, 2004 and in U.S. patent application Ser. No. 11/454,055 filed on Jun. 15, 2006.

The entire contents of these applications are incorporated by reference herein. A preferred way to solidify these electrolytes is by adding copolymers (e.g. block copolymers with three or more blocks), where at least two of the blocks solidify due to crystallization and the other block(s) are compatible with the liquid in which the crystals are interdispersed resulting in overall solidification of the electrolyte. For devices that require good optical properties, the electrolyte should be clear and free of visible haze. Haze is particularly more visible in mirrors than in windows and more so from glare sources such as lights from road traffic. It is preferred that haze in these mirrors be lower than 1%. Typically this is achieved by having the second phase to be smaller in size than the wavelength of the visible light, i.e., smaller than 400 nm or preferably below 100 nm so that the light is not scattered and clarity is maintained. Crystallizable copolymers of vinylidenefluoride (VF) and hexafluoropropylene (HFP) can result in two-phase systems. Alternatively, if the size of the second phase is larger than about 400 nm, the refractive index of the second phase should match that of the electrolyte (typically within 0.05 or more preferably within 0.01). In this case blocks of PolyVF crystallize while blocks of atactic polyHFP and random copolymer sequences of VF and HFP remain amorphous and more accessible to the liquid electrolyte. These block copolymers may be linear or branched. The blocks that crystallize may be distributed along the main chain of the polymer or they may only be located in the side chains (branches or grafts). Block copolymers may be also formed of polymethylmethacrylate and poly(2-hydroxyethyl methacrylate) (PolyHEMA), where the former polymer may form the second phase and the latter may be soluble in the electrolyte. If the electrolyte composition is such that it solubilizes polymethylmethacrylate, then it may be substituted with another polymer, e.g., polystyrene and polyacrylonitrile. When linear polymers are used then multiblock or triblock copolymers are preferred. A particularly preferred arrangement is a triblock polymer where the two ends of the chain have those blocks that form the second phase that is not soluble in the electrolyte and the block in the middle is soluble in the electrolyte. The length of the end blocks may be 10 to 1000 of units long (monomer repeat units), and preferably less than 100 units. The ones in the center may be 100 to 10,000 units long. When graft copolymers are used then the blocks forming the hard domains (second phase) may reside at the end of backbone polymer chain or in the grafted branches. In addition, random copolymers that do not form a second phase may also be optionally added to change properties and size of the second phase. Polymer content in the electrolyte is generally in the range of 2% to 30% by weight of the electrolyte. A more preferred range is between 5% and 25%. More than one polymer forming a second phase may be added to solidify the electrolyte. One or more of these may form the second phase. There may also be additives so that when the second phase is formed, the chains in this phase are optionally crosslinked. There are several grades of commercial polymers comprising at least one of VF and HFP that are available for solidification. Depending on the temperature range of device operation and its interaction with the other electrolytic components, one or more of these may be selected. ATOFINA (Philadelphia, Pa.) sells these under the trade name of KYNAR™ and some of the grades are 301F, 741 LBG and KYNAR Flex 2801 and these may also be obtained from SOLVAY (Thorofare, N.J.) under the trade name of SOLEF™ and some of the grades being 1015, 6020, 21216, 20816, 20615 and 11008. Two phase systems may also be formed using homopolymers where the second phase forming domains are isotactic or syndiotactic, and the ones forming the more soluble phase with the electrolyte are atactic. When a multiphase system is used to solidify the electrolyte, then it is preferred that the Tg or the melting point of one of the phase in the electrolyte is greater than 50° C. (e.g., for automotive mirrors and displays and building glazing), preferably greater than 65° C. and for some applications such as automotive glazing this temperature may be above 85° C. A preferred EC mirror system comprises a single compartment, self erasing device (FIG. 1) or a compartment comprising one electrochromic coating (FIG. 2) that is filled with a clear solid formed by a multiphase polymer as described above. The electrolyte in the compartment may comprise anodic and cathodic dyes in addition to UV stabilizers.

Non-electrochemically active dyes (to give desired colors), surfactants and other modifiers may be added to the electrolyte solution, depending on the desired device characteristics and processability. These are described in the above references. As an example, near-IR absorbers have also been added (see: Thieste et al. in PCT Application WO 99/45081 entitled "Near Infrared-Absorbing Electrochromic Compounds and Devices Comprising the Same," incorporated by reference herein) so that the devices can absorb in an extended solar range for window applications.

Figure 3:
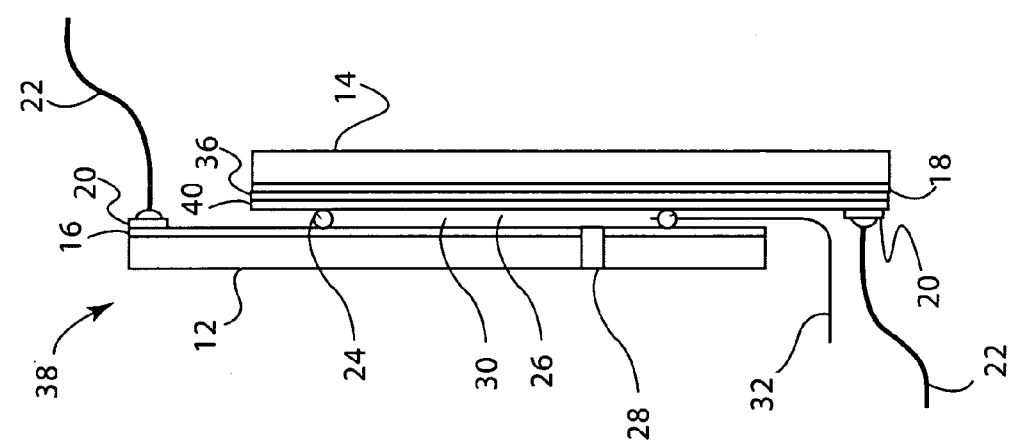
FIG. 3 shows a cutaway, edge-on view of an embodiment of an electrochromic device of the invention that includes an electrochemically active coating and an ion-selective transport layer.
Figure 2:
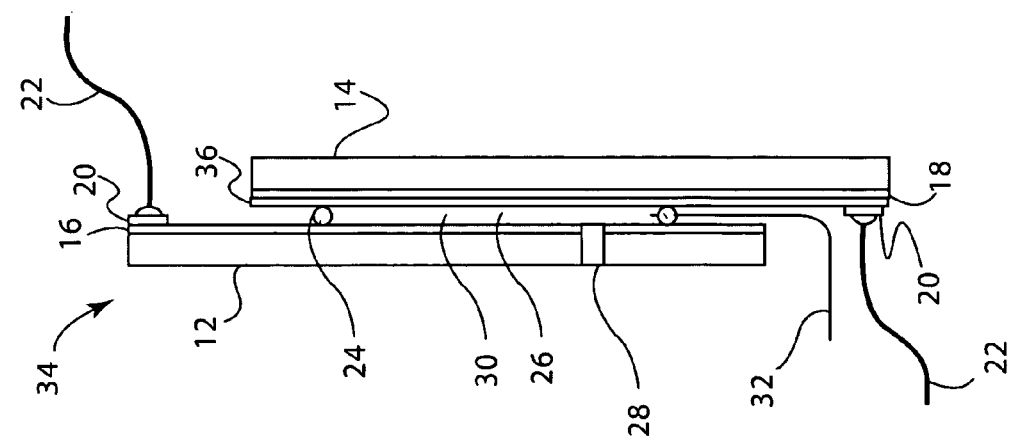
FIG. 2 shows a cutaway, edge-on view of an embodiment of an electrochromic device of the invention that includes an electrochemically active coating.

EC devices of the present invention may contain other layers deposited on one of the electrodes. Schematics of these devices are shown in FIG. 2 and FIG. 3. Device 34 shown in FIG. 2 is similar to device 10 shown in FIG. 1, except that device 34 includes additional electrochemically active layer 36. Electrochemically active layer 36 is deposited on either conductive layer 16 or conductive layer 18 (or on substrate 12 or substrate 14 if they are themselves conductive) or on both; for convenience, electrochemically active layer 36 is shown as deposited on second conductive layer 18. Examples of materials used for preparing electrochemically active layers are tungsten oxide, Prussian blue, molybdenum oxide, vanadium oxide, polyaniline, polythiophene, polypyrrole, and derivatives and mixtures of these materials (devices made with these layers are described in U.S. Pat. No. 4,671,619 to Kamimori et al. entitled "Electro-optic Device," which issued on Jun. 9, 1987, and in U.S. Pat. No. 5,729,379 to Allemand et al. entitled "Electrochromic Devices," which issued on Mar. 17, 1998, both incorporated by reference herein).

Any of the layers 16, 18, and 36 themselves may include several layers. The conductive layer of tin oxide, for example, may be deposited on top of an anti-iridescent coating. The electrochemically active layer may be a composite of two different layers of materials.

In this construction as shown in FIG. 2, electrochromic solution 30 will include an ionic liquid and at least one redox-active compound. For example, if tungsten oxide is used, which is a cathodic layer, then at least one anodic material (e.g., ferrocene, phenothiazine) is used in the electrolyte. The electrolyte may also contain salts of lithium, sodium and potassium, etc. During the coloration, ions ($Li^+$, $Na^+$, $K^+$) from the electrolyte are reversibly injected into the tungsten oxide. It is preferred that if such salts are used the related anion is similar to, or the same as, the one of the ionic liquid solvent. A material that combines the redox property of a dye and a source of lithium is lithium iodide salt (see, for example, U.S. Pat. No. 4,671,619 to Kamimori et al. vide supra).

An example of an anodic electrochemically active layer 36 is polyaniline, which can be used with a cathodic dye such as a viologen in the electrolyte solution of the invention.

There may be additional functional coatings to modify the functionality of the device 34 in FIG. 2. One example is device 38, shown in FIG. 3, which is identical to device 34 shown in FIG. 2 except that electrochemically active layer 36 is further coated with an ion selective transportation layer 40, which allows the passage of smaller ions (lithium ion, for example) while blocking or retarding the passage of larger ions that are present in electrochromic solution 30. Ion selective transportation layer 40 limits the back reaction and increases the memory of the devices. This is a useful feature for large windows as coloration is more uniform. Ion selective transportation layers and devices are described in U.S. Pat. No. 6,178,034 to Allemand et al. entitled "Electrochromic Devices," which issued on Jan. 23, 2001, hereby incorporated by reference.

In some EC devices there may be two intercalation layers as shown in FIG. 4. FIG. 4 shows device 42, which is similar to device 34 of FIG. 2, except that each of conductive layers 16 and 18 is coated with an electrochemically active layer. FIG. 4 depicts first conductive layer 16 as being coated with electrochemically active layer 44 and second conductive layer 18 coated with electrochemically active layer 36. One of the electrochemically active layers, layer 44 or layer 36, must be electrochromic; the other electrochemically active layer (layer 44 or layer 36), which is the counterelectrode (CE), may be electrochromic or only store the ions reversibly. If the electrochromic layer includes tungsten oxide or molybdenum oxide, then the other electrochemically active layer may include polyaniline, nickel oxide, iridium oxide and vanadium oxide. Examples of non-electrochromic layers that store ions are cerium-titanium and vanadium-titanium oxide. During the device assembly, one of these layers is typically pre-reduced or intercalated with cations, such as lithium. The device changes its optical properties when the ions are ejected from the counterelectrode and injected in the electrochromic layer. For anodic electrochromic layers, ejection of charge also leads to a change in color. Solution 30 in device 42 may include a UV stabilizer in addition to the ionic liquid solvent. Solution 30 in device 42 may optionally include a salt that has cations that may be transported from the CE to the electrochromic layer and vice-versa. As an example if lithium is being intercalated in the electrodes, then a lithium salt may be added to the electrolyte. One may even add a source of protons as long as the source of protons, typically an acid, is able to dissociate in the electrolytic medium. Further, the anion of the added salt should be preferably similar to the anion of the ionic liquid. Examples of preferred lithium salts are lithium trifluoromethylsulfonate, lithium bis(trifluoromethylsulfonyl)imide, lithium bis(perfluoroethylsulfonyl)imide, and lithium tris(trifluoromethylsulfonyl)methide. Examples of electrochromic layers, counterelectrodes, and device assembly can be found in the following U.S. Pat. Nos. 6,266,177 to Allemand entitled "Electrochromic Devices," which issued on Jul. 24, 2001, 6,327,070 to Heuer et al. entitled "Electrochromic Assembly Based on Poly(3,4-ethylenedioxythiophene) Derivatives in Combination With a Lithium Niobate Counterelectrode, which issued on Dec. 4, 2001, and 6,172,794 to Burdis entitled "Electrochromic Devices," which issued on Jan. 9, 2001, all incorporated by reference herein).

Other chromogenic devices that use electrolytes can also benefit from the electrolyte solutions of the present invention. These are called User Controlled Photochromic Devices (UCPC) and photoelectrochemical devices (see, for example, U.S. Pat. No. 6,246,505 to Teowee et al. entitled "Photochromic Devices," which issued on Jun. 12, 2001, and Bechinger et al. "Photoelectrochromic Windows and Displays," Nature, vol. 383 (1996) pp. 608-610). In these devices, the coloration is photoactivated and may be controlled by the user. These types of devices could be similar in construction to device 42 shown in FIG. 4.

The invention also includes a method for preparing electrooptic devices by vacuum backfilling. Many kinds of electrooptic devices can be manufactured by vacuum-backfill techniques, including electrochromic, electroreflective, and electroluminscent devices; these include mirrors, windows, filters, lighted panels, and displays.

The electrooptic devices of the present invention may be conveniently manufactured using a vacuum-backfill method. The negligible vapor pressures of ionic liquids allow vacuum-backfill techniques to be employed without the concerns of bubble formation and solvent contamination of the filling apparatus, as is the case with conventional non-ionic solvents. Further, and importantly, the negligible vapor pressure of ionic liquids even at elevated temperatures (see EXAMPLE 25) minimizes evaporation of solvent and any associated change in the concentration of the solutes dissolved in the solvent. In this method an empty cell (without electrolyte) with a fill port, and the electrolyte in a separate vessel, are placed in a chamber. The chamber is evacuated, and the fill port of the cell is then lowered into the electrolyte while still under vacuum. The chamber vacuum is then released while the fill port is still submerged in the electrolyte solution. If the viscosity of the solution is high (e.g. greater than 10 centipoise (cP)), the electrolyte solution is warmed by contacting the electrolyte solution with the warm, empty cell during the filling process; by warming the electrolyte or by conducting the filling operation in a heated chamber; or by some other means. The ambient pressure on the electrolyte forces it into the cell. The filled cell is removed and the fill port is sealed.

Figure 5C:
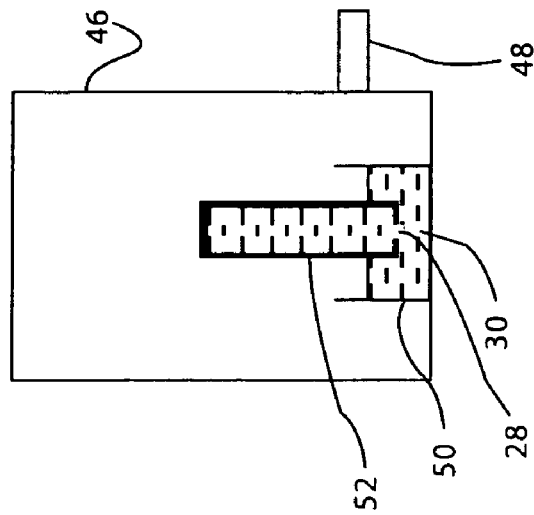
FIGS. 5a-c shows a schematic representation for a vacuum-backfill process.
Figure 5B:
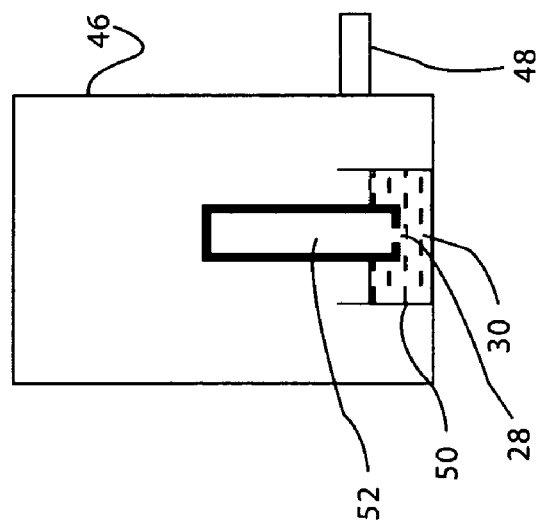
Figure 5A:
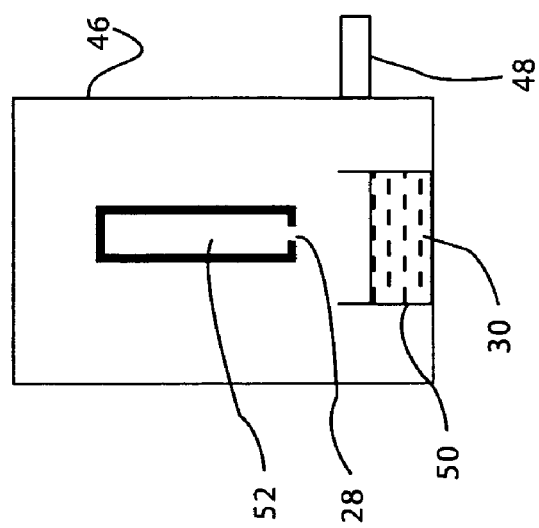

FIGS. 5a-c shows a schematic representation of the vacuum backfill process. FIG. 5a shows the beginning of the process, after a vacuum has been established inside vacuum chamber 46. Vacuum chamber 46 includes port 48 for evacuating, or introducing air or another gas (e.g., inert gas) into, chamber 46. Chamber 46 may have other ports for introducing electrolytes and empty cells or other devices, which are not shown. The chamber contains vessel 50, which holds electrochromic solution 30. Chamber 52 of the empty cell may be accessed through fill port 28. To start the backfilling process one or more empty cells along with the electrolyte is introduced in the chamber. The electrochromic solution 30 includes ionic liquids of the invention (and optionally a non-ionic co-solvent), one or more redox dye(s), and other additives such as UV stabilizers, polymerizable monomers, polymerization catalysts and/or initiators, etc. The cell and electrochromic solution are kept apart while chamber 46 is evacuated. If the fill solution has an appreciable vapor pressure, as is the case with non-ionic conventional solvents as described in U.S. Pat. No. 5,140,455 (vide supra), then the solvent will evaporate and prevent the establishment of a vacuum greater than the vapor pressure of the solvent. Also, if the electrochromic solution has an appreciable vapor pressure, as is the case with non-ionic conventional solvents as described in U.S. Pat. No. 5,140,455, then the evaporation of the solvent, especially under vacuum, and especially at elevated temperatures, may alter the concentration of solutes from their optimal values. Ionic liquids used with the invention do not noticeably evaporate under conditions in which conventional solvents evaporate, and therefore the concentrations of the solutes do not change. Since the vapor pressure of the ionic liquids is negligible, the chamber is evacuated quickly, and further, electrolyte solution 30 is not consumed by the vacuum system. In addition, for conventional liquids a bubble is always left in the backfilled cavity, and this is dependent on the vapor pressure (see, for example, U.S. Pat. No. 5,140,455 for a detailed description of this phenomenon).

Since the vapor pressure of the ionic liquids of the present invention is negligible, the vacuum chamber may be quickly and efficiently evacuated, without consumption of solvent by the vacuum system or formation of bubbles. After establishment of the vacuum inside chamber, as shown in FIG. 5b, fill port 28 of the empty cell is lowered into the electrochromic liquid 30. Afterward, as shown in FIG. 5c, the chamber vacuum is then released while the fill port is still submerged in the electrolyte (optionally, the chamber may be pressurized above atmospheric pressure) and the resulting pressure difference between the outside of the cell and the inside of the cell causes the electrochromic solution to fill the cell. Afterward, the filled cell is removed from vacuum chamber 46 and fill port 28 is sealed (for example, with an adhesive that cures thermally or by radiation such as UV radiation). The vapor pressure of propylene carbonate, a possible additive, is 0.03 mm of mercury at 20° C. Sulfolane, another possible additive, has a melting point of 27.6° C. and a vapor pressure of 0.0062 mm at this temperature. The vapor pressure of the ionic liquid solvent is negligible (see, for example, Gordon, New Developments in Catalysis Using Ionic Liquids, Applied Catalysis: General A, vol. 222, (2001) pagelol-117, Earle, *Diels-Alder Reactions in Ionic Liquids*, Green Chemistry, vol. 1 (1999), pp. 23-25). For the purpose of this invention, a vapor pressure lower than 0.003 mm of mercury, preferably lower than 0.001 mm of mercury under backfilling conditions is a negligible pressure. Negligible pressure is defined by a test in which a solvent is placed in an open container with a 1.5 cm² opening under a vacuum of 0.1 mm Hg at 100° C. for 1 hour. Under these conditions the loss of solvent due to evaporation should be less than 1 mg, and preferably less than 0.1 mg.

Other fill techniques besides the backfill process, such as those described in U.S. Pat. No. 5,140,455 may also be used to manufacture the electrooptic devices of the present invention. These other fill techniques include injection fill techniques where the electrolyte under pressure is forced into the cavity. For this type of filling technique, the empty cell preferably includes more than one port, one for filling and another for venting gas as the cell is filled.

EC devices (e.g., mirrors, windows and displays) of the present invention include devices prepared using dyes attached to nanostructured materials and/or semiconductors. Nanostructured materials of the present invention include coatings of particles less than 1000 nm in size, or coatings having pore sizes between about 2 nm and 1000 nm. Such coatings have high surface area. Some examples of nanostructured materials include oxides of titanium, tungsten, zinc, tin and antimony. Nanostructured layers of these materials are deposited on conducting substrates such as ITO (indium-tin-oxide) and fluorinated tin oxide. High roughness tin oxides (such as TEC 8 from PILKINGTON in Toledo, Ohio) may serve both as transparent conductor and nanostructured semiconductor for dye attachment. Devices with nanostructured electrodes are described in U.S. Patent Application Number 20020021482, in PCT Application WO 01/27690, in U.S. Pat. No. 6,266,177 and in U.S. Pat. No. 6,605,239, all incorporated by reference herein. Attachment of the organic dyes to high area surfaces results in fast response and high contrast ratios. When these attached dyes have anions, then it is preferred that they be similar to the anions described for the ionic liquid, dyes, and electrochromic solution of the present invention, the most preferred anions being trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$).

Nanostructured coatings may be used in photochromic devices employing electrochromic materials (see, for example, U.S. Pat. No. 5,604,626). A class of photochromic devices, also known in the art as photo-electrochromic (PEC) devices, are devices where the electrochromic reaction takes place by converting the incident light impinging onto the device into an electrical voltage that automatically drives the electrochromic reaction. These types of devices are used for applications that include windows and mirrors for architectural and automotive use. For window devices these typically use two opposing substantially parallel, spaced apart electrodes (substrates with transparent conductive coatings facing inwards), one of which has a layer of a nanostructured, light-harvesting coating, typically made from nanosized particles of an oxide semiconductor such as tin oxide, titanium oxide or zinc oxide. Nanostructured coatings may be coatings with pores or roughness in a range from about 2 nm to 1000 nm. These may then be optionally coupled with dyes to increase the efficiency of light harvesting and/or to drive the coloring or darkening reaction. In one construction, the second electrode or the light-harvesting electrode may have an electrochromic coating and/or the electrochromic material may be present in the electrolyte.

Nanostructured devices of the present invention may be user controlled (for an example of a user controlled photochromic device, see Teowee et al. in "User Controllable Photochromic (UCPC) Devices, Electrochimica Acta, vol. 44, (1999) pp. 3017-3026, incorporated by reference herein). For such a device, the user controls the external connectivity between the two electrodes using a conductor. If only the two electrodes are connected, for example, the device darkens when exposed to light. Examples of prior art devices may be found in the following U.S. Pat. Nos. 5,604,626; 5,838,483; 6,246,505; 6,369,934; 6,118,572; 6,067,184; and 6,297,900. Use of ionic liquids in electrolytes of these devices, and particularly the preferred ionic liquids described in this invention, would provide benefit in terms of device durability. Any added ionic dyes and salts to the electrolyte or to the electrodes should preferably have an anion similar to the anions of the ionic liquid. If more than one ionic liquid is present in the electrolyte with different anions, then at least one of these anions should match the anion of the ionic dye or the salt. A dye that can produce a clear dark red color is desirable for many applications of devices employing nanostructured coatings.

The present invention includes electroluminescent devices. These devices are typically constructed using two opposing substantially parallel, spaced apart electrodes (substrates with conductive coatings facing inwards, where one of them is transparent). The thickness of gap between the electrodes is typically in a range of 10 to 500 microns. The electrodes may also be patterned for a display (the electrodes may have a coarse pattern or no pattern if used for a lighted panel). Patterning includes pixelating, and the matrix formed may be a passive or an active matrix. One of the electrodes may include reflective metal (e.g., platinum, rhodium, for example), or a transparent conductor (ITO or doped tin oxide, for example) with an underlying reflective coating (platinum, rhodium, aluminum, silver, and alloys of these materials, for example). The resistivity of transparent conductor may be within 1 to 250 ohms/square and that of the reflective layers below 10 ohms/square. The space between the electrodes is filled with an electrolyte, and the perimeter of the device is sealed. The electrolyte used with these devices includes one or more dyes dissolved in an ionic liquid. Electroluminescent devices are described, for example, in "Electrochemical Methods: Fundamental and Applications, Bard et al., second edition Wiley, New York (2001). The devices produce light when the when the reduced and the oxidized species that migrate away from the electrodes re-combine in the electrolyte. The light may also be emitted at or near an electrode depending on the composition of the layers deposited at the electrode.

The various devices from this invention (including those comprising nanostructures) may use solid electrolytes which may be solidified by adding monomers that crosslink once introduced in the device cavity or by formation of multiphases as discussed above.

Some of these materials are dyes. Examples of active dyes are ruthenium tris-(2,2'bipyridine) and its derivatives. Other materials are nanoparticles, in particular nanocrystals, of semiconductors. Nanocrystals of semiconductors are also referred to in the art as "quantum dots". Examples of these materials are elemental and compound semiconductors, such as silicon, germanium, cadmium selenide, cadmium sulfide, etc. (see, for example, Ding et. Al., Electrochemistry and Electrogenerated Chemiluminscence from Silicon Nanocrystal Quantum Dots, Science, volume 296, P-1293-1297, (2002)). The size of nanoparticles is generally less than 10 nm, and more preferably less than 5 nm. These particles may be organically modified on the surfaces to avoid agglomeration and reactivity. These types of devices are typically based on the representations shown in FIG. 1 and FIG. 2. Depending on the device, the active materials may be in the electrochemical coating or in the electrolyte. Other dyes to enhance the effect such as amines and salts may also be present in addition to non-electrochemically active UV stabilizers. Dyes that emit in near IR may be included to provide devices of the invention that can be used in special military operations. One example of such a dye is heptamethine cyanine dye (Lee et al., Analytical Chemistry, vol. 69, no. 20, (1997) pp. 4126-4133).

The electrodes themselves may consist of multiple-layers of semiconductors, metals and polymeric layers that may assist in the desired optical and electronic characteristics (e.g., work function) of the substrates.

The following EXAMPLES demonstrate the operability of the invention.

EXAMPLE 1

Figure 6:
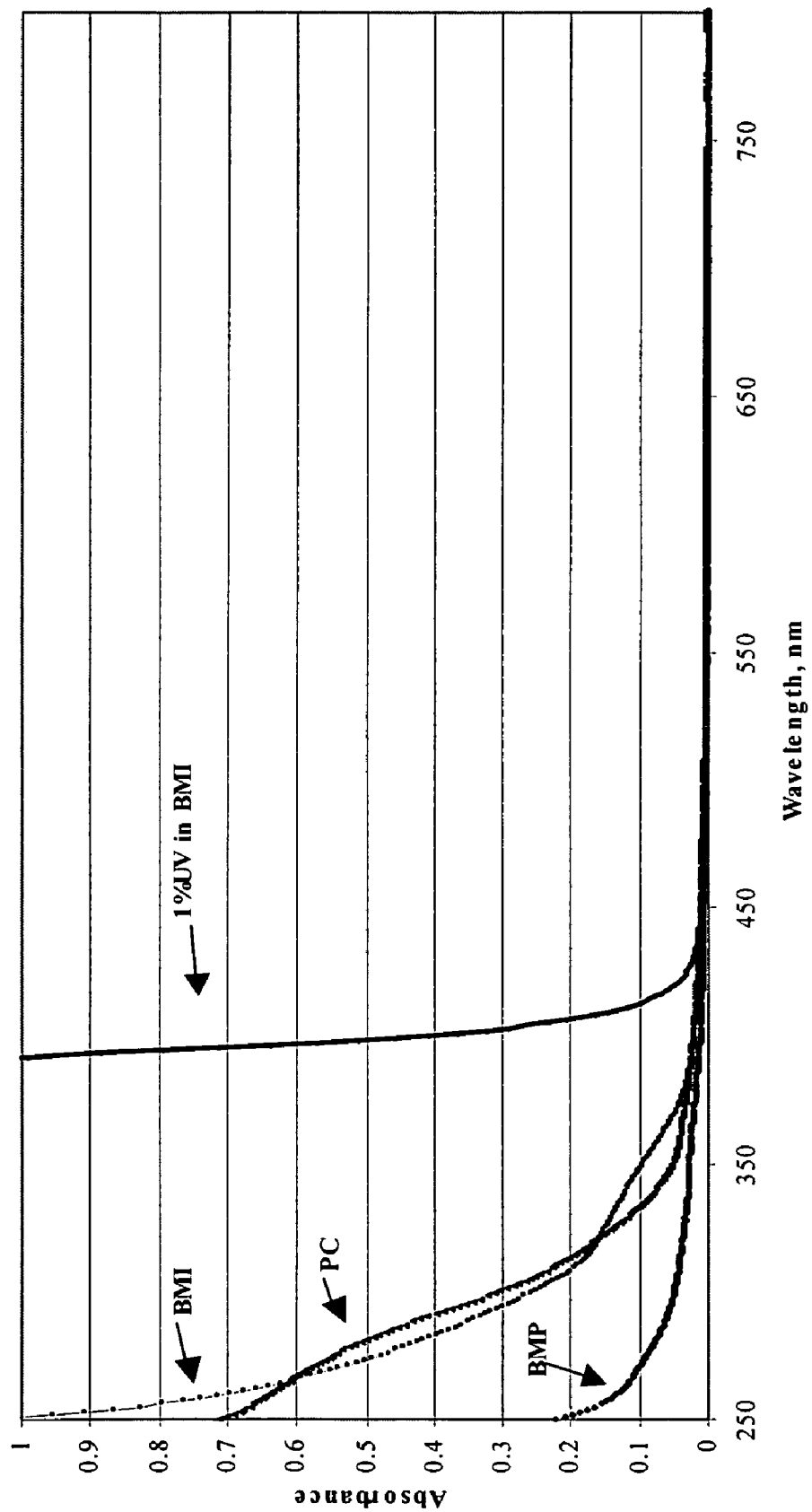
FIG. 6 shows the absorption spectra of several solvents.

Absorbance spectrum of UV stabilizer in ionic liquid solvent. The absorbance spectra propylene carbonate, 1-Butyl-3-methylimidazolium bis(trifluoromethylsulfonyl)imide (BMI), N-butyl-N-methylpyrrolidinium bis(trifluoromethylsulfonyl)imide (BMP), and a solution of BMI with 1 weight percent of the UV stabilizer ethyl 2-cyano-3,3-diphenyl-acrylate (UVINUL™ 3035, BASF™, Mount Olive, N.J.) were measured between 800 nm and 250 nm. Both BMI and BMP are ionic liquid solvents used with the invention. BMI has higher absorbance in the UV (below 400 nm) than BMP, due to its more conjugated nature. The solution of BMI with 1% UV stabilizer was a clear liquid that did not form a precipitate at −30° C. after 15 hours. The absorbance spectra of the four solutions are shown in FIG. 6.

EXAMPLE 2

Figure 7:
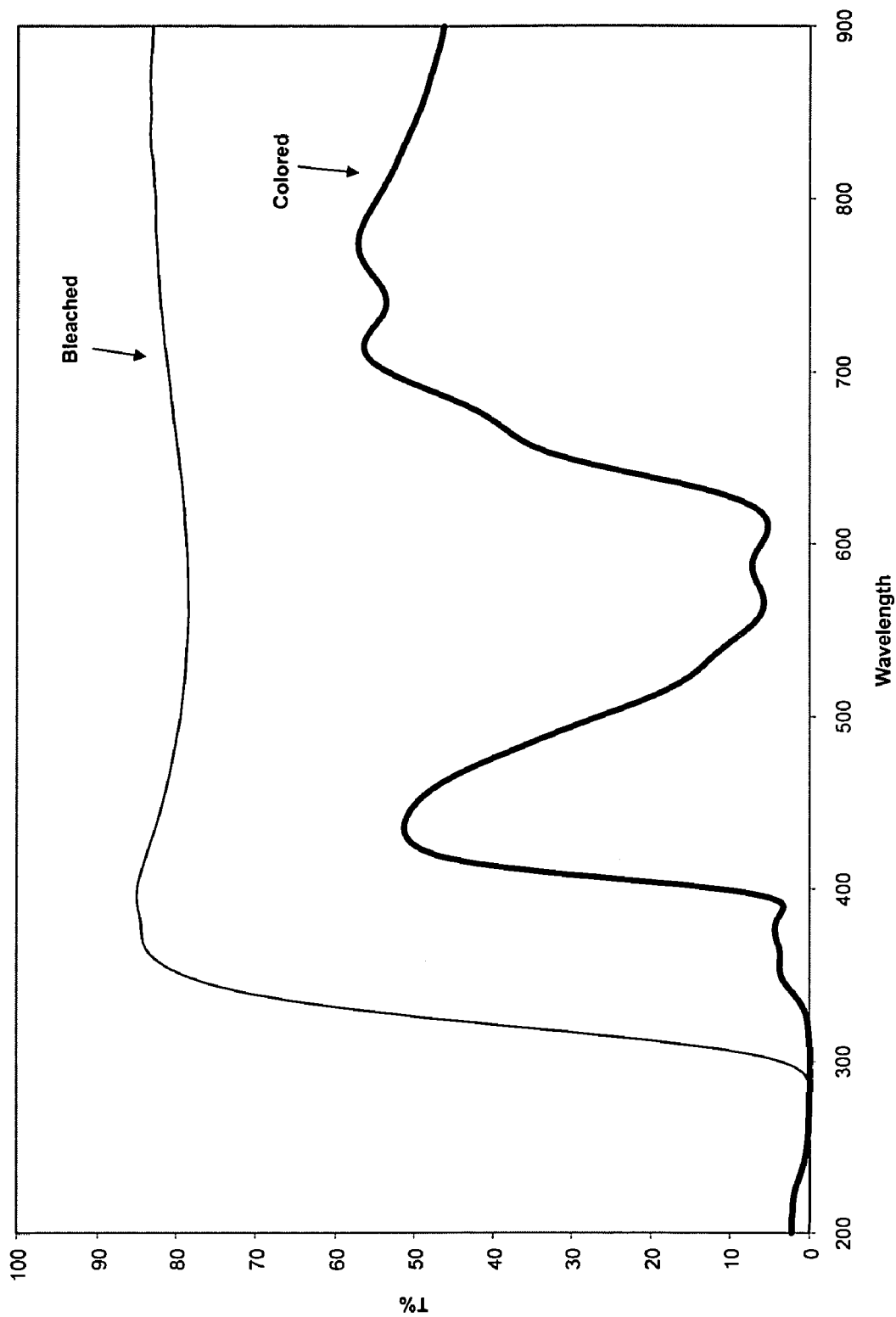
FIG. 7 shows the transmission spectra of an electrochromic device that includes redox dyes in the electrolyte in colored and the bleached state.
Figure 8:
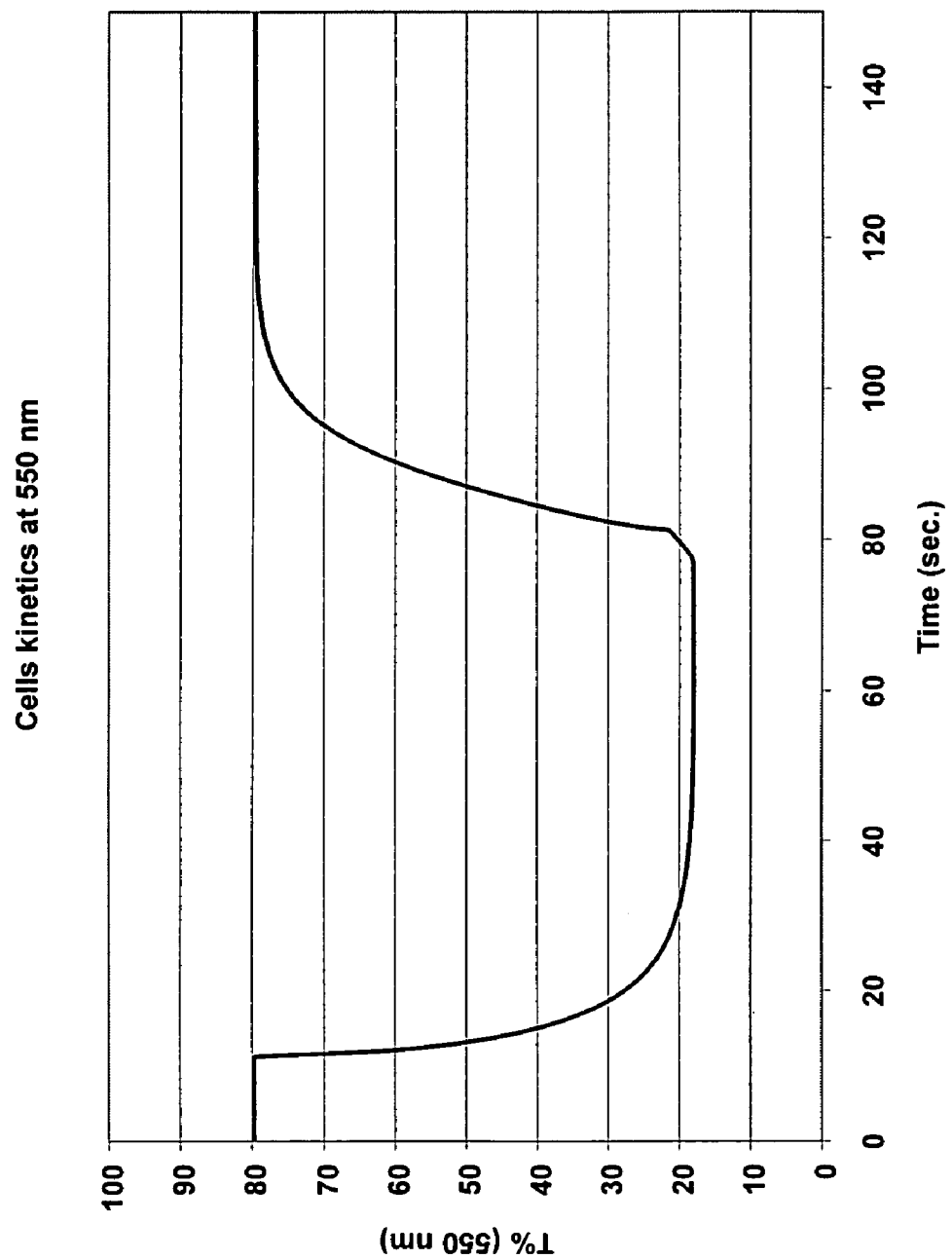
FIG. 8 shows a kinetic trace of an electrochromic device containing redox dyes in the electrolyte.

Electrochromic window device with electrolyte solution including redox dye. ITO substrate (15 Ω/sq) was cut into two 5.25"×3.7" rectangular pieces. Two holes about 3 mm in diameter were drilled into one piece near the corners one of the diagonals. The substrates were then washed, dried and stored under clean room conditions. An epoxy containing 105 micron glass bead spacers was dispensed around the edges of one of the substrates, and the second substrate was placed on top of it to make a cavity such that the two substrates were slightly off-centered along the long side of the rectangular edge. The perimeter seal width was about 2 mm. This exposed edge on both substrates was later used to apply a busbar and make electrical connections. The epoxy seal was cured at a temperature of 120° C. The cavity was filled at room temperature with a liquid electrolyte solution containing 0.015 M of the charge transfer complex formed by N,N'-dimethylviologen bis(trifluoromethanesulfonyl)imide (methyl viologen imide salt), 0.015M N,N,N',N'-tetramethyl-1,4-phenylenediamine in 1-butyl-3-methylimidazolium bis(trifluoromethanesulfonyl)imide. After the cavity was filled, the two holes were plugged with Teflon balls (preferably the diameter of the ball is 5 to 30% bigger than the diameter of the hole) and further sealed using cover glass and an epoxy. A solder strip was applied to the exposed ITO on each substrate along the long sides of the cavity using an ultrasonic solder. Electrical wires were then attached to these solder strips. The electrochromic performance of the window device was determined by placing the device in a spectrometer and monitoring the color kinetics at 550 nm while a color potential of 1.0 volts was applied. This device colored uniformly to a deep blue color and reversed to the original colorless state upon bleaching by shorting the electrical leads from the two electrodes. FIG. 7 shows the spectra in the colored and the bleached state. The kinetic trace for the device is shown at 550 nm in FIG. 8.

EXAMPLE 3

Figure 9:
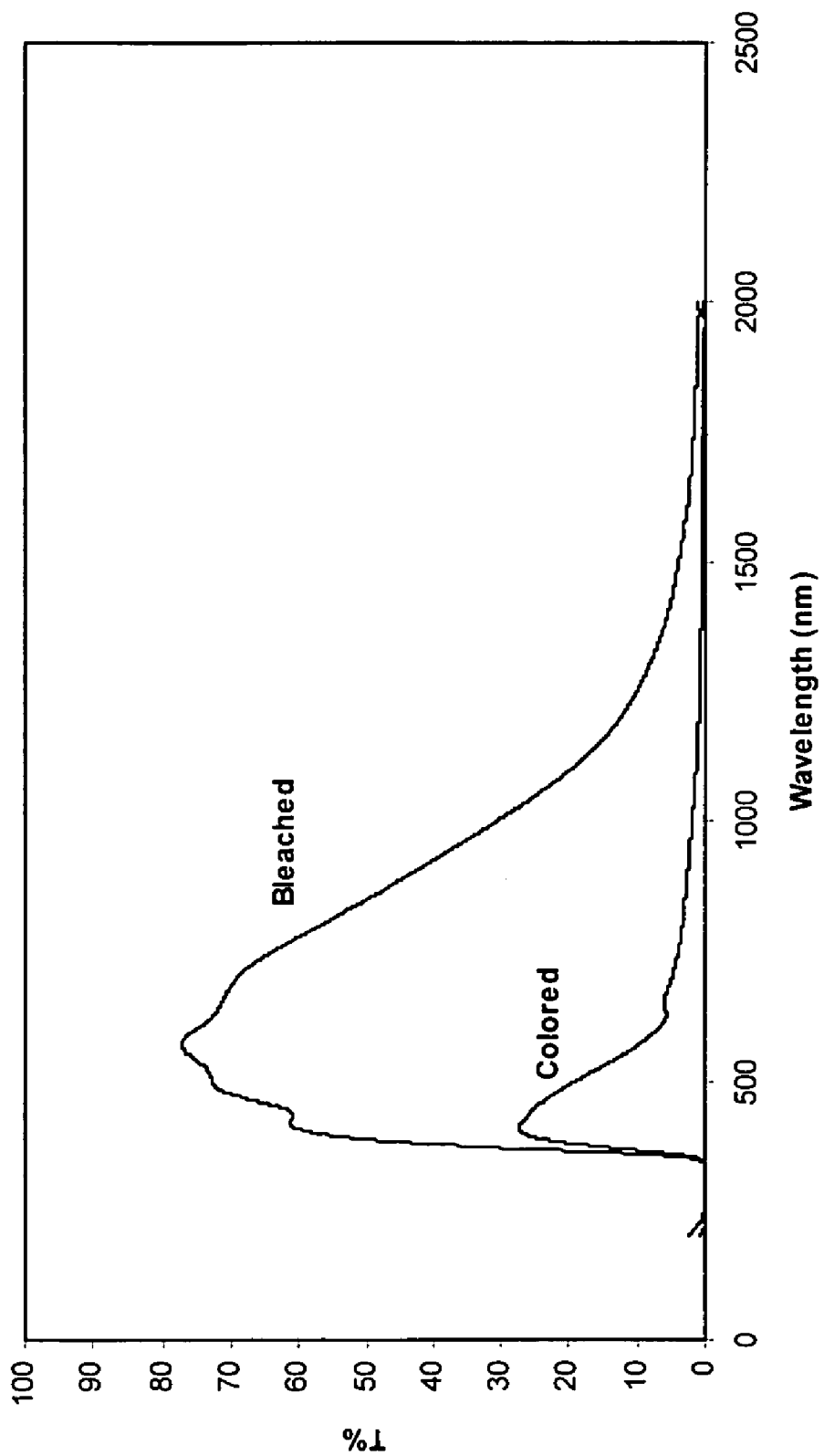
FIG. 9 shows transmission spectra of an electrochromic device that includes a layer of tungsten oxide in the colored state and in the bleached state.

Electrochromic window device having a tungsten oxide coating. Two half wave ITO substrates (15 Ω/sq) were prepared as described in EXAMPLE 2 except that the substrate that was not drilled into was coated with a 300 nm thick tungsten oxide coating (on the conductive side) containing 30 mole % of lithium oxide (based on tungsten atoms). This coating was applied by a wet chemical method as described in U.S. Pat. No. 6,266,177, incorporated by reference herein. Any other method such as chemical vapor deposition and physical vapor deposition could have been used to deposit the tungsten oxide layer. The coating was fired at a temperature of 135° C. in a humid atmosphere, and then at 250° C. in air. It was then fabricated into a cell as described in EXAMPLE 1. The cavity thickness was 175 microns. The cavity was filled with electrolyte containing 0.1 molar lithium bis(trifluoromethanesulfonyl)imide, 0.015 M ferrocene, 1 weight percent of ethyl 2-cyano-3,3-diphenyl-acrylate (UVINUL® 3035) dissolved in 1-butyl-3-methylimidazolium bis(trifluoromethanesulfonyl)imide and the fill holes were plugged as described earlier in EXAMPLE 1. The electrochromic performance of the device was determined by placing the cell in a spectrometer and following the color kinetics at 550 nm while a color potential of 1.2 volts was applied followed by a bleach potential of −0.6 volts. In the bleached state, the device had a transmission of 76% at 550 nm. In the fully colored state, it had a transmission of 12% at 550 nm. The transmission spectra of the window device in the bleached and colored states are shown in FIG. 9.

EXAMPLE 4

Electrochromic window device with an electrolyte solution of redox dye and UV stabilizer dissolved in ionic liquid solvent. A device was prepare according to EXAMPLE 2 with the exception that it was filled instead with an electrolyte solution of N,N'-diethylviologen bis(trifluoromethanesulfonyl)imide (0.015 M), ferrocene (0.015 M) and 1 weight % UVINYL® 3035 (BASF, Mount Olive, N.J.) dissolved in BMP. The cell was colored using 1.0 volt and had a transmission at 550 nm of 41% and when shorted had a transmission of 76%.

EXAMPLE 5

Electrochromic window device with an electrolyte solution of redox dye and UV stabilizer dissolved in ionic liquid solvent. A device was prepared according to EXAMPLE 2 with the exception that it was filled instead with an electrolyte solution of the charge transfer complex formed by reacting N,N'-dimethylviologen dichloride hydrate and N,N,N',N'-tetramethyl-1,4-phenylenediamine (0.015 M) and 1 weight % UVINYL® 3035 (from BASF, Mount Olive, N.J.) dissolved in 1-butyl-3-methylimidazolium bis(trifluoromethanesulfonoyl)imide. The cell was colored using 1.0 volt and had a transmission at 550 nm of 19% and when shorted had a transmission of 70%.

EXAMPLE 6

A device was prepared according to EXAMPLE 2, with the exception that it was filled instead with an electrolyte solution having the composition of 0.015M of the charge transfer complex formed between N,N'-dimethylviologen dichloride hydrate and N,N,N',N'-tetramethyl-1,4-phenylenediamine and 1 weight percent of ethyl 2-cyano-3,3-diphenyl-acrylate (UVINUL® 3035) dissolved in 1-butyl-3-methylimidazolium bis (trifluoromethanesulfonoyl)imide. The cell was colored at 1.0 volt and shorted to bleach. At 550 nm the reflectance of the cell in the bleached mode was 77% and when colored 7.7%. When a potential of 1V was applied, the device reached 50% coloration in 1.6 seconds and 80% coloration in 3.7 seconds.

EXAMPLE 7

Figure 11:
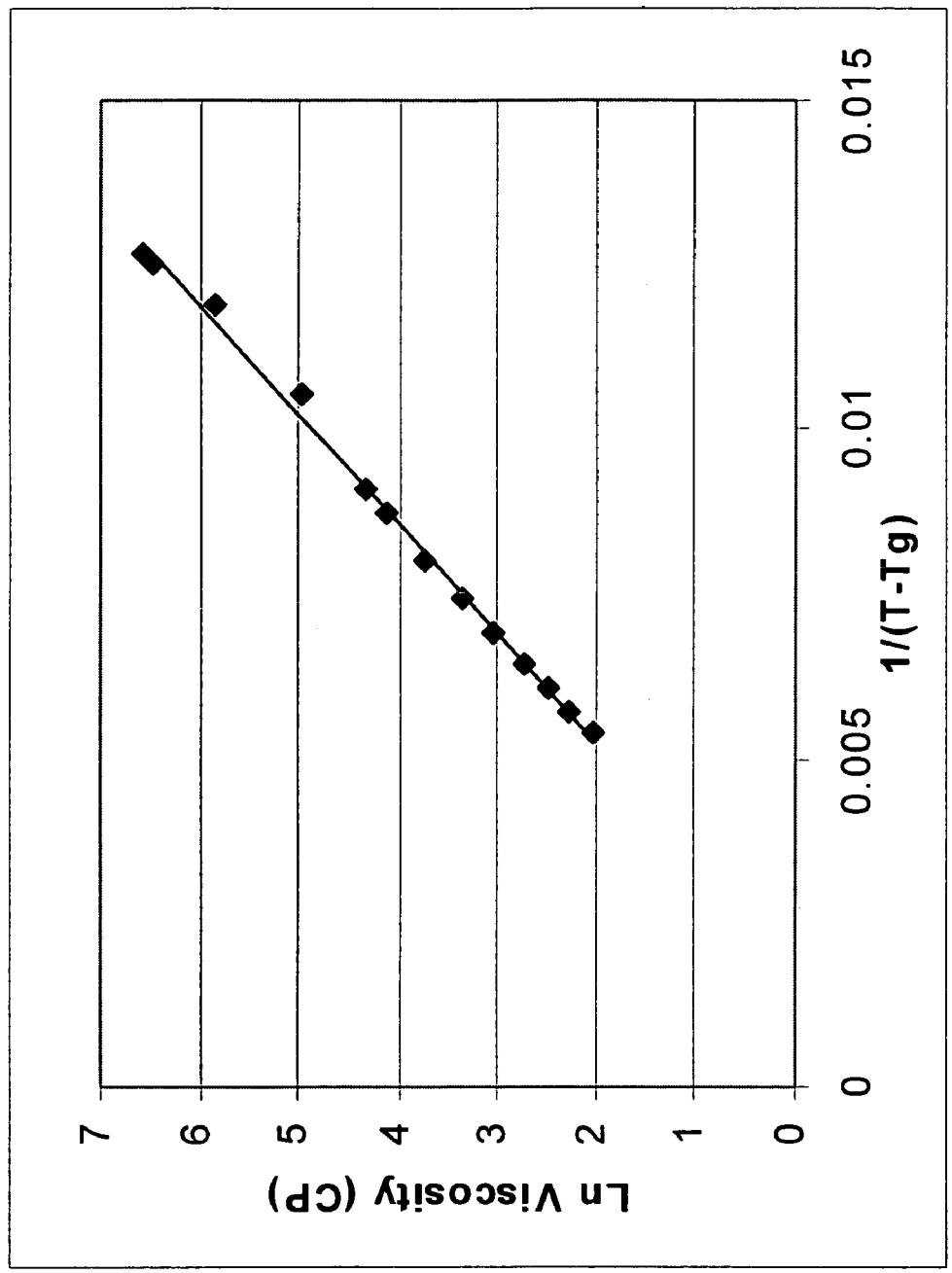
FIG. 11 shows a graph of data used to determine the Tg of an ionic liquid and a solution of an ionic liquid and a non-ionic liquid.
Figure 12:
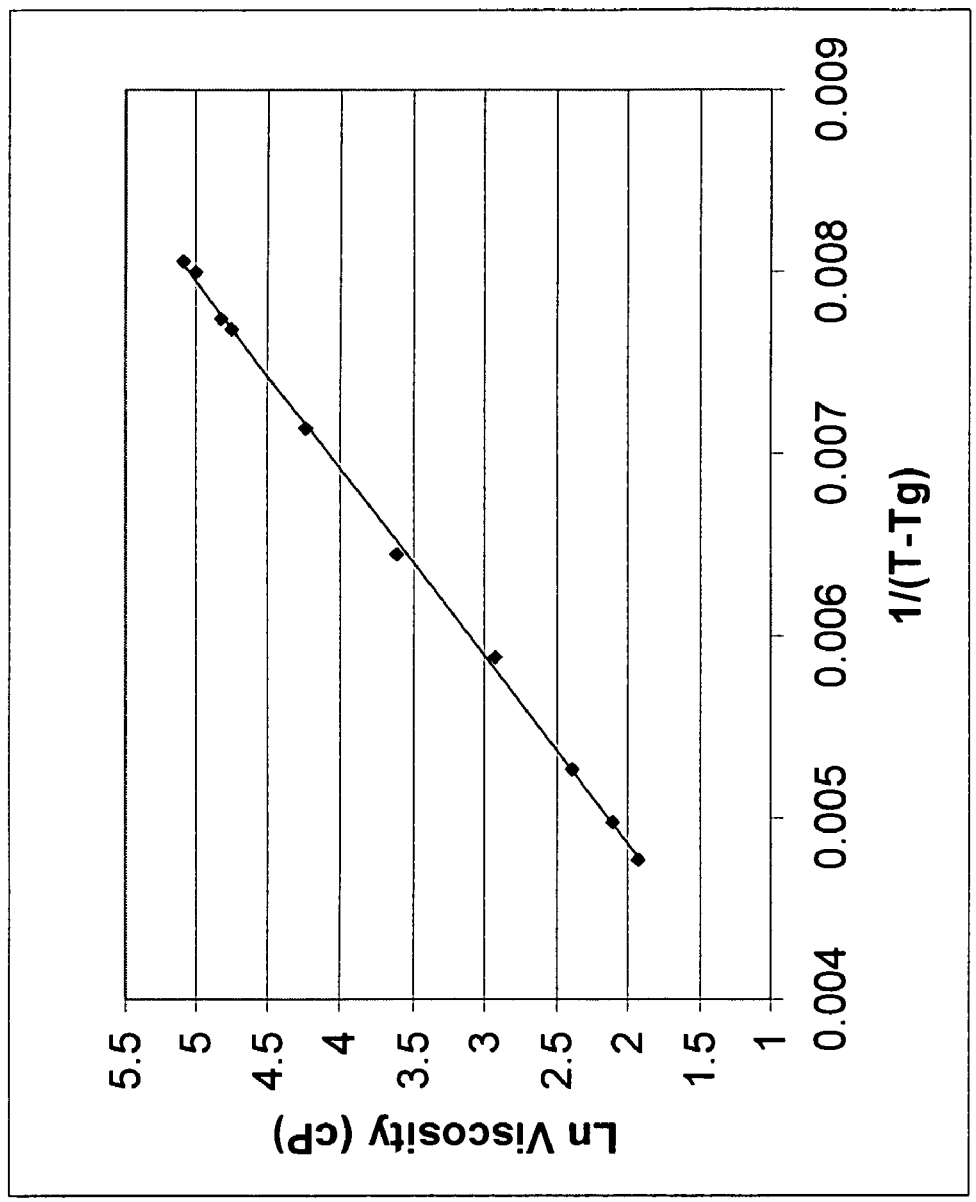
FIG. 12 shows another graph of data used to determine the Tg of an ionic liquid and a solution of an ionic liquid and a non-ionic liquid.

Measuring the viscosity and Tg of liquids. The viscosity of the N-butyl-N-methylpyrrolidinium bis(trifluoromethylsulfonyl)imide (BMP) and that of a mixture of BMP and propylene carbonate (PC) (90:10 by volume) were measured using a cone and plate attachment of a BROOKFIELD viscometer Model DV-III+ (Stoughton, Mass.) at different temperatures. This data obtained for each of these liquids are shown plotted in FIGS. 11 and 12. The data were fit to the following linear equation $$\ln(\text{viscosity})=A+B/(T-Tg)$$

where T is the temperature of measurement in degrees centigrade, Tg is the glass transition temperature in degrees centigrade, and A and B are the fitting constants for the curve. The value of Tg was determined by varying the assumed value of Tg until the correlation coefficient of the curve was highest. For the fit in FIG. 11, the linear correlation coefficient ($R^2$) was 0.996 and for the solvent mixture shown in FIG. 12, the correlation constant was 0.999. The best fit equation for BMP was:

$$\ln(\text{viscosity})=601.41/(T-Tg)-1.1483,$$

where the curve was best fit by a Tg of −85° C. The best fit equation for the mixture of BMI and propylene carbonate was:

$$\ln(\text{viscosity})=967.35/(T-Tg)-2.694,$$

where the curve was best fit by a Tg of −130° C.

EXAMPLE 8

A comparison of EC devices employing three different electrolyte solutions. Three devices were made as described in EXAMPLE 2. The active area of each device was about 94 $cm^2$. The conductivity of the ITO transparent conductors for both the substrates was 13 ohms/square. The bifunctional redox dye was the charge transfer complex formed by reacting 5,10-dihydro-5,10-dimethylphenazine (phenazine in Table 1 below) and N,N'-diethylviologen bis[bis(trifluoromethanesulfonyl)imide] salt (viologen in Table 1 below). The UV stabilizer was UVINUL® 3035. The ionic liquid was BMP. Table 1 below includes the weight in grams of each component of the electrolyte solution.

TABLE 1

| Component | Device 1 | Device 2 | Device 3 |
|---|---|---|---|
| Ionic Liquid | 18.765 | 20.85 | 0 |
| Propylene carbonate (PC) | 1.7835 | 0 | 17.835 |
| Phenazine | 0.1517 | 0.1517 | 0.1517 |
| Viologen | 0.5809 | 0.5809 | 0.5809 |
| UV Stabilizer | 1.064 | 0.8633 | 0.9284 |
| Calculated concentration of ionic species* | 3.05M | 3.37M | 0.05M |

*Assumes no change in volume when PC and the ionic liquids are mixed.

As is shown in Table 1 above, Device 1 employed an electrolyte solution of ionic liquid and non-ionic additive propylene carbonate, device 2 employed ionic liquid without propylene carbonate, and device 3 employed propylene carbonate without any ionic liquid. The viscosity of the electrolyte in device 1 was 50 centipoise (cP) at 25° C. and 8 cP at 82° C. Tg of the electrolyte from the viscosity measurement was determined to be −140° C. The electrolyte thickness of device 1 and 2 was 63 microns. For device 3 this was 175 microns. When the thickness of device 3 was less than 175 microns, the leakage current was so high that the device did not color uniformly; specifically the center did not color to the same extent as the edges. The leakage current decreased with increasing electrolyte thickness, while the other parameters are held constant. Results from these devices are shown in Table 2 below. The transmission of the devices was measured using a fiber optic spectrometer at 550 nm while applying 0.9V for coloration. The leakage current in Device 1 and 2 was lower than in Device 3 even considering the fact that the electrolyte thickness in Device 3 was 175 microns compared to 63 microns for the others. Also this shows that due to the increased leakage current the coloration of Device 3 was too shallow. For a mirror made by imposing a silver reflector on the outside of the device, the low-end transmission would exceed 15%, which is generally considered to be non-effective for an automotive rear-view mirror. Data relating to the percent transmission at a wavelength of 550 nm in the bleached state and colored state, the leakage current, and the time to color and bleach are presented in Table 2 below.

TABLE 2

|  | Device 1 | Device 2 | Device 3* |
|---|---|---|---|
| % Transmission in bleached state at 550 nm | 85 | 85 | 83 |
| % Transmission in colored state at 550 nm | 21 | 20 | 31 |
| Leakage current (mA) in fully colored state | 27.6 | 19.8 | 44.4 |
| Normalized Leakage current (mA/cm$^2$) | 0.29 | 0.22 | 0.47 |
| Time (s) to color for 80% range | 11 | 13 | 11 |
| Time (s) to bleach for 80% range | 11 | 18 | 5 |

EXAMPLE 9

Electrochromic device with a bifunctional dye combining a viologen moiety and a ferrocene moiety. An EC window device was made in an interior rear-view mirror shape. This was approximately 25 cm in length and about 6 cm wide. The substrates were SUNGATE™ 300 glass (from PPG industries, Pittsburgh, Pa.) with a conductive tin oxide coating having a resistance of 40.5 ohms/sq. The electrolyte was backfilled through a hole left in the seal, which was plugged with a UV curing sealant after the filling operation. The electrolyte thickness was 100 microns and the electrolytic solvent was ionic liquid (BMP) and PC mixture. The electrolyte thickness was controlled by adding spacer beads to the perimeter seal material; the perimeter seal material is an epoxy resin. The electrolyte composition was 2.502 g of ionic liquid, 0.2378 g of PC and 0.0973 g of a bifunctional redox dye Fc-Vio having a viologen moiety and a ferrocene moiety (1-(4-ferrocenylbutyl)-1'-methyl-4,4'-Bipyridinium bis(trifluoromethanesulfonoyl)imide). The dye anions were bis(trifluoromethanesulfonyl)imide. When this device was colored at 0.9V its transmission at 550 nm decreased from 79% to 16%. The concentration of all the ionic species in the electrolyte was 3.03 molar assuming that there is no volume change when PC and the ionic liquid are mixed. This device showed good UV stability when tested in its bleached state using an exposure of 2000 kJ using UV intensity conditions prescribed in Society of Automotive Engineers' (Warrandale, Pa.) test J1960.

EXAMPLE 10

Effect of electrolyte ionic concentration on devices with different conductivity transparent conductors. Six window devices of similar size were constructed following the procedures as described in EXAMPLE 2. Details of the electrolyte used are described below. The device size was 6.5 cm×5 cm. The busbars were along the offset edges, which were 5 cm in length. The average active area of the device was about 54×43 mm. All of these devices used ITO as transparent conductor on 2.3 mm thick glass, the electrolyte thickness was 88 micrometers and the EC dye concentration in the electrolyte was 0.05 molar. The EC dye was a bridged dye with both an anodic and a cathodic moiety as described in EXAMPLE 9. Ionic liquid used for this example was BMP. The first set of three devices was constructed using ITO (about 13 ohms/square (half wave ITO)) for both substrates. The second set of three devices was constructed using ITO having an electrical resistivity of 45 ohms/square. The data in the first set of devices using 13 ohms/square is shown in Table 3 below:

TABLE 3

| Device Number | Electrolyte* | Conc.* of ionic species (molar) | Bleached state transmission, % | Colored state transmission, % | Leakage current mA/cm$^2$ | Time to color 80% of range | Time to bleach 80% of range |
|---|---|---|---|---|---|---|---|
| 1 | PC + EC dye | 0.05 | 82.5 | 11.2 | 1.34 | 4.9 | 3.4 |
| 2 | 30% IL + 70% PC + EC Dye | 1.05 | 82.5 | 3.6 | 0.92 | 4.7 | 7.9 |
| 3 | 60% IL + 40% PC + EC Dye | 2.04 | 82.5 | 4.8 | 0.42 | 4.7 | 13.4 |

*Percentages of IL and PC are by volume. In concentration calculations it is assumed that there is no change in volume after mixing the IL and PC.

The devices were colored by applying 1.3V across the two transparent conductors. All the devices were uniform in appearance both in the colored and the bleached state. The range is the difference between the colored state transmission and the bleached state transmission. All transmission values were recorded at 550 nm. The leakage current is measured as the current consumed in the fully colored state (steady state) at the applied coloring potential. The ionic liquid (IL) used in the electrolyte was BMP and the co-solvent was propylene carbonate (PC).

Devices in the second set with the ionic concentration of 0.05 molar (the concentration of dye) and 1.05 molar (concentration of dye and ionic liquid, where ionic liquid has ionic concentration of 1 molar) did not color uniformly as it appeared to the eye, i.e., the colored state showed deep bands near the busbars and only a shallow coloration in the center. This shows that because of the lower conductivity of ITO and the low cell gap, the potential drop towards the device center was too high due to high leakage current. The device with 2.04 molar ionic concentration colored uniformly. Its transmittance was 80.7 and 12.1% in bleached and in the colored states respectively when colored at 1.3 V. Bleaching was done by shorting the two terminals. The leakage current was 0.4 mA/cm$^2$. Its coloration time was 20.9 seconds and a bleach time of 11.9 seconds for 80% range.

EXAMPLE 11

High ionic concentration electrolytes employing solid salts. Electrolytes were made using Lithium bis(trifluoromethanesulfonyl)imide in PC. The salt concentration was 2 molar. The total ionic concentration including dye was 2.05 molar. Device sizes and all other parameters were similar to the ones in EXAMPLE 10. The devices when colored at 1.3 volts were uniform in appearance and the results are as shown in Table 4 below:

TABLE 4

| Device Number | Electrode conductivity, Ohms/square | Conc of ionic species (molar) | Bleached state transmission, % | Colored state transmission, % | Leakage current mA/cm$^2$ | Time to color 80% of range | Time to bleach 80% of range |
|---|---|---|---|---|---|---|---|
| 1 | 13 | 2.05 | 81.2 | 16.2 | 0.26 | 8.4 | 9.1 |
| 2 | 45 | 2.05 | 79.1 | 15.8 | 0.27 | 19.8 | 10.9 |

EXAMPLE 12

Effect of cell gap (electrolyte thickness) and electrolyte composition. A set of nine cells was made with varying cell gap as shown in Table 5 below using only 45 ohms/square resistivity ITO. The electrolyte included 0.05 molar EC bifunctional redox dye Fc-Vio having a viologen moiety and a ferrocene moiety (1-(4-ferrocenylbutyl)-1'-methyl-4,4'-Bipyridinium bis(trifluoromethanesulfonoyl)imide), which was also used in EXAMPLE 9. For the devices 1, 2, 3, 4, 6 and 8, the electrolyte solvent was a mixture of 60% IL and 40% PC by volume. For devices 7 and 9, only PC was used as the electrolytic solvent. For device 5, the volume ratio of IL to PC was 30:70. All other details were similar to that in EXAMPLE 10. Results when these devices were colored at 1.3 V are shown in Table 5 below.

TABLE 5

| Device Number | Cell Gap, micrometers | Conc* of ionic species (molar) | Bleached state transmission, % | Colored state transmission, % | Leakage current mA/cm$^2$ | Time to color 80% of range | Time to bleach 80% of range |
|---|---|---|---|---|---|---|---|
| 1 | 74 | 2.04 | 80.7 | 12.1 | 0.47 | 15.5 | 10.8 |
| 2 | 88 | 2.04 | 80.7 | 12.1 | 0.40 | 20.9 | 11.9 |
| 3 | 125 | 2.04 | 78.5 | 1.5 | 0.33 | 20.7 | 32.1 |
| 4 | 175 | 2.04 | 76.8 | 0.3 | 0.24 | 19.3 | 60.7 |
| 5 | 175 | 1.04 | 78.3 | 1.2 | 0.41 | 22.4 | 29.1 |
| 6 | 300 | 2.04 | 71.3 | 0* | 0.14 | 20.8 | 169 |
| 7 | 300 | 0.05 | 74.9 | 0* | 0.38 | 23.5 | 50.7 |
| 8 | 420 | 2.04 | 69.5 | 0* | 0.11 | 21.8 | 356 |
| 9 | 420 | 0.05 | 68.2 | 0* | 0.33 | 25.9 | 113 |

*Within 0.1%

EXAMPLE 13

Effect of Ionic Concentration in reflective devices. The window cells made in EXAMPLE 10 were re-evaluated in a reflective mode by placing a silvered glass on their backs. In actual mirror application one of the outside surfaces of the cell would be silvered or a reflective conductor would replace one of the ITO conductors. The results are as shown in Table 6 below.

TABLE 6

| Device Number | Electrolyte* | Conc.* of ionic species (molar) | Bleached state reflection, % | Colored state reflection, % | Leakage current mA/cm$^2$ | Time to color 80% of range | Time to bleach 80% of range |
|---|---|---|---|---|---|---|---|
| 1 | PC + EC dye | 0.05 | 77.2 | 5.7 | 1.34 | 2.9 | 3.8 |
| 2 | 30% IL + 70% PC + EC Dye | 1.05 | 75 | 7.4 | 0.92 | 4.4 | 8.7 |
| 3 | 60% IL + 40% PC + EC Dye | 2.04 | 75.7 | 4.3 | 0.42 | 2.4 | 14.9 |

*Percentages of IL and PC are by volume. In concentration calculations, it is assumed that there is no change in volume after mixing the IL and PC.

Device in the second set with ITO conductivity of 45 ohms/square and with 2.04 molar ionic concentration in the electrolyte colored uniformly. Its reflection was 79.4 and 7.4% in bleached and in the colored states respectively when colored at 1.3V. Bleaching was done by shorting the two terminals. The leakage current was 0.4 mA/cm². Its coloration time was 12 seconds and a bleach time of 14.6 seconds for 80% range.

EXAMPLE 14

High ionic concentration electrolytes employing solid salts in reflective devices. Electrolytes were made using Lithium bis(trifluoromethanesulfonyl)imide in PC. The salt concentration was 2 molar. The total ionic concentration including dye was 2.05 molar. Device sizes and all other parameters were similar to the ones in EXAMPLE 11. Reflectivity to the device was added as described in EXAMPLE 13. The devices when colored at 1.3 volts were uniform in appearance and the results are as shown in Table 7 below.

and the cell construction and filling is described in EXAMPLE 9. The electrolyte thickness was 88 microns and the electrolytic solvent was ionic liquid (BMP) and PC mixture. The dye concentration in the electrolyte was 0.05 molar. The composition of the electrolytic solvent was 30% PC and 70% IL by volume. Again assuming no volumetric change when these two components are mixed, the ionic concentration of the electrolyte was 2.37 molar. When this device was colored at 1.3V its reflection at 550 nm decreased from 81.8% to 7.7%. The leakage current on this device was 0.21 A/cm². The coloring time was 8.5 and bleaching time was 20.6 seconds.

Another device was constructed in a size of 6.5×5 cm as described in EXAMPLE 10 and then placed against a reflector as described above. A similar electrolyte was used in terms of solvent composition and the dye type, but the dye concen-

TABLE 7

| Device Number | Electrolyte* conductivity, Ohms/square | Conc.* of ionic species (molar) | Bleached state reflection, % | Colored state reflection, % | Leakage current mA/cm² | Time to color 80% of range | Time to bleach 80% of range |
|---|---|---|---|---|---|---|---|
| 1 | 13 | 2.05 | 75 | 7.4 | 0.26 | 4.4 | 8.7 |
| 2 | 45 | 2.05 | 77.1 | 9.6 | 0.27 | 14.5 | 12.0 |

*Percentages of IL and PC are by volume. In concentration calculations, it is assumed that there is no change in volume after mixing the IL and PC.

EXAMPLE 15

Effect of cell gap (electrolyte thickness) on reflective devices. The set of nine cells described in EXAMPLE 12 were re-evaluated in the reflective mode. The cells were made reflective as described in EXAMPLE 13. Results on these devices when colored at 1.3 V are shown in Table 8 below.

tration was 0.075 molar and the cell gap was 53 microns. The total ionic concentration was 2.4 molar. This device colored to a uniform state from 80.5% to 10% reflectivity when powered at 1.5 volts in 8.6 seconds. It bleached on shorting in 8.2 seconds. The coloration and bleach times relate to 80% of the range as in other examples. The leakage current in the colored state was 0.54 mA/cm². The device was self-erasing, i.e.,

TABLE 8

| Device Number | Cell Gap, micrometers | Conc* of ionic species (molar) | Bleached state reflection, % | Colored state reflection, % | Leakage current mA/cm² | Time to color 80% of range | Time to bleach 80% of range |
|---|---|---|---|---|---|---|---|
| 1 | 74 | 2.04 | 80.5 | 7.3 | 0.47 | 9.4 | 13.3 |
| 2 | 88 | 2.04 | 79.4 | 7.4 | 0.40 | 12 | 14.6 |
| 3 | 125 | 2.04 | 76.0 | 6.2 | 0.33 | 11 | 31.6 |
| 4 | 175 | 2.04 | 73.0 | 6.3 | 0.24 | 10.4 | 67.8 |
| 5 | 175 | 1.04 | 74.8 | 6.2 | 0.41 | 11.4 | 34.2 |
| 6 | 300 | 2.04 | 64.8 | 6.6 | 0.14 | 11.1 | 168 |
| 7 | 300 | 0.05 | 70.3 | 6.3 | 0.38 | 12.7 | 58.2 |
| 8 | 420 | 2.04 | 59.0 | 6.3 | 0.11 | 11.2 | 105 |
| 9 | 420 | 0.05 | 60.5 | 6.4 | 0.33 | 12.7 | 369 |

*Percentages of IL and PC are by volume. In concentration calculations, it is assumed that there is no change in volume after mixing the IL and PC.

EXAMPLE 16

Examples of electrochromic reflective devices with a bifunctional dye combining a viologen moiety and a ferrocene moiety. An EC window device was made in an automotive interior rear-view mirror shape. The substrates were 45 ohm/square ITO coated glass plates in a thickness of 2.3 mm. This device was approximately 25 cm in length and about 6 cm wide. The cell was made reflective by placing a silver coated glass reflector behind this device. The dye used when the power was removed while in the colored state, the device spontaneously returned to its bleached state in a few minutes.

EXAMPLE 17

Effect of cell gap, dye concentration and total ionic concentration. A set of 4 devices was prepared using a pair of 45 ohms/square ITO conductors as discussed in EXAMPLE 10 and EXAMPLE 13. These devices were only different in terms of electrolyte thickness and the composition of the electrolyte solvent as given below. These devices were colored by applying 1.3 volts and shorted for bleaching. All the devices were uniformly reflecting in the colored state. All measurements were at 550 nm. Data and results are presented in Table 9 below.

TABLE 9

|  | Device 1 | Device 2 | Device 3 | Device 4 |
|---|---|---|---|---|
| Cell Gap, micrometers | 74 | 74 | 74 | 63 |
| Concentration of the Dye in electrolyte, molar | 0.05 | 0.04 | 0.07 | 0.07 |
| Electrolyte solvent composition | 80% IL + 20% PC | 70% IL + 30% PC | 70% IL + 30% PC | 70% IL + 30% PC |
| Total ionic concentration, molar | 2.70 | 2.36 | 2.39 | 2.39 |
| Bleached, % reflection | 80.6 | 81.4 | 78.7 | 79.5 |
| Colored, % reflection | 7.9 | 8.3 | 6.7 | 7.3 |
| Time to color- 80% range, s | 7.5 | 6.3 | 7.6 | 7.3 |
| Time to bleach- 80% range, s | 18.7 | 15.3 | 18.1 | 11.3 |
| Leakage current, mA/cm$^2$ | 0.25 | 0.30 | 0.49 | 0.57 |

EXAMPLE 18

Devices with cobalt containing anodic dyes. Two anodic dyes, Co-phen and Co-terpy respectively were synthesized. The structure for Co-phen (top) and Co-terpy (bottom) are shown below.

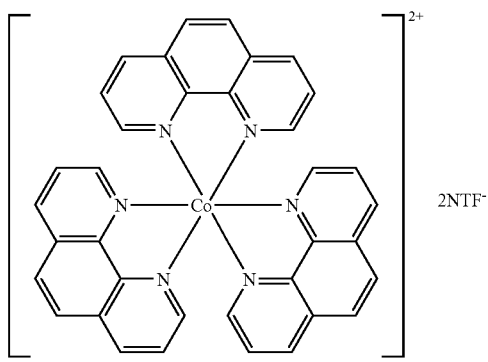

In both of these dyes the anion was bis(trifluoromethanesulfonyl)imide (NTF). These anodic dyes were made into electrolytes comprising of 70% BMP and 30% PC by weight as solvent. In both cases the cathodic dye was diethylviologen bis(trifluoromethanesulfonyl)imide. The concentration of each, namely the anodic compound and that of the cathodic compound was 0.005 molar. Two window devices were made (one with each dye) as described in EXAMPLE 10. The electrolyte thickness was 88 microns and the transparent conductor was an ITO coating with a conductivity of 45 ohms/square. The device with Co-terpy as anodic dye was orange in color in bleached state. The devices were colored by applying a potential of 1.3 V. The device with Co-phen colored from a clearly transmitting state of 83% to a blue color at 18% transmission. The transmission values were measured at 550 nm for all devices in this example. The Co-terpy comprising device colored from 50% to 6% and appeared neutral in color to the eye in their dark state. Although not shown, these anodic dyes may also be coupled to viologen dyes to give single bridged compounds with both anodic and cathodic functionality.

EXAMPLE 19

EC device. An EC window was constructed in a method and size similar to EXAMPLE 10. The electrolyte was 1-(ferrocenylmethyl)-1'-methyl-4,4'-Bipyridinium bis(trifluoromethanesulfonoyl)imide dye in propylene carbonate. The ITO conductivity was 13 ohms/square and the electrolyte thickness was 100 microns. The device colored reversibly in a range of 68% to 30% at 550 nm. The coloration time was 3.4 seconds to cover 80% of this range.

EXAMPLE 20

Photochromic device. A user controllable photochromic device was prepared with an electrochromic layer. Details on electrode and device preparation other than the electrolyte composition were according to Examples 1 to 3 in U.S. Pat. No. 6,246,505, incorporated by reference herein. Substrates were TEC 10 glass from Pilkington (Toledo, Ohio). The device size was 2"×2.5" and the electrochromic electrode was amorphous tungsten oxide (formed at 250° C.). The light sensitive electrode was composed of crystalline titanium dioxide (titania) deposited from a colloidal dispersion. The average titania coating thickness was 240 nm and that of tungsten oxide was 450 nm. The cell gap (i.e. the electrolyte thickness) was 88 microns. The cell cavity was filled under nitrogen atmosphere with an electrolyte composed of 0.1 M lithium iodide in the ionic liquid 1-butyl-3-methyl-pyrrolidinium bis(trifluoromethylsulfonyl)imide. The cell as filled had a transmission at 550 nm of 65%. When the electrical leads from each electrode were shorted and the cell placed in sunlight, the transmission (at 550 nm) changed from 65% transmission to 46% transmission in 15 minutes. When the leads from the electrode were not connected, the cell transmission changed only from 65% transmission to 62% transmission after 15 minutes under similar sunlight exposure.

EXAMPLE 21

Photochromic device. A user controllable photochromic device cavity was prepared Details on electrode and device preparation are as in EXAMPLE 20. The cell cavity was filled under nitrogen atmosphere with an electrolyte composed of 0.1 M lithium iodide and 10 vol. % 3-butylpyridine in 1-butyl-3-methyl-pyrrolidinium bis(trifluoromethylsulfonyl)imide. The device as filled had a transmission at 550 nm of 72.3%. When the electrical leads from each electrode were shorted and the cell placed in sunlight the transmission changed from 72.3% to 37% transmission in 15 minutes. Under a bleach potential of 1.3 volts, the cell transmission changes from 37% to 66% transmission in 400 seconds.

EXAMPLE 22

Photochromic device. A user controllable photochromic device cavity was prepared as described in EXAMPLE 20 with the exception that crystalline tungsten oxide was employed as the electrochromic layer; this layer was formed by heat-treating the coating to a temperature of 350° C. The coating thickness was 420 nm. The cell cavity was filled under nitrogen atmosphere with an electrolyte composed of 0.1 M lithium iodide and 10 vol. % 3-butylpyridine in 1-butyl-3-methyl-pyrrolidinium bis(trifluoromethylsulfonyl)imide.

The filled device had a transmission at 550 nm of 74%. When the electrical leads from each electrode were shorted and the cell placed in sunlight, the transmission changed from 74% to 38% transmission in 15 minutes. Under a bleach potential of 1.3 volts the cell transmission changed from 38% to 65% transmission in 400 seconds.

EXAMPLE 23

EC device employing an electrolyte solution of ionic liquid solvent and bifunctional redox dye having cathodic moiety and europium anodic moiety. A mixture of 1.0 grams of Eu(II) chloride and 2 equivalents of hydrogen bis(trifluoromethanesulfonyl)imide was heated until gas evolution stopped. The product, Eu(II) bis(trifluoromethanesulfonyl)imide, was then purified by heating in a vacuum at 60° C. for four hours. Eu(II) bis(trifluoromethanesulfonyl)imide (100 mg) and N,N'-diethylviologen bis(trifluoromethanesulfonyl)imide (100 mg) were dissolved in N-butyl-N-methylpyrrolidinium bis(trifluoromethylsulfonyl)imide (2 mL). The resulting solution was placed between two ITO plates. The resulting electrochromic device successfully colored and bleached repeatedly upon cyclic applications of a voltage across the cell, presumably by oxidizing the Eu(II) to Eu(III) while at the same time reducing the diethylviologen to the corresponding radical cation.

EXAMPLE 24

Synthesis of bifunctional redox dye and use in an EC device. A mixture of 1-bromo-2-ethylhexane (1.2 g) and 4,4'-bipyridine (1 g) in acetonitrile (20 mL) was heated at 130° C. in a sealed tube for 24 hours to yield, after purification, 4-(2-ethylhexyl)-4,4'-bipyridine bromide (2 g). An aqueous solution of 4-(2-ethylhexyl)-4,4'-bipyridine bromide (0.5 g), sodium hydroxide (40 mg), and 1-bromoacetic acid (200 mg) was refluxed for 12 hrs, then lithium bis(trifluoromethylsulfonyl)imide (500 mg) was added and a white precipitate formed. The white precipitate, 4-(2-ethylhexyl)-4'-methylenecarboxylate-4,4'-viologen bis(trifluoromethylsulfonyl)imide, was filtered and dried (yield: 620 mg). 4-(2-ethylhexyl)-4'-methylenecarboxylate-4,4'-viologen bis(trifluoromethylsulfonyl)imide has the structural formula

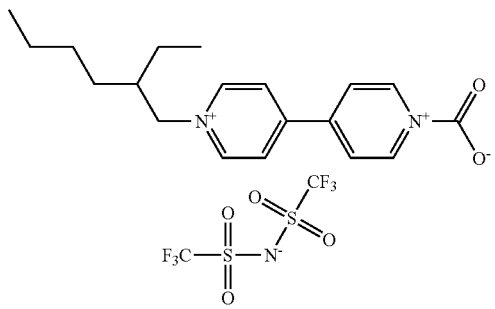

and was used in an EC device. 4-(2-ethylhexyl)-4'-methylenecarboxylate-4,4'-viologen bis(trifluoromethylsulfonyl)imide (602 mg) was mixed with Eu(II) bis(trifluoromethylsulfonyl)imide (518 mg), melted, and maintained as a melt for 15 minutes to form 4-(2-ethylhexyl)-4'-methylenecarboxylate(europium(II))-4,4'-viologen tris(bis(trifluoromethylsulfonyl)imide), which has the structural formula:

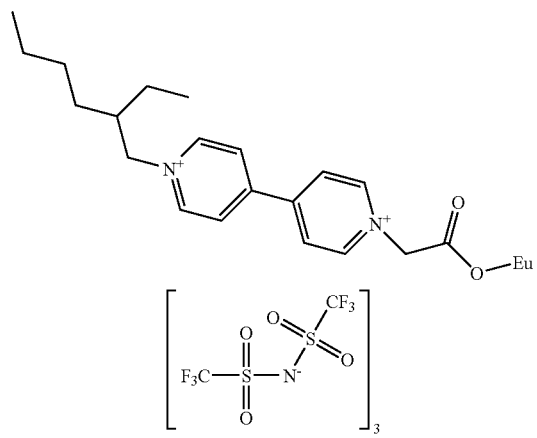

An electrochromic device using 4-(2-ethylhexyl)-4'-methylenecarboxylate(europium(II))-4,4'-viologen tris(bis(trifluoromethylsulfonyl)imide) was prepared by dissolving 4-(2-ethylhexyl)-4'-methylenecarboxylate(europium(II))-4,4'-viologen tris(bis(trifluoromethylsulfonyl)imide) (600 mg) in N-butyl-N-methylpyrrolidinium bis(trifluoromethylsulfonyl)imide (BMP, 3 mL). An EC device was prepared by placing the resulting electrolyte solution was placed in the chamber formed by an o-ring and two ITO electrodes. The device successfully colored and bleached repeatedly upon cyclic applications of a voltage to the electrodes of the device, which presumably functions by oxidizing the Eu(II) to Eu(III) and reducing the diethylviologen to the radical cation.

EXAMPLE 25

Weight loss of solvents in a vacuum. Propylene carbonate (1 g) was placed in a container having a surface area of 1.5 cm², which was then heated to 100° C. under a vacuum of 1 mm Hg. After 1 hour, atmospheric pressure was restored and the vial was cooled to room temperature. The sample was re-weighed, and 0.627 g of propylene carbonate remained. The ionic liquid N-butyl-N-methylpyrrolidinium bis(trifluoromethylsulfonyl)imide (BMP) (1 g) was placed in a container having a surface area of 1.5 cm², which was then heated to 100° C. under a vacuum of 1 mm Hg. After 1 hour, atmospheric pressure was restored and the vial was cooled to room temperature. The sample was re-weighed using a scale accurate to 1 mg, and no change in mass was observed.

EXAMPLE 26

Preparation of Butylmethylpyrrolidinium Bis(Trifluoromethylsulfonyl)Imide. Butylmethylpyrrolidinium bis(trifluoromethylsulfonyl)imide was prepared as follows: A solution of butylmethylpyrrolidinium bromide (50 g) in deionized water (100 mL) was prepared. Decolorizing charcoal or activated carbon (3 g) was added to the solution, and the resulting mixture was boiled for three minutes, then cooled to room temperature and filtered. The filtrate (a purified solution of butylmethylpyrrolidinium bromide) was added to an aqueous solution (1 L) prepared from bis(trifluoromethylsulfonyl) amine (65 g) and sodium hydroxide (9.25 g). The resulting mixture was stirred at room temperature for 3 hrs, after which two layers had formed. The bottom layer containing butylmethylpyrrolidinium bis(trifluoromethylsulfonyl)imide was separated away from the top layer, washed with deionized water (3×500 mL), heated at a temperature of 100° C. under vacuum (0.1 mbar) for 48 hrs, and then filtered through activated alumina to give as product the highly pure molten salt butylmethylpyrrolidinium bis(trifluoromethylsulfonyl)imide. The high purity of the molten salt was confirmed by cyclic voltammetry, absorbance spectroscopy, and/or fluorescence measurements.

EXAMPLE 27

Preparation of Butylmethylimidazolium Bis(Trifluoromethylsulfonyl)Imide. Butylmethylimidazolium bis(trifluoromethylsulfonyl)imide was synthesized as follows: A solution of butylmethylimidazolium chloride (40 g) in deionized water (100 mL) was prepared. Decolorizing charcoal or activated carbon (3 g) was added to the solution, and the resulting mixture was boiled for 3 minutes and filtered. The filtrate was added to an aqueous solution (1 L) prepared from bis(trifluoromethylsulfonyl)amine (65 g) and sodium hydroxide (9.25 g). The mixture was stirred at room temperature for 3 hrs, after which two layers had formed. The bottom layer containing butylmethylimidazolium bis(trifluoromethylsulfonyl)imide was separated away from the top layer, washed deionized water (3×50 mL), heated at 100° C. under vacuum for 48 hrs, and then filtered through activated alumina to give anhydrous, highly pure, molten salt butylmethylimidazolium bis(trifluoromethylsulfonyl)imide. The purity of the molten salt was assayed by cyclic voltammetry, absorbance spectroscopy or fluorescence measurements. This preparation procedure has the advantage that the materials can be made from the appropriate acid, which is less expensive than the corresponding lithium salt.

EXAMPLE 28

EC devices with bridged dyes. Two devices were prepared using a bridged dye that included a cation having an anodic portion (phenazine) and a cathodic portion (viologen). The cation has been described in "Electrochromic Dye System for Smart Window Applications," by Alexander Michaelis et al., Advanced Materials, vol. 13, pp. 1825-1828. In contrast to the specific dyes reported in Michaelis et al, the bridged dye used in EXAMPLE 28 included the anion bis(trifluoromethanesulfonyl)imide (BMP).

Each device was prepared as follows: two pieces of ITO coated on glass were cut into 2"×2.5" sections. One piece was drilled with two fill holes at opposite ends of the long diagonal. An epoxy containing 88 micron glass spacers was placed on the perimeter of one of the ITO substrates. The second substrate was then placed on top of the epoxy coated ITO glass, in a position that was slightly off-center. Clamps were applied to the assembly at the perimeter to ensure intimate contact as well as to ensure that the cell spacing conformed to the spacer size in the epoxy. The assembly was fired in an oven at 150° C. for one hour to cure the epoxy, and then filled with electrolyte medium under a dry inert atmosphere by injecting the medium through one of the fill holes. Both the holes were subsequently sealed using a room temperature UV curing epoxy. The dye concentration for both devices was 0.05 M. Busbars for powering were placed on the side of the substrate that was 2.5 inches long.

For one of the devices, device, the conductivity of the ITO for both substrates was 13 ohms/square, and propylene carbonate (PC) was the solvent. This device colored from 76% transmission to 5% at 550 nm. The coloring time for 80% range was 8.4 seconds, and the bleach time was 26.8 seconds.

In the second device, the conductivity of the ITO was 45 ohms/square ITO. The solvent for the electrolyte was 70% n-butyl n-methylpyrrolidinium bis(trifluoromethanesulfonyl)imide (BMP) ionic liquid and 30% PC. This device colored from 74% to 21% at 550 nm. The coloring time was 14.4 seconds for 80% range and the bleach time was 15.5 seconds.

In both devices, coloring voltage was 1.3 V and bleaching was accomplished by shorting the two electrodes.

EXAMPLE 29

Electrochromic device with electrolyte solution including redox dye. ITO substrate (15 Ω/sq) is cut into two 5.25"×3.7" rectangular pieces. Two holes about 3 mm in diameter are drilled into one piece near the corners one of the diagonals. The substrates are then dried and stored under clean room conditions. An epoxy containing 105 micron glass bead spacers is dispensed around the edges of one of the substrates, and the second substrate is placed on top of it to make a cavity such that the two substrates are slightly off-centered along the long side of the rectangular edge. The perimeter seal width is about 2 mm. This exposed edge on both substrates is later used to apply a busbar and make electrical connections. The epoxy seal is cured at a temperature of 120° C. The cavity is filled at room temperature with a liquid electrolyte solution containing 0.015 M of the product charge transfer complex formed by reacting N,N'-dimethylviologen bis(trifluoromethanesulfonyl)imide (methyl viologen imide salt) and 1,4:5,8-Dimethano-1,2,3,4,5,6,7,8-octahydro-9,10-dimethoxy-anthracene in 1-butyl-3-methylimidazolium bis(trifluoromethanesulfonyl)imide. After filling the cavity with the electrolyte solution, the two holes are plugged with Teflon balls (preferably the diameter of the ball is 5 to 30% bigger than the diameter of the hole) and further sealed using cover glass and an epoxy. A solder strip is applied to the exposed ITO on each substrate along the long sides of the cavity using an ultrasonic solder. Electrical wires are then attached to these solder strips. A potential of 1.0 volts is applied. This device colors uniformly to a neutral color and reverses to the original colorless state upon bleaching by shorting the electrical leads from the two electrodes.

EXAMPLE 30

Electrochromic device with electrolyte solution including redox dye. ITO substrate (15 Ω/sq) is cut into two 5.25"×3.7" rectangular pieces. Two holes about 3 mm in diameter are drilled into one piece near the corners one of the diagonals. The pieces are then, dried and stored under clean room conditions. An epoxy containing 105 micron glass bead spacers is dispensed around the edges of one of the pieces, and the second piece is placed on top of it to make a cavity such that the two pieces are slightly off-centered along the long side of the rectangular edge. The perimeter seal width is about 2 mm. This exposed edge on both substrates is later used to apply a busbar and make electrical connections. The epoxy seal is cured at a temperature of 120° C. The cavity is filled at room temperature with a liquid electrolyte solution containing 0.015 M of N,N'-ethylviologen bis(trifluoromethanesulfonyl)imide and 0.015 M of 1,4:5,8-Dimethano-1,2,3,4,5,6,7,8-octahydro-9,10-dimethoxy-anthracene in a solution of propylene carbonate with 30% w/w 1-butyl-3-methylimidazolium bis(trifluoromethanesulfonyl)imide. After the cavity is filled, the two holes are plugged with Teflon balls (preferably the diameter of the ball is 5 to 30% bigger than the diameter of the hole) and further sealed using cover glass and an epoxy. A solder strip is applied to the exposed ITO on each substrate along the long sides of the cavity using an ultrasonic solder. Electrical wires are then attached to these solder strips. A potential of 1.5 volts is applied. This device colors uniformly to a neutral color and reverses to the original colorless state upon bleaching by shorting the electrical leads from the two electrodes.

EXAMPLE 31

Electrochromic device with electrolyte solution including redox dye. ITO substrate (15 Ω/sq) is cut into two 5.25"×3.7" rectangular pieces. Two holes about 3 mm in diameter are drilled into one piece near the corners one of the diagonals. The pieces are then, dried and stored under clean room conditions. An epoxy containing 105 micron glass bead spacers is dispensed around the edges of one of the pieces, and the second piece is placed on top of it to make a cavity such that the two pieces are slightly off-centered along the long side of the rectangular edge. The perimeter seal width is about 2 mm. This exposed edge on both substrates is later used to apply a busbar and make electrical connections. The epoxy seal is cured at a temperature of 120° C. The cavity is filled at room temperature with a liquid electrolyte solution containing 0.015 M of N,N'-ethylviologen bis(trifluoromethanesulfonyl)imide and 0.015M of 2,3,6,7,10,11,14,15-Octamethoxytetraphenylene in a solution of propylene carbonate with 30% w/w 1-butyl-3-methylimidazolium bis(trifluoromethanesulfonyl)imide. After the cavity is filled, the two holes are plugged with Teflon balls (preferably the diameter of the ball is 5 to 30% bigger than the diameter of the hole) and further sealed using cover glass and an epoxy. A solder strip is applied to the exposed ITO on each substrate along the long sides of the cavity using an ultrasonic solder. Electrical wires are then attached to these solder strips. A potential of 1.5 volts is applied. This device colors uniformly to a neutral color and reverses to the original colorless state upon bleaching by shorting the electrical leads from the two electrodes.

EXAMPLE 32

Electrochromic device with electrolyte solution including redox dye. A first electrode is prepared as follows: 2.5 cm×2.5 cm transparent nanostructured semiconductor film consisting of a 4 μm thick layer of fused $TiO_2$ nanocrystallites is deposited on a 3 cm.×3 cm fluorine-doped tin oxide on glass substrate. A colloidal $TiO_2$ dispersion is prepared by hydrolysis of titanium tetraisopropoxide. A 4 μm thick layer of the above sol is deposited using a screen-printing technique on the conducting glass substrate. The resulting gel-film is dried in air for 1 h, sintered in air at 450° C. for 12 h. The result is transparent nanostructured electrodes that are 4 μm thick and have a surface roughness of about 1000. The $TiO_2$ films are modified by chemisorption of a monolayer of bis-(2-phosphonoethyl)-4,4'-bipyridinium dichloride from an aqueous solution (0.02 M) over 24 h, washed with distilled isopropanol and dried in a darkened vacuum desiccator.

A second electrode is prepared as follows: a transparent nanostructured $SnO_3$:Sb film(2.5 cm×2.5 cm) is prepared on a F-doped tin oxide glass substrate (3.3 cm×3.3 cm) largely as described by Boschloo et al., in "Spectroscopy of Highly Doped Nanostructured Tin Dioxide Electrodes," The Journal of Physical Chemistry, 1999, vol. 103, pp 3093-3098. The resulting transparent nanostructured $SnO_2$:Sb films are 3.0 μm thick and has a surface roughness of about 1000. These $SnO_2$:Sb films are modified by chemisorption of a monolayer of 2,3,6,7,10,11,14,15-Octamethoxytetraphenylene, from a chloroform solution (0.02 M) during 6 h, washed with distilled isopropanol, dried in air and stored in a darkened vacuum desiccator for 24 h prior to use.

A cell with an internal spacing of about 400 μm is constructed using the electrodes and a thermoplastic gasket. This gasket has an opening at one corner. The cell is evacuated, dipped with the opening in the electrolyte solution, and filled by releasing the vacuum. The electrolyte solution consists of $LiClO_4$ (0.02 M) in γ-butyrolactone.

The electrochromic device is powered by application of a voltage of about 1.3 V.

EXAMPLE 33

Electrochromic Mirror: An electrochromic rearview interior automotive mirror was made using two glass substrates, which were sealed at the perimeter with a slight offset along their long edges to allow a busbar to be placed. The sealant width was uniform and between 1.5 to 2.5 mm. The mirror was of a trapezoidal shape with curvature along the long edges with an active area of average equivalent rectangular dimensions of about 5 cm×24 cm. The main epoxy sealant used spacer beads in a diameter of about 80 microns so as to result in a cavity of about this thickness. A small plughole was left in the sealant towards one end of the narrow edge so that the liquid electrolyte could be backfilled and then sealed. The substrates were coated with ITO having a resistivity of about 12 to 15 ohms/square and faced inward of the cavity. To form a mirror, one of the substrates on one of the outside surfaces was further coated with aluminum-titanium alloy and then painted for protection. The cavity was filled with a liquid electrolyte comprising 50:50 propylene carbonate and N-butyl-N-methylpyrrolidinium bis(trifluoromethylsulfonyl) imide (BMP) ionic liquid (ratio by volume) along with 0.05 molar of the bridged dye 1-4 ferrocenylbutyl-1'-methyl 4-4'-bipyridinium bis(trifluoromethylsulfonyl)imide. After filling the plug hole was sealed with a UV curable acrylate sealant. The mirror was powered at room temperature at 1.2V to color and the speed was 4 s to color 80% of the range and the bleach speed upon shorting was 8 seconds (s) for 80% of the range. The bleach reflection (% R) was 72.8% and the colored reflection was 5.1% at 550 nm. The mirror was self-erasing, i.e., upon removal of power the mirror self bleached without shorting or applying additional power. In another experiment the mirror was powered using various voltages and the following data in Table 10 were recorded at room temperature:

TABLE 10

| Applied voltage, V | Steady state leakage current, mA | % R at the device center at 550 nm |
| --- | --- | --- |
| 0.8 | 24.6 | 26 |
| 0.9 | 44 | 13 |
| 1 | 62.5 | 7.6 |
| 1.1 | 75.8 | 5.1 |
| 1.2 | 82.1 | 5 |

EXAMPLE 34

Electrochromic reflective device with a bifunctional dye of viologen moiety and methoxyanthracene moiety. An EC window device is made in an automotive interior rear-view mirror shape. Electrodes are prepared using substrates that are 45 ohm/square ITO coated glass plates having a thickness of 2.3 mm. This device is approximately 25 cm in length and about 6 cm wide. The device is made reflective by placing a silver coated glass reflector behind this device. The dye used and the device construction and filling is described in EXAMPLE 2 (vide supra) with the exception that the electrolyte has 1,4:5,8-Dimethano-1,2,3,4,5,6,7,8-octahydro-9,10-methoxy butyl 1'-methyl-4,4'-Bipyridinium-anthracene. The electrolyte thickness is 88 microns and the electrolytic solvent is ionic liquid (BMP) and PC mixture. The dye concentration in the electrolyte is 0.05 M. The composition of the electrolytic solvent is 30% PC and 70% IL by volume. Again assuming no volumetric change when these two components are mixed, the ionic concentration of the electrolyte is 2.37 M. The device colors when powered at 1.3 V.

EXAMPLE 35

An EC window is constructed in a method and size similar to EXAMPLE 10. The electrolyte has 1,4:5,8-Dimethano-1,2,3,4,5,6,7,8-octahydro-9,10-methoxy butyl 1'-methyl-4,4'-Bipyridinium-anthracene and the electrolytic solvent is ionic liquid (BMP) and PC mixture.

EXAMPLE 36

An electrochromic rearview interior automotive mirror was made using two glass substrates, which were sealed at the perimeter with a slight offset along their long parallel edges to allow a spring busbar to be placed. The substrates were glass coated with ITO having a resistivity of about 12 to 15 ohms/square and faced inward of the cavity. To form a mirror, one of the substrates was further coated (surface outside of the cavity) with silver and then copper to prevent corrosion and then further painted for protection using a lead-free paint. The sealant width was uniform and 2.5 mm. The mirror was of a trapezoidal shape with an active area of average equivalent rectangular dimensions of about 5 cm×24 cm. The main epoxy sealant used spacer beads in a diameter of about 63 microns so as to result in a cavity of about this thickness. The cavity was constructed as described in published US patent application US 2006/0027260 with a tab and a hole in the perimeter seal. This was then filled with a molten electrolyte at about 100 C by injection process and then processed and sealed as also described in this application (this application is incorporated herein by reference). The electrolyte comprised of 30:70 ratio of liquids propylene carbonate and N-butyl-N-methylpyrrolidinium bis(trifluoromethylsulfonyl)imide (BMP) ionic liquid (ratio by volume) along with 0.065 molar of the bridged dye 1-4 ferrocenylbutyl-1'-methyl 4-4'-bipyridinium bis(trifluoromethylsulfonyl)imide and 7 g SOLEF 21216/1001 polymer for every 100 ml of the liquids. The polymer is a copolymer supplied by SOLVAY (Thorofare, N.J.). After the mirror was cooled to room temperature (after processing), the electrolyte solidified due to crystallization forming a solid multiphase, but the mirror was clear with no haze. The mirror was powered at room temperature at 1.2V to color and it changed from 80% reflection to 6.6% reflection, the leakage current was 50 mA in the colored state. When it was shorted the mirror bleached. The mirror also exhibited self-erasing properties and the speed was 3 seconds to color 80% of the range and the bleach speed upon shorting was 9.5 seconds for 80% of the range. Coloring speed for 50% of the range was 1.2 seconds and bleaching speed for 50% of the range was 6 seconds. The color coordinates and the haze of the mirror in the bleached state are given below in Table 11.

TABLE 11

| X | Y | Z | Haze % |
|---|---|---|--------|
| 74.2 | 79.92 | 79.79 | 0.07 |

A solid electrolyte when made with 6% of polymer (weight/volume of the liquids) rather than 7% as above gave a solid that was analyzed by the differential scanning calorimeter. This gave a melting endotherm (peak at 78° C., peak onset at about 70° C.) and the peak energy varying from about 0.7 J/g to 1.7 J/g depending on the heat treatment of the electrolyte.

In summary, the present invention includes durable electrochromic (EC) devices that can be fabricated using low conductivity transparent conductors and electrolytes, and have low leakage currents. These devices may be used for rearview mirrors, windows, displays, and the like, and exhibit high speed for coloration and bleach. This invention also includes other types of EC devices, such as photo-electrochemical and electroluminescent devices.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrochromic device, comprising:
 a first substrate having a transparent conductor coated surface,
 a second substrate having a second conductor coated surface,
 an electrolyte medium comprising ionic liquid and disposed between said first substrate and said second substrate, the ionic liquid comprising anions,
 at least one conductive surface on at least one of said transparent conductor coated surface and said second conductor coated surface, said conductive surface comprising a coating of nanostructured material,
 an electrochromic dye attached to said nanostructured material, wherein the anion of the attached dye is same as the anion of the ionic liquid.

2. The device of claim 1, wherein said electrolyte medium is a solid medium.

3. The device of claim 2, wherein said solid electrolyte medium comprises a plurality of phases or crosslinked polymer.

4. An electro-optic device, comprising:
 at least one chamber, and
 an electrolyte medium inside the chamber and comprising a first compound of the formula

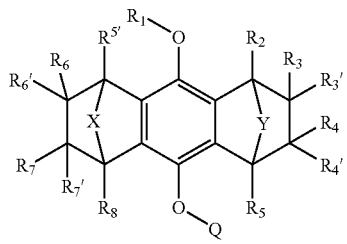

wherein Q is $R_{1'}$ or a group of the formula

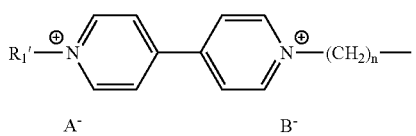

wherein n=1-10, wherein $A^-$ and $B^-$ are counterions;
wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
wherein X and Y are independently selected from O, —$C(R_9)(R_{9'})$— and —$C(R_9)(R_{9'})C(R_{10})(R_{10'})$—;
wherein $R_2$, $R_3$, $R_{3'}$, $R_4$, $R_{4'}$, $R_5$, $R_{5'}$, $R_6$, $R_{6'}$, $R_7$, $R_{7'}$, $R_8$, $R_9$, $R_{9'}$, $R_{10}$, $R_{10'}$, are independently selected from hydrogen, alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl substituted aryl having 7-20 carbons,
or a compound of the formula

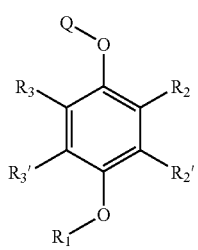

wherein Q is $R_{1'}$ or a group of the formula

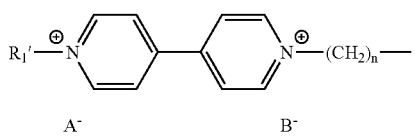

wherein n=1-10, wherein $A^-$ and $B^-$ are counterions;
wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl substituted aryl having 7-20 carbons; wherein $R_2$, $R_{2'}$, $R_3$, $R_{3'}$, are independently selected from hydrogen, alkyl having 1-20 carbons, alkyl carboxylic acid having 1-20 carbons, alkyl phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons,
or a compound of the formula

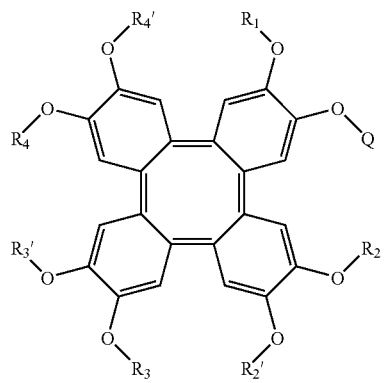

wherein Q is $R_{1'}$ or a group of the formula

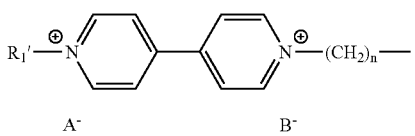

wherein n=1-10, wherein $A^-$ and $B^-$ are counterions;
wherein $R_1$, $R_{1'}$, $R_2$, $R_{2'}$, $R_3$, $R_{3'}$, $R_4$, $R_{4'}$, are independently selected from alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

5. The electrooptic device of claim 4, wherein said electrolyte medium comprises a salt.

6. The electrooptic device of claim 5, wherein said electrolyte medium further comprises at least one additive selected from the group consisting of non-ionic cosolvents, polymers, thixotropic agents, and UV stabilizers.

7. The electrooptic device of claim 5, wherein said electrolyte medium further comprises a radical cation of said first compound.

8. The electrooptic device of claim 5, wherein said electrolyte medium further comprises at least a second compound that, in combination with said first compound, produces a neutral color when said electrooptic device is powered.

9. The electrooptic device of claim 8, wherein said second compound is a viologen.

10. The electrooptic device of claim 5, wherein said device is a display device.

11. The electrooptic device of claim 4, wherein said electrolyte medium further comprises a UV stabilizer or an electron acceptor that is covalently attached to said first compound.

12. The electrooptic device of claim 4, wherein said electrolyte medium comprises an ionic liquid.

13. The electrooptic device of claim 12, wherein said ionic liquid comprises at least one anion selected from the group consisting of trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$).

14. An electrochromic device, comprising:
a first electrode comprising a transparent or translucent substrate, an electrically conducting coating on said substrate, and on said electrically conducting coating a nanostructured film comprising a conducting or semiconducting metal oxide having a first redox chromophore adsorbed thereto,
a second electrode comprising a transparent or translucent substrate, an electrically conducting coating on said substrate, and on the coating a nanostructured film comprising a conducting metal oxide having a second redox chromophore adsorbed thereto
an electrolyte between said first electrode and said second electrode,
wherein at least one of said first redox chromophore and said second redox chromophore comprises a compound of the formula

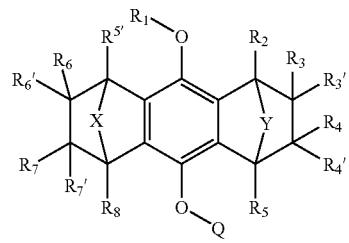

wherein Q is $R_{1'}$ or a group of the formula

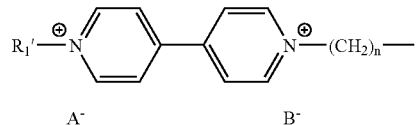

wherein n=1-10, wherein $A^-$ and $B^-$ are counterions;
wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
wherein X and Z are independently selected from O, —$C(R_9)(R_{9'})$— and —$C(R_9)(R_{9'})C(R_{10})(R_{10'})$—;
wherein $R_2$, $R_3$, $R_{3'}$, $R_4$, $R_{4'}$, $R_5$, $R_{5'}$, $R_6$, $R_{6'}$, $R_7$, $R_{7'}$, $R_8$, $R_9$, $R_{9'}$, $R_{10}$, $R_{10'}$, are independently selected from hydrogen, alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

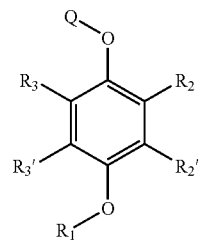

wherein Q is $R_{1'}$ or a group of the formula

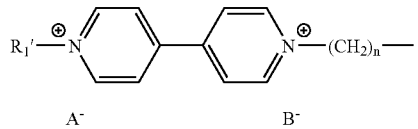

wherein n=1-10, wherein $A^-$ and $B^-$ are counterions;
wherein $R_1$ and $R_{1'}$ are independently selected from alkyl having 1-20 carbons, carboxylic acid having 1-20 carbons, phosphorous acid having 1-20 carbons, boric acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_2$, $R_{2'}$, $R_3$, $R_{3'}$, are independently selected from hydrogen, alkyl having 1-20 carbons, alkyl carboxylic acid having 1-20 carbons, alkyl phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons, or a compound of the formula

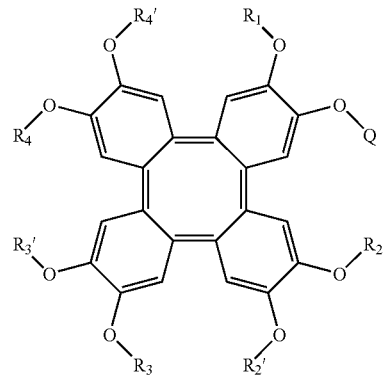

wherein Q is $R_{1'}$ or a group of the formula

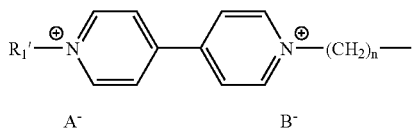

wherein n=1-10, wherein $A^-$ and $B^-$ are counterions;

wherein $R_1, R_{1'}, R_2, R_{2'}, R_3, R_{3'}, R_4, R_{4'}$, are independently selected from alkyl having 1-20 carbons, carboxylic acid having 1-20 carbons, boric acid having 1-20 carbons, phosphorous acid having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

15. An electrooptic device as in claim 14, wherein at least one of the redox chromophores comprises a metallocene.

16. The electrooptic device of claim 15, wherein the metallocene comprises a ferrocene or a ferrocene derivative.

* * * * *